US011057925B2

(12) United States Patent
Babaei et al.

(10) Patent No.: US 11,057,925 B2
(45) Date of Patent: Jul. 6, 2021

(54) DEACTIVATION TIMER IN A WIRELESS DEVICE AND WIRELESS NETWORK

(71) Applicant: Comcast Cable Communications, LLC, Philadelphia, PA (US)

(72) Inventors: Alireza Babaei, Fairfax, VA (US); Esmael Hejazi Dinan, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/670,857

(22) Filed: Aug. 7, 2017

(65) Prior Publication Data

US 2018/0042016 A1    Feb. 8, 2018

Related U.S. Application Data

(60) Provisional application No. 62/371,792, filed on Aug. 7, 2016, provisional application No. 62/372,643, filed on Aug. 9, 2016.

(51) Int. Cl.
*H04W 72/14* (2009.01)
*H04W 72/04* (2009.01)
(Continued)

(52) U.S. Cl.
CPC ........... *H04W 72/14* (2013.01); *H04L 5/0032* (2013.01); *H04L 5/0082* (2013.01);
(Continued)

(58) Field of Classification Search
CPC ........... H04W 72/042; H04W 72/0406; H04W 72/0413; H04W 76/27; H04W 88/02;
(Continued)

(56) References Cited

U.S. PATENT DOCUMENTS

2010/0098012 A1    4/2010 Bala et al.
2011/0105107 A1    5/2011 Kwon et al.
(Continued)

FOREIGN PATENT DOCUMENTS

EP    2763338 A1    8/2014

OTHER PUBLICATIONS

R2-167928; 3GPP TSG RAN WG2 Meeting #96; Reno, USA, Nov. 14-18, 2016; Agenda Item: 8.13.3; Source: Huawei, HiSilicon; Title: Discussion on P2X Sidelink Communication.
(Continued)

*Primary Examiner* — Asad M Nawaz
*Assistant Examiner* — Najeeb Ansari
(74) *Attorney, Agent, or Firm* — Banner & Witcoff, Ltd.

(57) ABSTRACT

A wireless device receives one or more messages comprising configuration parameters for a plurality of cells comprising a secondary cell. A deactivation timer may be disabled for the secondary cell in response to the configuration parameters comprising periodic resource allocation configuration parameters for configuring a periodic resource allocation of the secondary cell. A downlink control information (DCI) indicating activation of the periodic resource allocation may be received. The DCI may comprise a radio resource assignment. One or more transport blocks (TBs) employing the radio resource assignment may be transmitted.

32 Claims, 32 Drawing Sheets

(51) Int. Cl.
*H04W 72/12* (2009.01)
*H04W 76/38* (2018.01)
*H04L 5/00* (2006.01)

(52) U.S. Cl.
CPC ..... *H04W 72/042* (2013.01); *H04W 72/0406* (2013.01); *H04W 72/0446* (2013.01); *H04W 72/1273* (2013.01); *H04W 72/1289* (2013.01); *H04W 76/38* (2018.02)

(58) Field of Classification Search
CPC ............... H04W 72/04; H04W 74/002; H04W 72/1289; H04W 76/38
See application file for complete search history.

(56) References Cited

U.S. PATENT DOCUMENTS

| | | | |
|---|---|---|---|
| 2011/0243106 A1* | 10/2011 | Hsu | H04L 5/0096 370/336 |
| 2011/0249578 A1 | 10/2011 | Nayeb Nazar et al. | |
| 2013/0028229 A1 | 1/2013 | Suh et al. | |
| 2013/0058233 A1* | 3/2013 | Kim | H04L 5/001 370/252 |
| 2013/0121297 A1 | 5/2013 | Kim et al. | |
| 2013/0301509 A1 | 11/2013 | Pumadi et al. | |
| 2014/0016593 A1* | 1/2014 | Park | H04L 5/001 370/329 |
| 2014/0241319 A1 | 8/2014 | Lee et al. | |
| 2014/0344472 A1 | 11/2014 | Lovsen et al. | |
| 2015/0030008 A1* | 1/2015 | Lee | H04W 72/0446 370/336 |
| 2015/0043429 A1 | 2/2015 | Kim et al. | |
| 2015/0181576 A1 | 6/2015 | Papasakellariou et al. | |
| 2015/0365831 A1 | 12/2015 | Ko et al. | |
| 2015/0365963 A1 | 12/2015 | Won et al. | |
| 2016/0100353 A1 | 4/2016 | Gleixner | |
| 2016/0204905 A1* | 7/2016 | Lee | H04L 1/1812 370/329 |
| 2016/0227486 A1 | 8/2016 | Park | |
| 2016/0227602 A1* | 8/2016 | Yi | H04W 48/16 |
| 2016/0295624 A1 | 10/2016 | Novlan et al. | |
| 2017/0019887 A1 | 1/2017 | Jiang et al. | |
| 2017/0094533 A1* | 3/2017 | Wu | H04W 16/32 |
| 2017/0245245 A1 | 8/2017 | Kim et al. | |
| 2017/0325076 A1 | 11/2017 | Fujishiro et al. | |
| 2017/0347270 A1* | 11/2017 | Iouchi | H04W 16/14 |
| 2017/0374665 A1* | 12/2017 | Lee | H04W 72/0413 |
| 2018/0007680 A1* | 1/2018 | Lee | H04L 1/1893 |
| 2018/0007693 A1* | 1/2018 | Lee | H04W 72/0413 |
| 2018/0027461 A1* | 1/2018 | Jia | H04W 72/04 370/329 |
| 2018/0035276 A1 | 2/2018 | Kang et al. | |
| 2018/0035340 A1 | 2/2018 | Fujishiro et al. | |
| 2018/0049184 A1* | 2/2018 | Lee | H04L 5/001 |
| 2018/0049225 A1 | 2/2018 | Lee et al. | |
| 2018/0124707 A1 | 5/2018 | Lee et al. | |
| 2018/0159935 A1 | 6/2018 | Cavalcanti et al. | |
| 2018/0192268 A1 | 7/2018 | Xu et al. | |
| 2018/0206089 A1 | 7/2018 | Cavalcanti et al. | |
| 2018/0255569 A1 | 9/2018 | Aiba et al. | |
| 2019/0014563 A1 | 1/2019 | Lee et al. | |
| 2019/0098698 A1 | 3/2019 | Fukuta | |
| 2019/0182644 A1 | 6/2019 | Zheng et al. | |
| 2019/0245657 A1 | 8/2019 | Lee et al. | |

OTHER PUBLICATIONS

R2-167930; 3GPP TSG RAN WG2 Meeting #96; Reno, USA, Nov. 14-18, 2016; Agenda Item: 8.13.2; Source: Huawei, HiSilicon; Title: Discussions on Remaining Issues for SPS.
R2-167934; 3GPP TSG RAN WG2 Meeting #96; Reno, USA, Nov. 14-18, 2016; Agenda Item: 8.13.1; Source: Huawei, HiSilicon; Title: Multi-PLMN operation for Uu-based V2X.
R2-167998; 3GPP TSG RAN WG2 Meeting #96; Reno, USA, Nov. 14-18, 2016; Agenda item: 8.13.2; Source: Potevio; Title: Details of LCP for enhanced SPS configurations.
R2-167999; 3GPP TSG RAN WG2 Meeting #96; Reno, USA, Nov. 14-18, 2016; Source: Potevio; Title: Discussion on SPS configuration related issues.
R2-168043; 3GPP TSG-RAN WG2 #96; Reno, USA, Nov. 14-18, 2016; Agenda item: 8.133; Source: Kyocera; Title: Consideration of the P2V transmission scheme.
R2-168045; 3GPP Tsg Ran WG2 #96; Reno, USA, Nov. 14-18, 2016; Agenda Item: 8.13.1; Souce: Samsung; Title: Supporting small and variable Service Area in non-overlapped local MBMS service area.
R2-168068; 3GPP TSG-RAN WG2 Meeting #96; Reno, Nevada, USA, Nov. 14-18, 2016; Agenda item: 8.13.3; Source: Samsung; Title: Resource configuration for P2V.
R2-168083; 3GPP TSG RAN WG2 Meeting #96; Reno, USA, Nov. 14-18, 2016; Source: CATT; Title: Discussion on Impact of LCP procedure in V2X SPS resource usage; Agenda Item: 8.13.2.
R2-168084; 3GPP TSG RAN WG2 Meeting #96; Reno, USA, Nov. 14-18, 2016; Source: CATT, ZTE, POTEVIO; Title: Discussion on V2X SPS.
R2-168085; 3GPP TSG RAN WG2 Meeting #96; Reno, USA, Nov. 14-18, 2016; Source: CATT; Title: Consideration on pool management and resource selection.
R2-168137; 3GPP TSG-RAN WG2 #96; Reno, USA, Nov. 14-18, 2016; Agenda Item: 8.13.2; Source: ZTE; Title: Discussion on SPS related issues.
R2-168139; 3GPP TSG-RAN WG2 Meeting #96; Reno, USA, Nov. 14-18, 2016; Title: MBMS enhancement for Uu based V2X communication; Source: ZTE Corporation.
R2-168144; 3GPP TSG-RAN WG2 Meeting #96; Reno, USA, Nov. 14-18, 2016; Title: Discussion on V2P aspects; Source: ZTE.
R2-168273; 3GPP TSG-RAN WG2 Meeting #96; Reno, USA, Nov. 14-18, 2016; Agenda Item: 8.13.3; Source: Coolpad; Title: Discussion on power saving for PCS-based V2P.
R2-168409; 3GPP TSG-RAN WG2 #96; Reno, USA, Nov. 14-18, 2016; Agenda Item: 8.13.2; Source: LG Electronics Inc.; Title: SPS and UE assistant information for V2X.
R2-168410; 3GPP TSG-RAN WG2 #96; Reno, USA, Nov. 14-18, 2016; Agenda Item : 8.13.3; Source: LG Electronics Inc.; Title: Support for V2P service.
R2-168426; 3GPP Tsg-Ran WG2 Meeting #96; Reno, USA, Nov. 14-18, 2016; Agenda item: 8.133; Source: Vokia, Alcatel-Lucent Shanghai Bell; Title: Efficient V2P/P2V activation.
R2-168427; 3GPP TSG-RAN WG2 Meeting #96; Reno, USA, Nov. 14-18, 2016; Agenda item: 8.13.2; Source: Vokia, Alcatel-Lucent Shanghai Bell; Title: Further discussion on SPS enhancements.
R2-168486; 3GPP TSG-RAN WG2 #96; Reno, Nevada, USA, Nov. 14-18, 2016; Agenda Item: 9.3.1.1.3; Source: Ericsson; Title: Consideration on mobility for URLLC and eV2x.
R2-168642; 3GPP TSG-RAN WG2 #96; Reno, Nevada, USA, Nov. 14-18, 2016; Agenda Item: 8.133; Source: Ericsson; Title: Discussion on Sidelink Operations for Pedestrian.
R2-168653; 3GPP TSG-RAN WG2 #96; Reno, Nevada, USA, Nov. 14-18, 2016; Agenda Item: 8.13.2; Source: Ericsson; Title: SPS Protocol for Uu.
R2-168701; 3GPP TSG-RAN WG2 #96; Reno, Nevada, USA, Nov. 14-18, 2016; Agenda Item: 8.13.2; Source: Ericsson, Interdigital, Qualcomm; Title: Configuration of UE Assistance Information.
R2-168702; 3GPP TSG-RAN WG2 #96; Reno, Nevada, USA, Nov. 14-18, 2016; Agenda Item: 8.13.2; Source: Ericsson, Interdigital, ITL; Title:vSidelink SPS Configuration.
R2-168789; 3GPP TSG RAN WG2 Meeting #96; Reno, NV, USA, Nov. 14-18, 2016; Title: Draft LS reply on Voice and Video enhancement for LTE.
International Search Report dated Jan. 11, 2018 in International Application No. PCT/US2017/045754.
R2-164105, 3GPP TSG-RAN WG2 Meeting #94, Nanjing, China, May 23-27, 2016, Source: Ericsson, Title: Sidelink Resource Allocation in V2X.

(56) References Cited

OTHER PUBLICATIONS

R2-163836, 3GPP TSG-RAN WG2 Meeting #94, Nanjing, China, May 23-27, 2016, Source: ZTE, Title: SPS enhancements for V2V over PC5.
3GPP TS 36.213 V113.0 (Jul. 2013), Technical Specification, 3rd Generation Partnership Project; Technical Specification LTE; Evolved Universal Terrestrial Radio Access (E-UTRA); (Release 11).
3GPP TS 22.185 V0_2.0 (Feb. 2016), Technical Specification, 3rd Generation Partnership Project; Technical Specification Group Services and System Aspects; Service requirements for V2X services; Stage 1 (Release 14).
3GPP TS 23103 V131.0 (Mar. 2016), Technical Specification, 3rd Generation Partnership Project; Technical Specification Group Services and System Aspects; Policy and charging control architecture (Release 13).
3GPP TS 23.303 V13_3.0 (Mar. 2016), Technical Specification, 3rd Generation Partnership Project; Technical Specification Group Services and System Aspects; Proximity-based services (ProSe); Stage 2 (Release 13).
3GPP TS 24334 V133.1 (Mar. 2016), Technical Specification, 3rd Generation Partnership Project; Technical Specification Group Core Network and Terminals; Proximity-services (ProSe) User Equipment (UE) to Prose function Protocol aspects; Stage 3, (Release 13).
3GPP TS 29.214 V13.5.0 (Mar. 2016), Technical Specification, 3rd Generation Partnership Project; Technical Specification Group Core Network and Terminals; Policy and Charging Control over Rx reference point, (Release 13).
3GPP TS 36.211 V14.0.0 (Sep. 2016); Technical Specification; 3rd Generation Partnership Project; Technical Specification Group Radio Access Network; Evolved Universal Terrestrial Radio Access (E-UTRA); Physical channels and modulation (Release 14).
3GPP TS 36.212 V14.0.0 (Sep. 2016); Technical Specification; 3rd Generation Partnership Project; Technical Specification Group Radio Access Network; Evolved Universal Terrestrial Radio Access (E-UTRA); Multiplexing and channel coding (Release 14).
3GPP TS 36.213 V14.0.0 (Sep. 2016); Technical Specification; 3rd Generation Partnership Project; Technical Specification Group Radio Access Network; Evolved Universal Terrestrial Radio Access (E-UTRA); Physical layer procedures (Release 14).
3GPP TS 36.300 V14.0.0 (Sep. 2016); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
3GPP TS 36.321 V14.0.0 (Sep. 2016); Technical Specification; 3rd Generation Partnership Project; Technical Specification Group Radio Access Network; Evolved Universal Terrestrial Radio Access (E-UTRA); Medium Access control (MAC) protocol specification (Release 14).
3GPP TS 36.331 V14.0.0 (Sep. 2016); Technical Specification; 3rd Generation Partnership Project; Technical Specification Group Radio Access Network; Evolved Universal Terrestrial Radio Access (E-UTRA); Radio Resource control (RRC); Protocol specification (Release 14).
R2-162236; 3GPP TSG-RAN WG2 Meeting #93bis; Apr. 11-15, 2016, Dubrovnik, Croatia; Agenda Item: 8.8.2; Souce: Samsung; Title:Discussion on acknowledging SPS command.
R2-162264; 3GPP TSG-RAN WG2 Meeting #93b; Dubrovnik, Croatia, Apr. 11-15, 2016; Agenda item: 8.8.2; Source: Huawei, HiSilicon; Title: on UL grants skipping.
R2-162265; 3GPP TSG-RAN WG2 Meeting #93bis; Dubrovnik, Croatia, Apr. 11-15, 2016; Agenda Item 8.8.2; Source: Huawei, HiSilicon; Title: Implicit SPS release under UL grants skipping.
R2-162266; 3GPP TSG-RAN WG2 Meeting #93b; Dubrovnik, Croatia, Apr. 11-15, 2016; Agenda item: 8.8.2; Source: Huawei, HiSilicon; Title: Necessity of feedback for SPS activation and deactivation.
R2-162415; 3GPP TSG-RAN WG2 Meeting #93bis; Dubrovnik, Croatia, Apr. 11-15, 2016; Agenda Item: 8.8.1; Source: CMCC; Title: Remaining issues related to UL SPS.
R2-162466; 3GPP TSG-RAN2 Meeting #93bis; Dubrovnik, Croatia Apr. 11-15, 2016; Agenda item: 8.8.1; Source: Intel Corporation; Title: Further aspects of short SPS interval.
R2-162467; 3GPP TSG-RAN2 Meeting #93bis; Dubrovnik, Croatia Apr. 11-15, 2016; Agenda item:8.8.2;Source: Intel Corporation; Title: Further aspects of UL grant skipping.
R2-162468; 3GPP TSG-RAN2 Meeting #93bis; Dubrovnik, Croatia Apr. 11-15, 2016; Agenda item: 8.83; Source: Intel Corporation; Title: SPS activation, reactivation and deactivation feedback.
R2-162515; 3GPP TSG RAN WG2 Meeting #93bis; Dubrovnik, Croatia, Apr. 11-15, 2016; Source:CATT; Title: Feedback for SPS PDCCH command.
R2-162572; 3GPP TSG-RAN WG2 Meeting #93bis; Dubrovnik, Croatia, Apr. 11-15, 2016; Source: ZTE Corporation; Title: Discussion on the feedback of the SPS activation command.
R2-162601; 3GPP TSG-RAN2 Meeting #93bis; Republika Hrvatska, Dubrovnik, Apr. 11-15, 2016; Agenda Item:8.8.2—LTE Rel-14: WI: L2 latency reduction techniques; Source: ASUSTeK;Title:Discussion on skipping UL grants.
R2-162781; 3GPP TSG-RAN WG2 #93bis; Dubrovnik, Croatia, Apr. 11-15, 2016; Agenda Item: 8.8.3; Source: Ericsson; Title: Acknowledgements for SPS commands.
R2-162901; 3GPP TSG-RAN WG2 Meeting #93bis; Dubrovnik, Croatia, Apr. 11-15, 2016; Agenda Item: 8.8.2 (LTE_LATRED_L2-Core); Source: LG Electronics Inc.; Title: Need for feedback of SPS command.
R2-162902; 3GPP TSG-RAN WG2 Meeting #93bis; Dubrovnik, Croatia, Apr. 11-15, 2016; Agenda Item: 8.8.2 (LTE_LATRED_L2-Core); Source: LG Electronics Inc.; Title: SPS feedback transmission.
R2-162909; 3GPP Tsg-RAN2 Meeting #93bis; Dubrovnik, Croatia, Apr. 12-16, 2016; Agenda item: 8.8.2;Source: Qualcomm Incorporated; Title: Open issues for skipping UL grants.
R2-163385; 3GPP TSG-RAN2 Meeting #94; Nanjing, China, May 23-27, 2016; Agenda item: 8.8.1; Source: FiberHome; Title: UL SPS command feedback.
R2-163386; 3GPP TSG-RAN WG2 Meeting #94; Nanjing, China, May 23-27, 2016; Agenda Item: 8.8.2; Souce: FiberHome; Title: discussion of retransmission for short SPS period.
R2-163475; 3GPP TSG RAN WG2 Meeting #94; Nanjing, China, May 23-27, 2016; Source: CATT; Title: Feedback for SPS activation and deactivation.
R2-163671; 3GPP TSG-RAN WG2 Meeting #94; May 23-27, 2016, Nanjing, China; Agenda Item: 8.8.1; Source: Samsung; Title: Feedback for SPS activation/deactivation.
R2-163698; 3GPP TSG-RAN WG2 Meeting #94; Nanjing, China, May 23-27, 2016; Agenda item: 8.8.1; Source: Nokia, Alcatel-Lucent Shanghai Bell; Title: Feedback for SPS activation/deactivation.
R2-163771; 3GPP Tsg-Ran WG2 Meeting #94; Nanjing, China, May 23-27, 2016; Agenda Item: 8.8.2; Source: Fujitsu; Title: Considerations on the SPS resource efficiency.
R2-163781; 3GPP TSG-RAN WG2 #94; Nanjing, China, May 23-27, 2016; Agenda Item: 8.8.1; Source: Ericsson; Title: Acknowledgements for SPS commands.
R2-163916; 3GPP TSG-RAN WG2 Meeting #94; Nanjing, China, May 23-27, 2016; Agenda item: 8.8.1; Source: Huawei, HiSilicon; Title: Discussion on feedback for SPS activation and deactivation.
R2-163917; 3GPP TSG-RAN WG2 Meeting #94; Nanjing, China, May 23-27, 2016; Agenda Item: 8.8.2; Source: Huawei, HiSilicon; Title: Implicit SPS release under UL grants skipping.
R2-164207; 3GPP TSG-RAN WG2 Meeting #94; Nanjing, China, May 23-27, 2016; Agenda Item: 8.8.1 (LTE_LATRED_L2-Core); Source: LG Electronics Inc.; Title: SPS feedback for SPS release.
R2-164217; 3GPP TSG-RAN WG2 Meeting #94; Nanjing, China, May 23-27, 2016; Agenda Item: 8.8.1 (LTE_LATRED_L2-Core); Source: LG Electronics Inc.; Title: Need of feedback for SPS activation.
R2-165266; 3GPP TSG-RAN2 Meeting #95; Goteborg, Sweden, Aug. 22-26, 2016; Source: ZTE Corporation; Title: Discussion on the configurable feedback.

(56) References Cited

OTHER PUBLICATIONS

R2-165267; 3GPP TSG-RAN2 Meeting #95; Goteborg, Sweden, Aug. 22-26, 2016; Source: ZTE Corporation; Title: Discussion on the feedback transmission of SPS release.
R2-165354; 3GPP TSG-RAN WG2 #95; Gothenburg, Sweden, May 22-26, 2016; Agenda Item: 8.8; Source: Ericsson; Title: Remaining issues with SPS with skip padding and short periods.
R2-165663; 3GPP TSG-RAN WG2 Meeting #95; Gothenburg, Sweden, Aug. 22-26, 2016; Agenda Item: 8.8 (LTE_LATRED_L2-Core); Source: LG Electronics Inc.; Title: Remaining issues on SPS Confirmation MAC CE.
R2-165686; 3GPP TSG-RAN2 Meeting #95; Gothenburg, Sweden, Aug. 22-26, 2016; Agenda item: 8.8; Source: Qualcomm Incorporated; Title: Remaining Open Issues for Uplink Skipping.
3GPP TS 36A23 V14.0.0 (Sep. 2016); Technical Specification; 3rd Generation Partnership Project; Technical Specification Group Radio Access Network; Evolved Universal Terrestrial Radio Access Network (E-UTRAN); X2 application protocol (X2AP) (Release 14).
R2-167409; 3GPP TSG RAN WG2 Meeting #96; Reno, USA, Nov. 14-18, 2016; 3GPP TSG RAN WG1 Meeting #86bis; R1-1610929; Lisboa, Portugal, Oct. 10-14, 2016; Title: LS response on DFN offset.
R2-167481; 3GPP TSG-RAN2 Meeting #96; Reno, USA, Nov. 14-18, 2016; Agenda Item: 8.13.2; Source: OPPO; Title: Discussion on Remain Issues of V2X SPS Enhancements.
R2-167482; 3GPP TSG-RAN2 Meeting #96; Reno, USA, Nov. 14-18, 2016; Agenda Item: 8.13.3; Source: OPPO; Title: Discussion on V2P.
R2-167567; 3GPP TSG-RAN WG2 #96; Reno, USA, Nov. 14-18, 2016; Agenda item: 8.13.2; Source: Samsung, Intel; Title: Handling Sidelink SPS Configurations.
R2-167889; 3GPP TSG-RAN WG2 Meeting #96; Reno, USA, Nov. 14-18, 2016; Agenda item: 8.13.2; Source: Qualcomm Incorporated; Title: SPS enhancement for V2X.
R2-167890; 3GPP TSG-RAN WG2 Meeting #96; Reno, USA, Nov. 14-18, 2016; Agenda item: 8.13.3; Source: Qualcomm Incorporated; Title: Sensing based resource selection for V2P.
R2-167919; 3GPP TSG RAN WG2 #96; Reno, USA, Nov. 14-18, 2016; Agenda Item: 8.13.3; Souce: Samsung; Title: Discussion about prioritization of P-UEs.
3GPP TS 36.213 V13.2.0 (Jun. 2016), Technical Specification, 3rd Generation Partnership Project; Technical Specification Group Radio Access Network; Evolved Universal Terrestrial Radio Access (E-UTRA);Physical layer procedures (Release 13).
3GPP TS 36.300 V13.4.0 (Jun. 2016), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).
3GPP TS 36.321 V13.2.0 (Jun. 2016), Technical Specification, 3rd Generation Partnership Project; Technical Specification Group Radio Access Network; Evolved Universal Terrestrial Radio Access (E-UTRA);Medium Access Control (MAC) protocol specification (Release 13).
3GPP TS 36.331 V13.2.0 (Jun. 2016), Technical Specification, 3rd Generation Partnership Project; Technical Specification Group Radio Access Network; Evolved Universal Terrestrial Radio Access (E-UTRA); Radio Resource Control (RRC); Protocol specification (Release 13).
R1- 164878, 3GPP TSG RAN WG1 Meeting #85, Nanjing China May 23-27, 2016, Source: CMCC, Title: Discussion on SPS configurations.
R1-162122, 3GPP TSG RAN WG1 Meeting #84bis, Busan, Korea, Apr. 11-15, 2016, Agenda Item: 7.3.2.2.2, Source: Huawei, HiSilicon, Title: SPS enhancement for V2V.
R1-162340, 3GPP TSG RAN WG1 Meeting #84 bis, Busan, Korea, Apr. 11-15, 2016, Source: OPPO, Title: Discussion on the SPS configuration.

R1-162413, 3GPP TSG-RAN WG1 Meeting #84bis, Busan, Korea Apr. 11-15, 2016, Source: ZTE, Title: Discussion on V2V SPS resource scheme.
R1-162500, RAN WG1 Meeting #84bis, Busan, Korea, Apr. 11-15, 2016, Source: LG Electronics, Title: Discussions on UL enhancements for V2X.
R1-164421, 3GPP TSG-RAN WG1 #85, May 23-27, 2016, Nanjing, China, Agenda item: 6.2.2.3.1, Source: Qualcomm Incorporated, Title: eNodeB signaling for SPS resource allocation.
R1-164422, 3GPP TSG-RAN WG1 #85, May 23-27, 2016, Nanjing, China, Agenda item: 6.2.2.3.2, Source: Qualcomm Incorporated, Title: UE reporting for eNodeB resource allocation.
R1-164468, 3GPP TSG RAN WG1 Meeting #85, Nanjing, China, May 23-27, 2016, Source: Guangdong OPPO Mobile Telecom, Title: Discussion on the SPS configuration for mode-2.
R1-164514, 3GPP TSG RAN WG1 Meeting #85, Nanjing, China May 23-27, 2016, Source: LG Electronics, Title: Discussion on details of (E)PDCCH used for sidelink SPS.
R1-164515, 3GPP TSG RAN WG1 Meeting #85, Nanjing, China, May 23-27, 2016, Agenda item: 6.2.2.3.2, Source: LG Electronics, Title: Discussion on details of UE reporting.
R1-164538' 3GPP TSG RAN WG1 Meeting #85, Nanjing, China, May 23-27, 2016, Source: LG Electronics, Title: Discussion on UL SPS for V2X.
R1-164762, 3GPP TSG RAN WG1 Meeting #85, Nanjing, May 23-27, 2016, Agenda Item: 6.2.2.3.1, Source: Samsung, Title: Multiple SPS configuration support for SL.
R1-164763, 3GPP TSG RAN WG1 Meeting #85, Nanjing, May 23-27, 2016, Agenda Item: 6.2.2.3.2, Source: Samsung, Title: UE reporting procedure for SL SPS transmissions.
R1-164818, 3GPP TSG RAN WG1 Meeting #85, Nanjing, China, May 23-27, 2016, Agenda Item: 6.2.2.3, Source: Huawei, HiSilicon, Title: SPS enhancement for V2V.
R1-164906, 3GPP TSG RAN WG1 Meeting #85, Nanjing, China May 23-27, 2016, Source: Panasonic, Title: Signaling design to support SPS activation/release in V2V.
R1-164963, 3GPP TSG RAN WG1 Meeting #85, Nanjing, China May 23-27, 2016, Source: ZTE, Title: Trigger and release of V2V SPS resources.
R1-164964, 3GPP TSG RAN WG1 Meeting #85, Nanjing, China May 23-27, 2016, Agenda item: 6.2.2.3.2, Source: ZTE, Title: Discussion on Ue reporting.
R1-165193, 3GPP TSG RAN WG1 Meeting #85, Nanjing, China May 23-27, 2016, Source: NTT Docomo, Inc., Title: (E)PDCCH for sidelink SPS configuration switching.
R1-165194, 3GPP TSG RAN WG1 Meeting #85, Nanjing, China May 23-27, 2016, Source: NTT DOCOMO, Inc., Title: UE reporting for sidelink SPS operation.
R1-165246, 3GPP TSG RAN WG1 Meeting #85, Nanjing, PRC, May 23-27, 2016, Source: Ericsson, Title: Contents of Downlink Control Information for V2V over PC5.
R1-165272, 3GPP TSG RAN WG1 Meeting #85, Nanjing, PRC, May 23-27, 2016, Source: Ericsson, Title: Mode-1 SPS for V2V over PC5.
R1-165274, 3GPP TSG RAN WG1 Meeting #85, Nanjing, May 23-27, 2016, Source: Ericsson, Title: UL SPS and reporting to eNB for V2X.
R1-165309, 3GPP TSG RAN WG1 Meeting #85, Nanjing, China May 23-27, 2016, Source: Panasonic, Title: Details on PC5 SPS enhancement.
R2-162197, 3GPP TSG-RAN2 Meeting #93bis, Dubrovnik, Croatia, Apr. 11-15, 2016, Agenda Item: 8.2.1, Source: OPPO, Title: Discussion on SPS Enhancements for V2V.
R2-162454, 3GPP TSG RAN WG2 Meeting #93bis, Dubrovnik, Croatia, Apr. 11-15, 2016, Agenda item:8.2.1, Source: Intel Corporation, Title: SL resource allocation in SPS manner.
R2-162927, 3GPP TSG-RAN2 Meeting #93bis, Dubrovnik, Croatia, Apr. 11-15, 2016, Agenda item: 8.2.1, Source: LG Electronics Inc., Title: SL SPS enhancement for V2V.
R2-163406, 3GPP TSG-RAN2 Meeting #94, Nanjing, P. R. China, Apr. 23-27, 2016, Agenda Item: 8.11.1, Source: OPPO, Title: Discussion on SPS Enhancements for V2X.

(56) References Cited

OTHER PUBLICATIONS

R2-163421, 3GPP TSG-RAN WG2 Meeting #94, Nanjing, China, May 23-25, 2016, Source: CATT, Title: Consideration on SPS Enhancement.
R2-163451, 3GPP TSG RAN WG2 Meeting #94, Nanjing, China, Apr. 23-25, 2016, Agenda Item: 8.2.4, Source: Samsung, Title: UE reporting and dynamic SL SPS transmission.
R2-163807, 3GPP TSG-RAN WG2 Meeting #94, Nanjing, China, May 23-27, 2016, Agenda Item: 8.11.1, Source: Huawei, HiSilicon, InterDigital, LG Electronics Inc., OPPO, Title: Discussions on CAM Characteristics.
R2-163812, 3GPP TSG-RAN WG2 #94, Nanjing, China, May 23-27, 2016, Agenda Item: 8.2.4, Source: Huawei, HiSilicon, Title: Enhancements for Sidelink Resource Allocation.
R2-163840, 3GPP TSG RAN WG2 #94, Nanjing, China, May 23-27, 2016, Source: ZTE, Title: SPS enhancements for V2X over Uu.
R2-163865, 3GPP TSG RAN WG2 Meeting #94, Nanjing, China, May 23-25, 2016, Source: ITL, Title: SL SPS for V2V.
R2-163885, 3GPP TSG RAN WG2 Meeting #94, Nanjing, China, May 23-27, 2016, Source: Potevio, Title: UE assisted information for SPS.
R2-163900, 3GPP TSG-RAN WG2 Meeting #94, Nanjing, China, May 23-27, 2016, Agenda item: 8.11.1, Source: Nokia, Alcatel-Lucent Shanghai Bell, Title: Multiple inter-dependent UL SPS occasions.
R2-164063, 3GPP TSG-RAN WG2 Meeting #94, Nanjing, China, May 23-27, 2016, Agenda item: 8.2.4, Source: Qualcomm Incorporated, Title: SPS for V2V Communication.
R2-164079, 3GPP TSG-RAN2 Meeting #94, Nanjing, China, Apr. 11-15, 2016, Agenda item: 8.2.4, Source: LG Electronics Inc. Title: Support of Semi-Persistent Scheduling for PC5 mode 1.
R2-164082, 3GPP TSG-RAN2 Meeting #94, Nanjing, China, Apr. 11-15, 2016, Agenda item: 8.11.1, Source: LG Electronics Inc, InterDigital, OPPO, Huawei, Title: Proposed TP for UL SPS enhancements.
R2-164377, 3GPP TSG-RAN WG2 Meeting #94, Nanjing, China, May 23-27, 2016, Agenda item: 8.11.1, Source: Huawei, HiSilicon, Title: TP on CAM Characteristics.
Tdoc R2-161571, 3GPP TSG-RAN WG2 #93, St. Julians, Malta, Feb. 15-19, 2016, Agenda Item: 7.11, Source: Ericsson, Title: Overview of V2X Enhancements for Further RAN2 Work.
Tdoc R2-164112, 3GPP TSG-RAN WG2 #94, Nanjing, P.R. China, May 23-27, 2016, Agenda Item: 8.11.1, Source: Ericsson, Title: SPS Enhancements for Uu Operations in V2X.
Mar. 24, 2020—European Office Action—EP 17752265.3.
Jan. 21, 2021—European Office Action—EP 17752265.3.
U.S. Appl. No. 15/469,023, Vehicle Wireless Device Discovery, filed Mar. 24, 2017.
U.S. Appl. No. 15/470,165, IMS Registration of a V2X Wireless Device, filed Mar. 27, 2017.
U.S. Appl. No. 15/472,801, Bearer modification for V2X Communications, filed Mar. 29, 2017.
U.S. Appl. No. 15/670,788, Grant Validation in a Wireless Device and Wireless Network, filed Aug. 7, 2017.
U.S. Appl. No. 15/671,801, Group Power Control for a Secondary Cell, filed Aug. 8, 2017.
U.S. Appl. No. 15/812,246, Semi-Persistent Scheduling Confirmation, filed Nov. 14, 2017.
U.S. Appl. No. 15/816,190, Handover of User Equipment with Multimedia Broadcast Multicast Services, filed Nov. 17, 2017.

\* cited by examiner

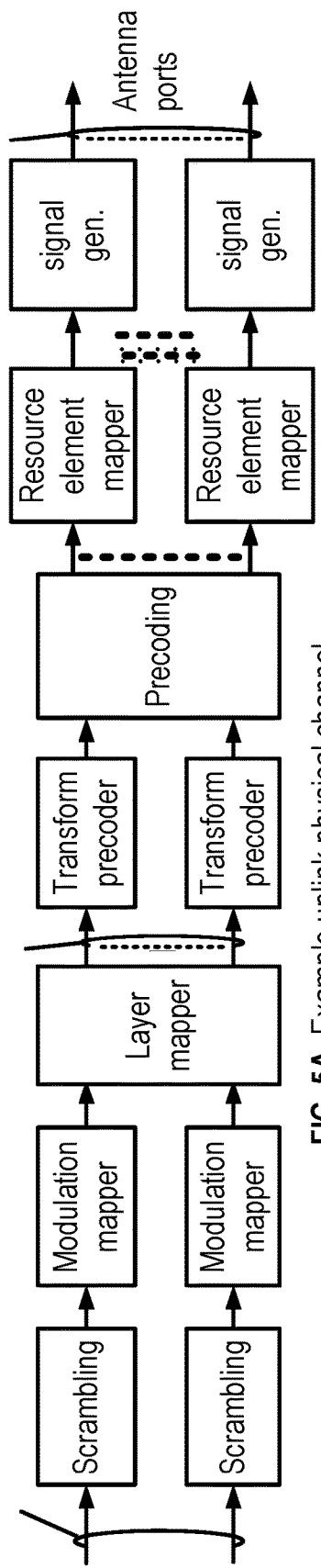
FIG. 5A Example uplink physical channel
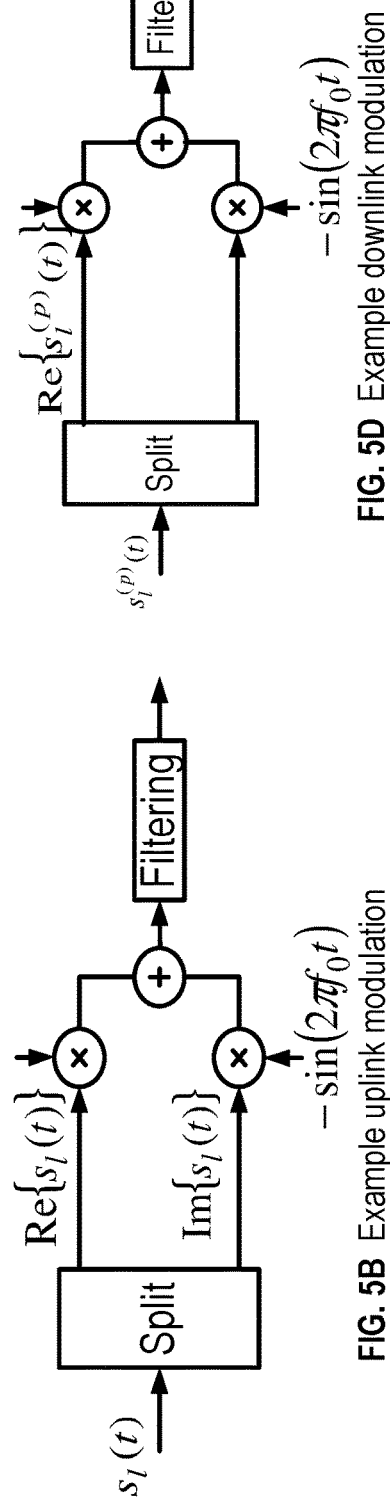
FIG. 5B Example uplink modulation
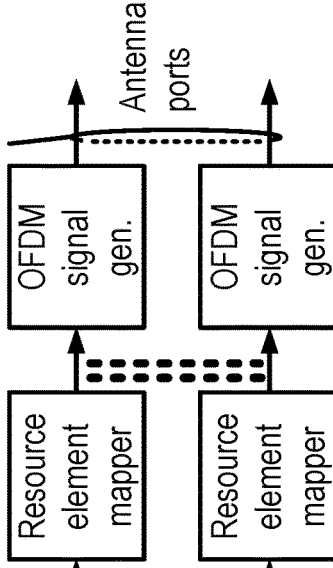
FIG. 5D Example downlink modulation
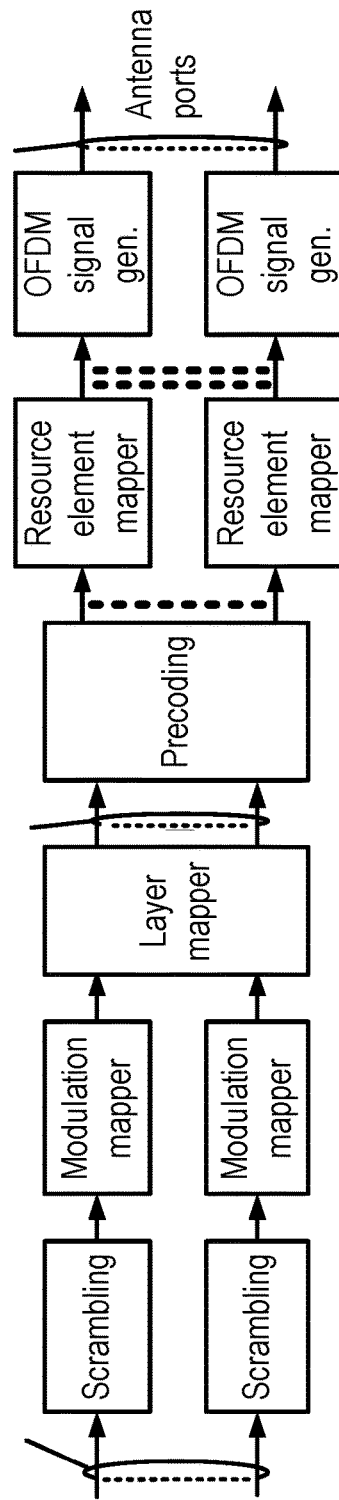
FIG. 5C Example downlink physical channel Dual-Connectivity at eNB Dual-Connectivity- two MAC entities at UE side

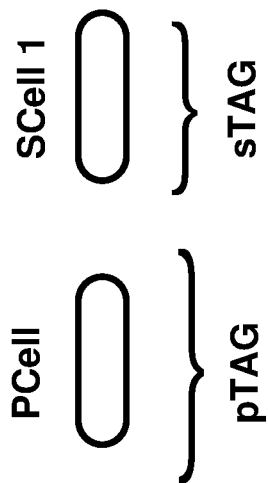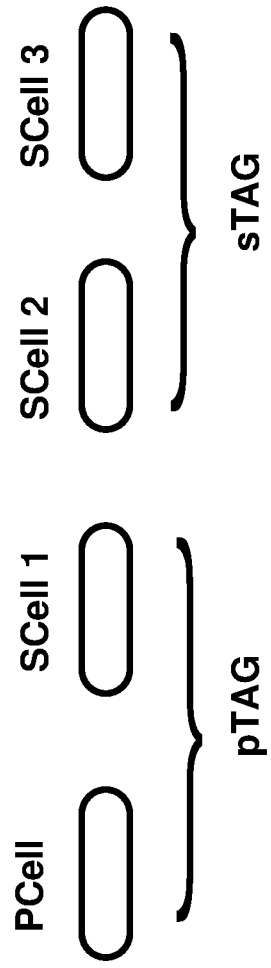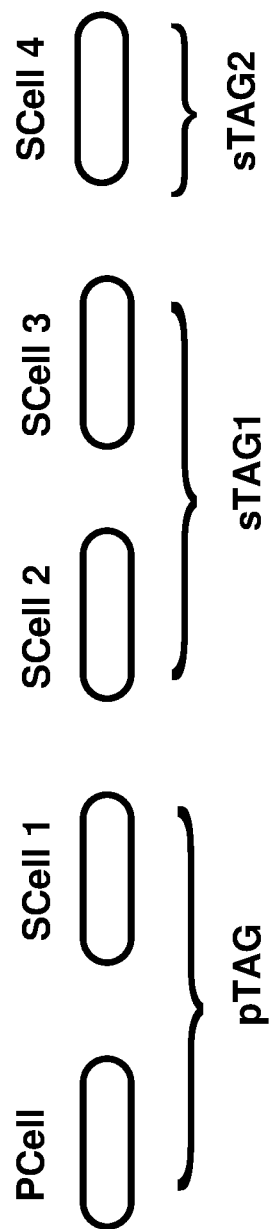
FIG. 8

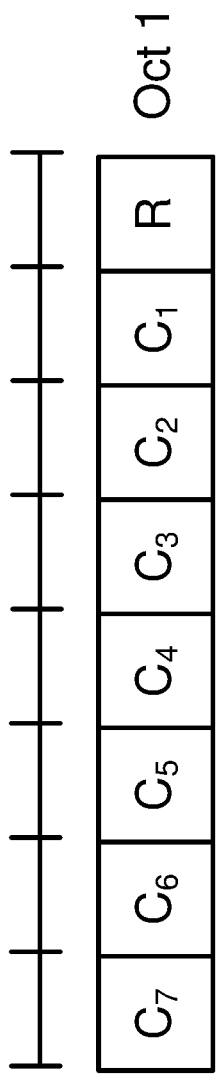
Example Activation/Deactivation MAC control element of one octet
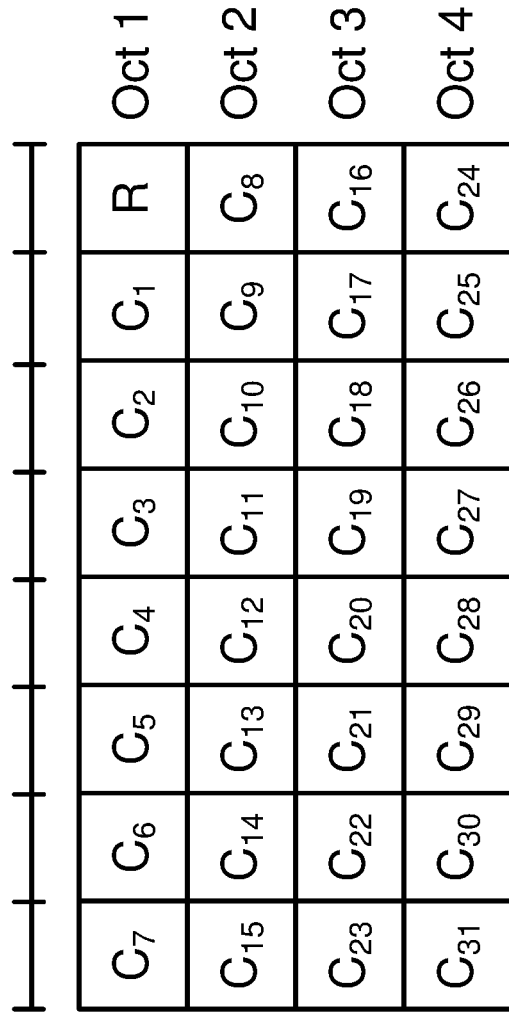
Example Activation/Deactivation MAC control element of four octets
FIG. 10

| TDD UL/DL configuration | Position of initial Semi-Persistent grant | Subframe_Offset value (ms) |
|---|---|---|
| 0 | N/A | 0 |
| 1 | Subframes 2 and 7 | 1 |
| 2 | Subframes 3 and 8 | -1 |
| 2 | Subframe 2 | 5 |
| 3 | Subframe 7 | -5 |
| 3 | Subframes 2 and 3 | 1 |
| 4 | Subframe 4 | -2 |
| 4 | Subframe 2 | 1 |
| 4 | Subframe 3 | -1 |
| 5 | N/A | 0 |
| 6 | N/A | 0 |

FIG. 11

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 13

| Cyclic Shift for DMRS Field in PDCCH/EPDCCH | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

FIG. 14

| | DCI format 0 | DCI format 1A |
|---|---|---|
| TPC command for scheduled PUSCH | set to '00' | N/A |
| Cyclic shift DM RS | set to the pre-defined value for the serving cell | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

FIG. 15

| | DCI format 0 | DCI format 1A |
|---|---|---|
| TPC command for scheduled PUSCH | set to '00' | N/A |
| Cyclic shift DM RS | set to the pre-defined value for the serving cell | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

FIG. 16

|  | DCI format 0 | DCI format 1/1A | DCI format 2/2A/2B/2C/2D |
|---|---|---|---|
| TPC command for scheduled PUSCH | set to '00' | N/A | N/A |
| Cyclic shift DM RS | set to the same value as 'carrier indicator field' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

FIG. 17

|  | DCI format 0 | DCI format 1A |
|---|---|---|
| TPC command for scheduled PUSCH | set to '00' | N/A |
| Cyclic shift DM RS | set to the same value as 'carrier indicator field' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '1111' |
| Redundancy version | N/A | set to '00' |
| Resource block assignment | N/A | Set to all '1's |

FIG. 18

|  | DCI format 0 | DCI format 1/1A | DCI format 2/2A/2B/2C/2D |
|---|---|---|---|
| TPC command for scheduled PUSCH | set to '00' | N/A | N/A |
| Cyclic shift DM RS | set to the RRC configured value for the serving cell | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

FIG. 19

|  | DCI format 0 | DCI format 1A |
|---|---|---|
| TPC command for scheduled PUSCH | set to '00' | N/A |
| Cyclic shift DM RS | set to the RRC configured value for the serving cell | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

FIG. 20

|  | DCI format 0 | DCI format 1/1A | DCI format 2/2A/2B/2C/2D |
|---|---|---|---|
| TPC command for scheduled PUSCH | set to '00' | N/A | N/A |
| Cyclic shift DM RS | Set to '000' if first RNTI, otherwise do not consider for validation | N/A | |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

FIG. 22

| | DCI format 0 | DCI format 1A |
|---|---|---|
| TPC command for scheduled PUSCH | set to '00' | N/A |
| Cyclic shift DM RS | Set to '000' if first RNTI, otherwise do not consider this field | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

FIG. 23

| Carrier Field in PDCCH/EPDCCH | $n_{CIF}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

DEACTIVATION TIMER IN A WIRELESS DEVICE AND WIRELESS NETWORK

CROSS-REFERENCE TO RELATED APPLICATIONS

This application claims the benefit of U.S. Provisional Application No. 62/371,792, filed Aug. 7, 2016 and U.S. Provisional Application No. 62/372,643, filed Aug. 9, 2016 which are hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 10 is an example diagram depicting Activation/Deactivation MAC control elements as per an aspect of an embodiment of the present disclosure.

FIG. 11 is an example diagram depicting example subframe offset values as per an aspect of an embodiment of the present disclosure.

FIGS. 13 and 14 are example tables for determining a PHICH resource as per an aspect of an embodiment of the present disclosure.

FIG. 15 is an example mapping between Cyclic Shift for DMRS field in PDCCH/EPDCCH and $n_{DMRS}$ as per an aspect of an embodiment of the present disclosure.

FIG. 16 is an example field values for validation of a grant as per an aspect of an embodiment of the present disclosure.

FIG. 17 is an example field values for validation of a grant as per an aspect of an embodiment of the present disclosure.

FIG. 18 is an example field values for validation of a grant as per an aspect of an embodiment of the present disclosure.

FIG. 19 is an example field values for validation of a grant as per an aspect of an embodiment of the present disclosure.

FIG. 20 is an example field values for validation of a grant as per an aspect of an embodiment of the present disclosure.

FIG. 22 is an example field values for validation of a grant as per an aspect of an embodiment of the present disclosure.

FIG. 23 is an example field values for validation of a grant as per an aspect of an embodiment of the present disclosure.

FIG. 24 is an example mapping between carrier field in PDCCH/EPDCH and $n_{CIF}$ as per an aspect of an embodiment of the present disclosure.

DETAILED DESCRIPTION OF EMBODIMENTS

Figure 1:
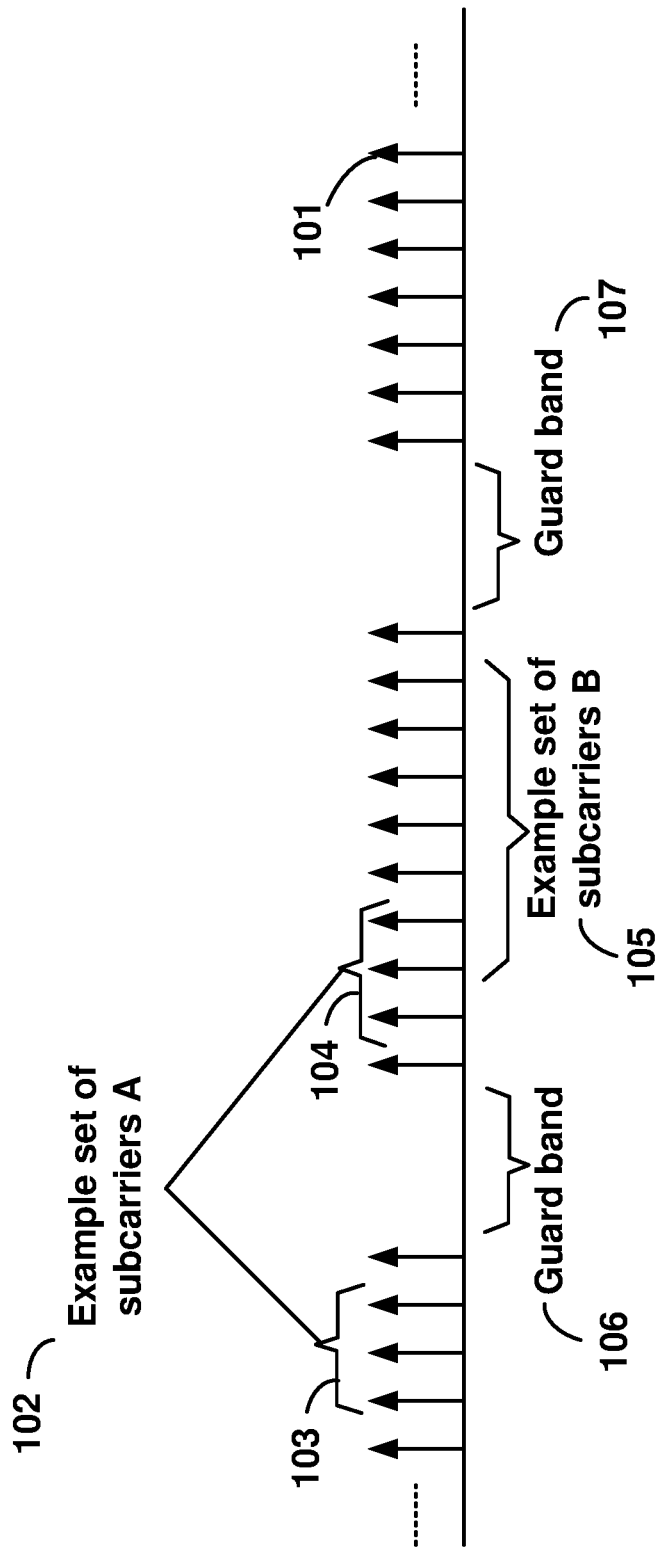
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:

| | |
|---|---|
| ASIC | application-specific integrated circuit |
| BPSK | binary phase shift keying |
| CA | carrier aggregation |
| CSI | channel state information |
| CDMA | code division multiple access |
| CSS | common search space |
| CPLD | complex programmable logic devices |
| CC | component carrier |
| DL | downlink |
| DCI | downlink control information |
| DC | dual connectivity |
| EPC | evolved packet core |
| E-UTRAN | evolved-universal terrestrial radio access network |
| FPGA | field programmable gate arrays |
| FDD | frequency division multiplexing |
| HDL | hardware description languages |
| HARQ | hybrid automatic repeat request |
| IE | information element |
| LAA | licensed assisted access |
| LTE | long term evolution |
| MCG | master cell group |
| MeNB | master evolved node B |
| MIB | master information block |
| MAC | media access control |
| MAC | media access control |
| MME | mobility management entity |
| NAS | non-access stratum |
| OFDM | orthogonal frequency division multiplexing |
| PDCP | packet data convergence protocol |
| PDU | packet data unit |
| PHY | physical |
| PDCCH | physical downlink control channel |

-continued

| | |
|---|---|
| PHICH | physical HARQ indicator channel |
| PUCCH | physical uplink control channel |
| PUSCH | physical uplink shared channel |
| PCell | primary cell |
| PCell | primary cell |
| PCC | primary component carrier |
| PSCell | primary secondary cell |
| pTAG | primary timing advance group |
| QAM | quadrature amplitude modulation |
| QPSK | quadrature phase shift keying |
| RBG | Resource Block Groups |
| RLC | radio link control |
| RRC | radio resource control |
| RA | random access |
| RB | resource blocks |
| SCC | secondary component carrier |
| SCell | secondary cell |
| Scell | secondary cells |
| SCG | secondary cell group |
| SeNB | secondary evolved node B |
| sTAGs | secondary timing advance group |
| SDU | service data unit |
| S-GW | serving gateway |
| SRB | signaling radio bearer |
| SC-OFDM | single carrier-OFDM |
| SFN | system frame number |
| SIB | system information block |
| TAI | tracking area identifier |
| TAT | time alignment timer |
| TDD | time division duplexing |
| TDMA | time division multiple access |
| TA | timing advance |
| TAG | timing advance group |
| TB | transport block |
| UL | uplink |
| UE | user equipment |
| VHDL | VHSIC hardware description language |

Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
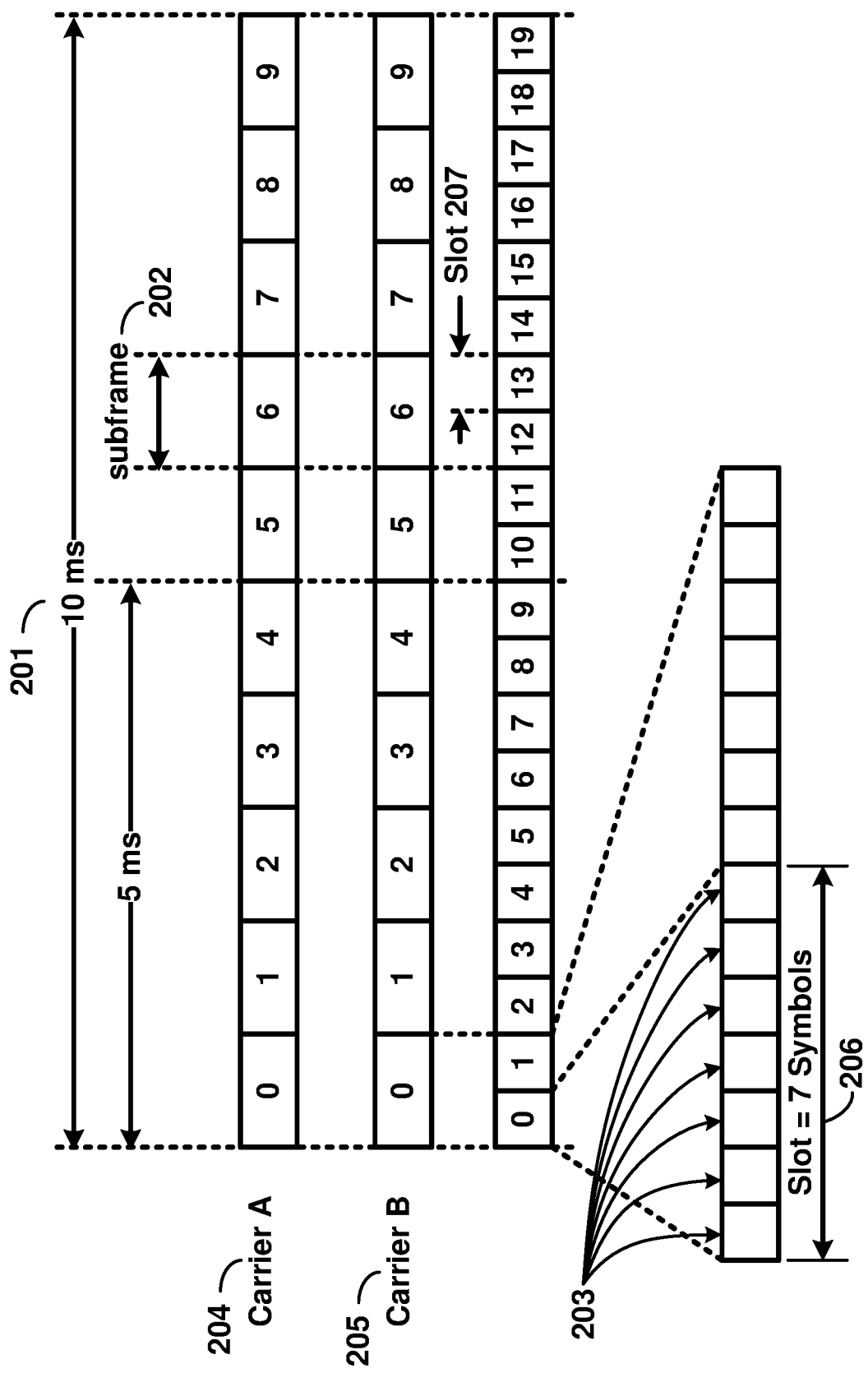
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
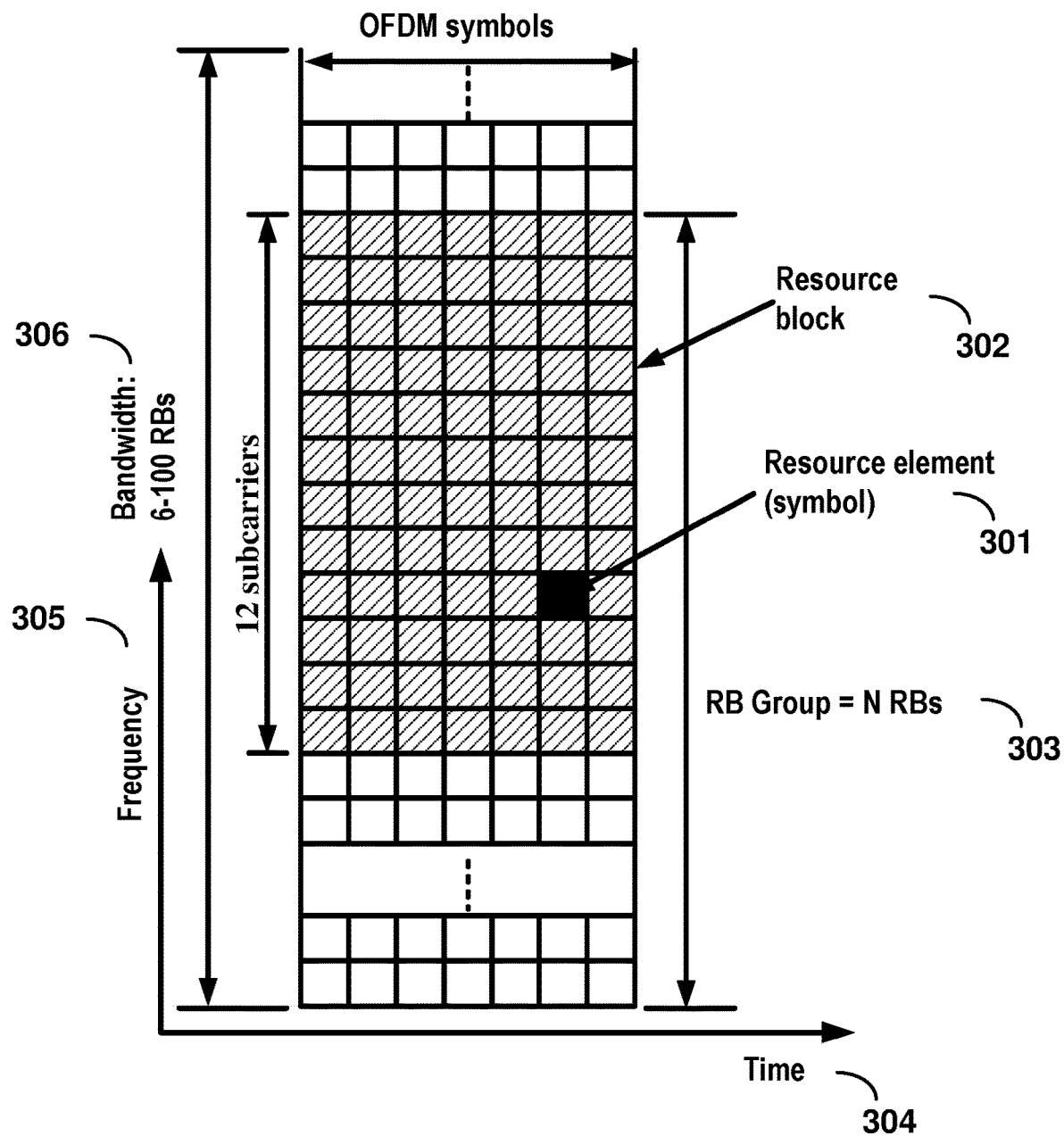
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
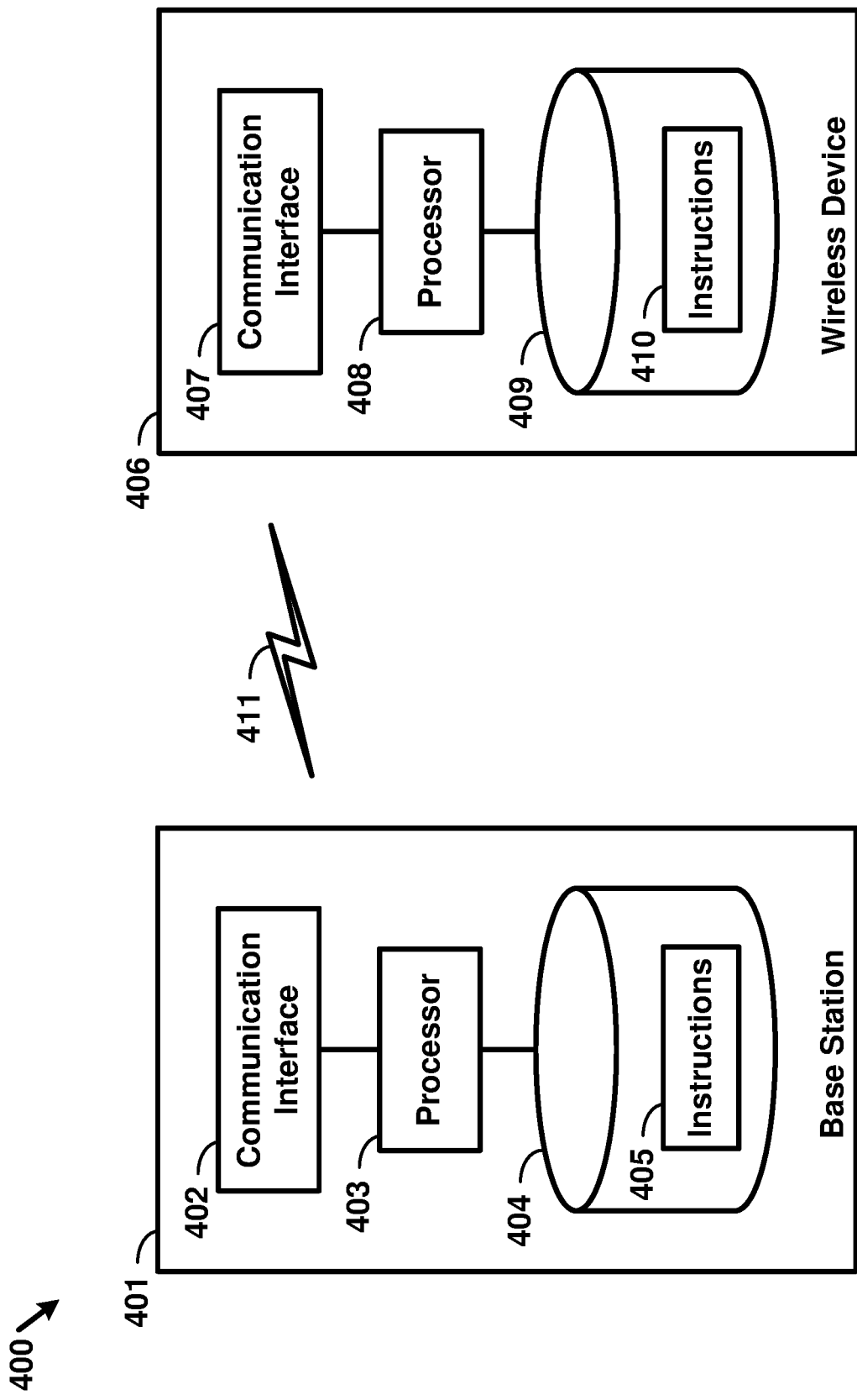
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
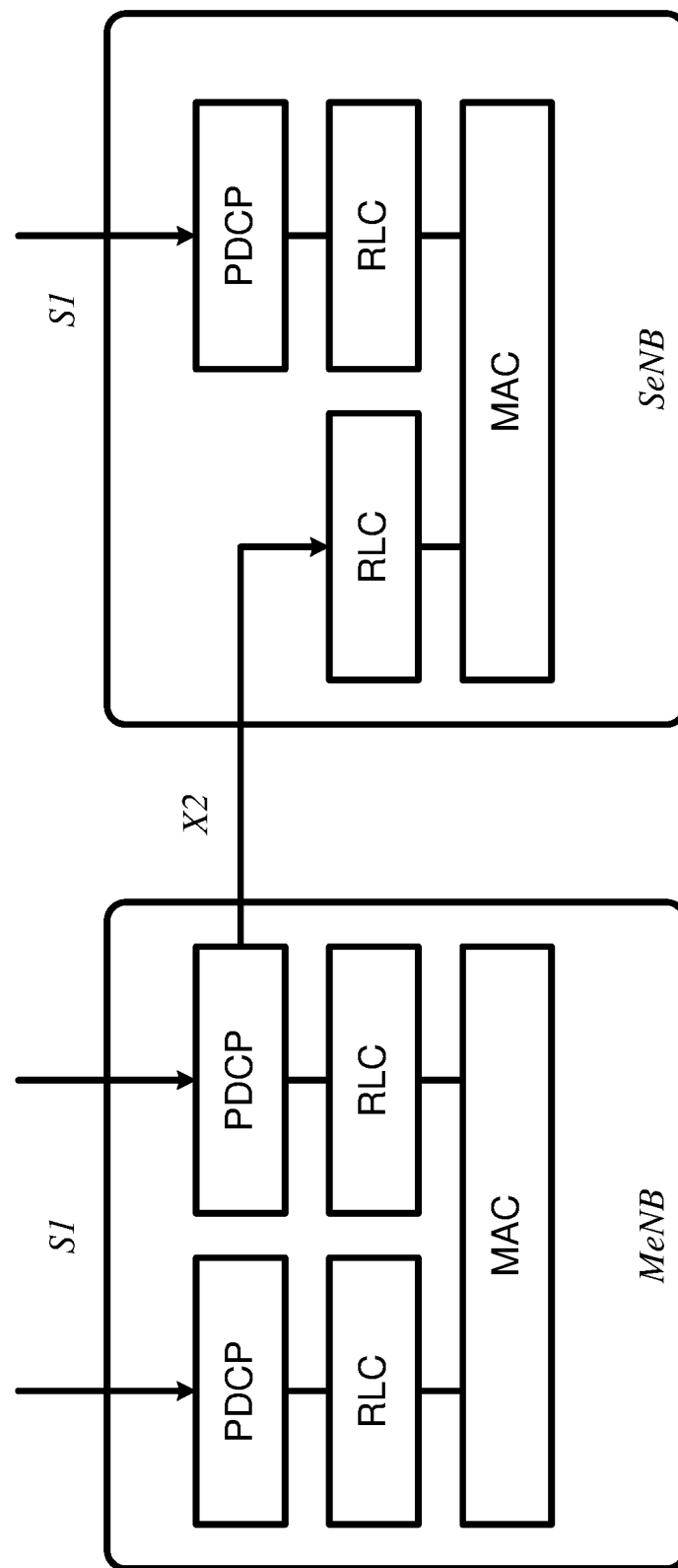
FIG. 6 is an example diagram for a protocol structure with CA and DC as per an aspect of an embodiment of the present disclosure.
Figure 7:
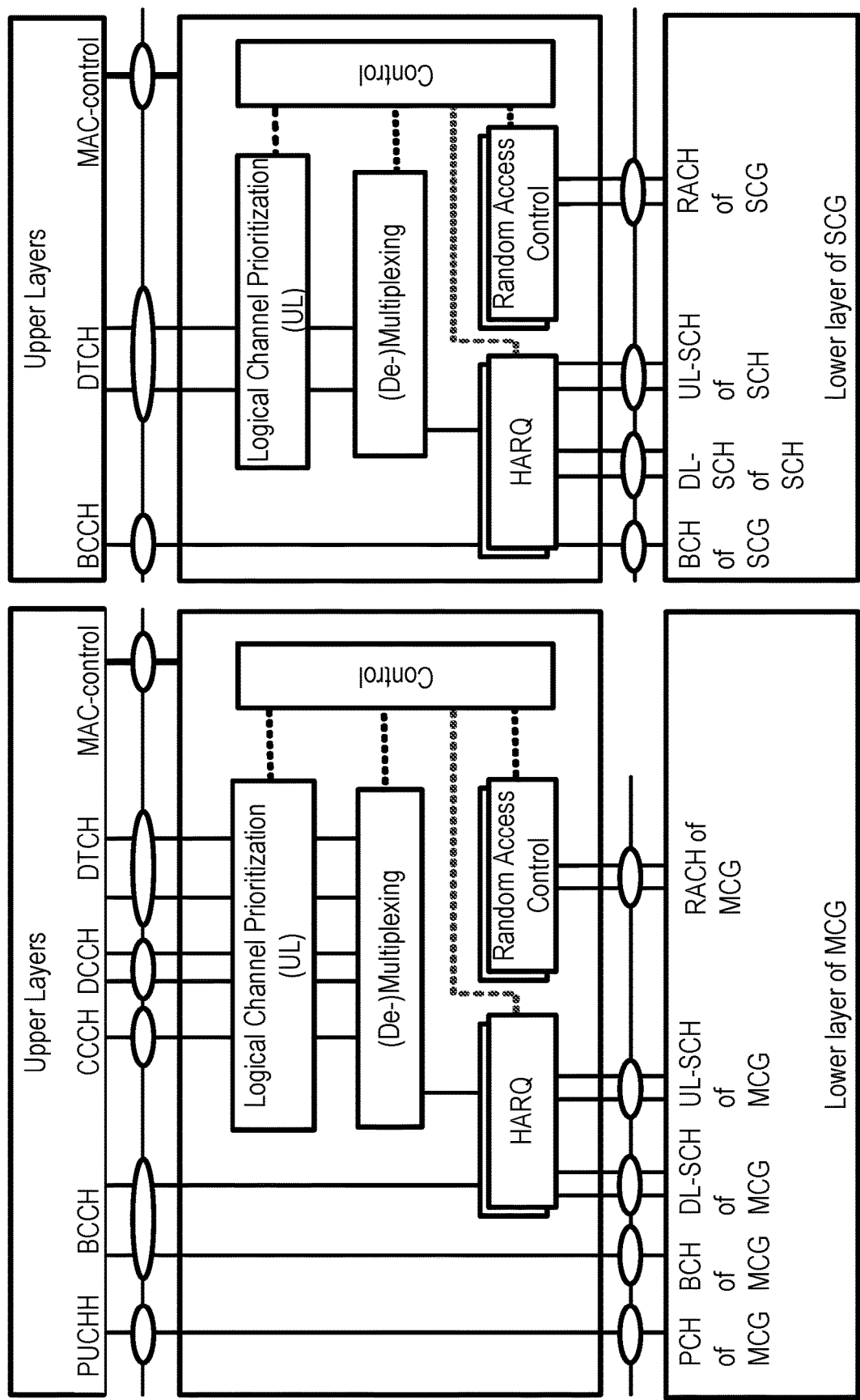
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random-access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
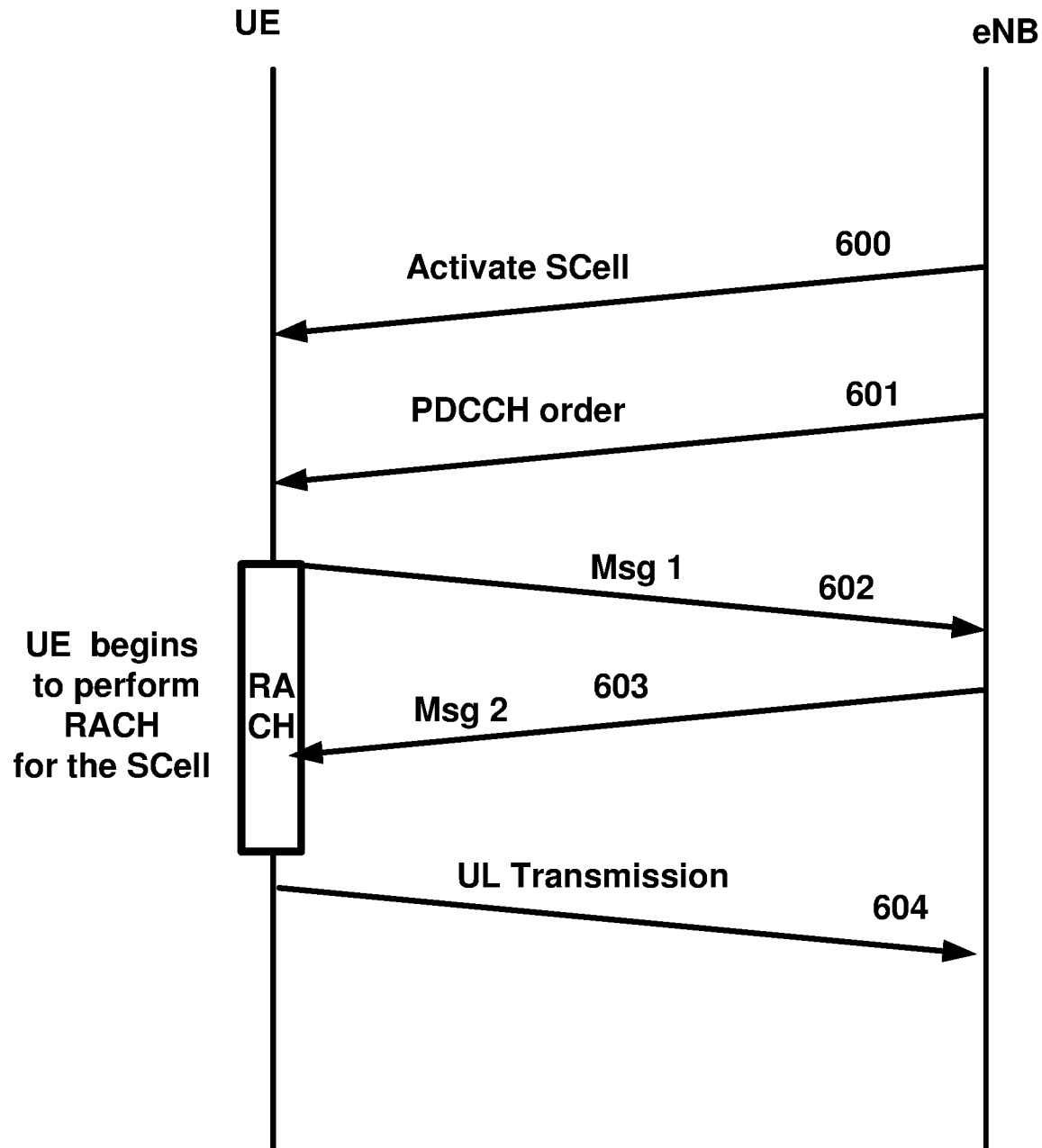
FIG. 9 is an example message flow in a random-access process in a secondary TAG as per an aspect of an embodiment of the present disclosure.

FIG. 9 is an example message flow in a random-access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random-access procedure. This may involve a UE transmitting a random-access preamble and an eNB responding with an initial TA command NTA (amount of timing advance) within a random-access response window. The start of the random-access preamble may be aligned with the start of a corresponding uplink subframe at the UE assuming NTA=0. The eNB may estimate the uplink timing from the random-access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCell-ToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random-Access Response message for a serving cell belonging to a TAG and/or if the Random-Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

In an example, the MAC entity may be configured with one or more SCells. In an example, the network may activate and/or deactivate the configured SCells. The SpCell may always be activated. The network may activate and deactivates the SCell(s) by sending the Activation/Deactivation MAC control element. The MAC entity may maintain a sCellDeactivationTimer timer for a configured SCell. Upon the expiry of sCellDeactivationTimer timer, the MAC entity may deactivate the associated SCell. In an example, the same initial timer value may apply to each instance of the sCellDeactivationTimer and it may be configured by RRC. The configured SCells may initially be deactivated upon addition and after a handover. The configured SCG SCells may initially be deactivated after a SCG change.

In an example, if the MAC entity receives an Activation/Deactivation MAC control element in a TTI activating a SCell, the MAC entity may, in a TTI according to the timing defined below, activate the SCell and apply normal SCell operation including SRS transmissions on the SCell, CQI/PMI/RI/PTI/CRI reporting for the SCell, PDCCH monitoring on the SCell, PDCCH monitoring for the SCell and PUCCH transmissions on the SCell, if configured. The MAC entity may start or restart the sCellDeactivationTimer associated with the SCell and trigger power headroom report (PHR). In an example, if the MAC entity receives an Activation/Deactivation MAC control element in a TTI deactivating a SCell or if the sCellDeactivationTimer associated with an activated SCell expires in the TTI, the MAC entity may, in a TTI according to the timing defined below, deactivate the SCell, stop the sCellDeactivationTimer associated with the SCell and flush all HARQ buffers associated with the SCell.

In an example, when a UE receives an activation command for a secondary cell in subframe n, the corresponding actions above may be applied no later than the minimum requirements and no earlier than subframe n+8, except for the actions related to CSI reporting on a serving cell which may be active in subframe n+8 and the actions related to the sCellDeactivationTimer associated with the secondary cell which may be applied in subframe n+8. The actions related to CSI reporting on a serving cell which is not active in subframe n+8 may be applied in the earliest subframe after n+8 in which the serving cell is active.

In an example, when a UE receives a deactivation command for a secondary cell or the sCellDeactivationTimer associated with the secondary cell expires in subframe n, the corresponding actions above may apply no later than the minimum requirement except for the actions related to CSI reporting on a serving cell which is active which may be applied in subframe n+8.

In an example, if the PDCCH on the activated SCell indicates an uplink grant or downlink assignment or if the PDCCH on the Serving Cell scheduling an activated SCell indicates an uplink grant or a downlink assignment for the activated SCell, the MAC entity may restart the sCellDeactivationTimer associated with the SCell.

In an example, if a SCell is deactivated, the UE may not transmit SRS on the SCell, may not report CQI/PMI/RI/PTI/CRI for the SCell, may not transmit on UL-SCH on the SCell, may not transmit on RACH on the SCell, may not monitor the PDCCH on the SCell, may not monitor the PDCCH for the SCell and may not transmit PUCCH on the SCell.

In an example, the HARQ feedback for the MAC PDU containing Activation/Deactivation MAC control element may not be impacted by PCell interruption due to SCell activation/deactivation. In an example, when SCell is deactivated, the ongoing Random-Access procedure on the SCell, if any, may be aborted.

In an example, the Activation/Deactivation MAC control element of one octet may be identified by a MAC PDU subheader with LCID 11000. FIG. 10 shows example Activation/Deactivation MAC control elements. The Activation/Deactivation MAC control element may have a fixed size and may consist of a single octet containing seven C-fields and one R-field. Example Activation/Deactivation MAC control element with one octet is shown in FIG. 10. The Activation/Deactivation MAC control element may have a fixed size and may consist of four octets containing 31 C-fields and one R-field. Example Activation/Deactivation MAC control element of four octets is shown in FIG. 10. In an example, for the case with no serving cell with a serving cell index (ServCellIndex) larger than 7, Activation/Deactivation MAC control element of one octet may be applied, otherwise Activation/Deactivation MAC control element of four octets may be applied. The fields in an Activation/Deactivation MAC control element may be interpreted as follows. Ci: if there is an SCell configured with SCellIndex i, this field may indicate the activation/deactivation status of the SCell with SCellIndex i, else the MAC entity may ignore the Ci field. The Ci field may be set to "1" to indicate that the SCell with SCellIndex i is activated. The Ci field is set to "0" to indicate that the SCell with SCellIndex i is deactivated. R: Reserved bit, set to "0".

Figure 12:
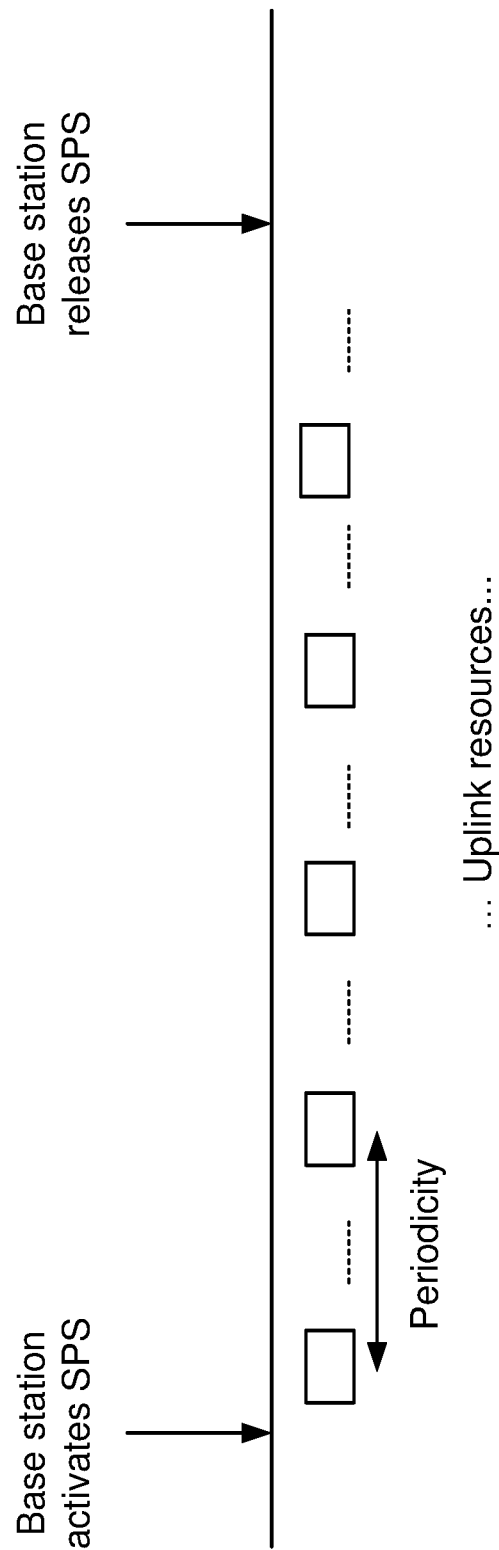
FIG. 12 is an example diagram depicting example uplink SPS activation and release as per an aspect of an embodiment of the present disclosure.

A base station may provide a periodic resource allocation. In a periodic resource allocation, an RRC message and/or a DCI may activate or release a periodic resource allocation. The UE may be allocated in downlink and/or uplink periodic radio resources without the need for transmission of additional grants by the base station. The periodic resource allocation may remain activated until it is released. The periodic resource allocation for example, may be called, semi-persistent scheduling or grant-free scheduling, or periodic multi-subframe scheduling, and/or the like. In this specification, the example term semi-persistent scheduling is mostly used, but other terms may also be equally used to refer to periodic resource allocation, e.g. grant-free scheduling. An example periodic resource allocation activation and release is shown in FIG. 12.

In the downlink, a base station may dynamically allocate resources (PRBs and MCS) to UEs at a TTI via the C-RNTI on PDCCH(s). A UE may monitor the PDCCH(s) in order to find possible allocation when its downlink reception is enabled (e.g. activity governed by DRX when configured). When CA is configured, the same C-RNTI applies to serving cells. Base station may also allocate semi-persistent downlink resources for the first HARQ transmissions to UEs. In an example, an RRC message may indicate the periodicity of the semi-persistent downlink grant. In an example, a PDCCH DCI may indicate whether the downlink grant is a semi-persistent one e.g. whether it can be implicitly reused in the following TTIs according to the periodicity defined by RRC.

In an example, when required, retransmissions may be explicitly signaled via the PDCCH(s). In the sub-frames where the UE has semi-persistent downlink resource, if the UE cannot find its C-RNTI on the PDCCH(s), a downlink transmission according to the semi-persistent allocation that the UE has been assigned in the TTI is assumed. Otherwise, in the sub-frames where the UE has semi-persistent downlink resource, if the UE finds its C-RNTI on the PDCCH(s), the PDCCH allocation may override the semi-persistent allocation for that TTI and the UE may not decode the semi-persistent resources.

When CA is configured, semi-persistent downlink resources may be configured for the PCell and/or SCell(s). In an example, PDCCH dynamic allocations for the PCell and/or SCell(s) may override the semi-persistent allocation.

In the uplink, a base station may dynamically allocate resources (PRBs and MCS) to UEs at a TTI via the C-RNTI on PDCCH(s). A UE may monitor the PDCCH(s) in order to find possible allocation for uplink transmission when its downlink reception is enabled (activity governed by DRX when configured). When CA is configured, the same C-RNTI applies to serving cells. In addition, a base station may allocate a semi-persistent uplink resource for the first HARQ transmissions and potentially retransmissions to UEs. In an example, an RRC may define the periodicity of the semi-persistent uplink grant. PDCCH may indicate whether the uplink grant is a semi-persistent one e.g. whether it can be implicitly reused in the following TTIs according to the periodicity defined by RRC.

In an example, in the sub-frames where the UE has semi-persistent uplink resource, if the UE cannot find its C-RNTI on the PDCCH(s), an uplink transmission according to the semi-persistent allocation that the UE has been assigned in the TTI may be made. The network may perform decoding of the pre-defined PRBs according to the pre-defined MCS. Otherwise, in the sub-frames where the UE has semi-persistent uplink resource, if the UE finds its C-RNTI on the PDCCH(s), the PDCCH allocation may override the persistent allocation for that TTI and the UE's transmission follows the PDCCH allocation, not the semi-persistent allocation. Retransmissions may be either implicitly allocated in which case the UE uses the semi-persistent uplink allocation, or explicitly allocated via PDCCH(s) in which case the UE does not follow the semi-persistent allocation.

Vehicular communication services, represented by V2X services, may comprise of the following different types: V2V, V2I, V2N and/or V2P. V2X services may be provided by PC5 interface (sidelink) and/or Uu interface (UE to base station interface). Support of V2X services via PC5 interface may be provided by V2X sidelink communication, which is a mode of communication whereby UEs may communicate with each other directly over the PC5 interface. This communication mode may be supported when the UE is served by E-UTRAN and when the UE is outside of E-UTRA coverage. The UEs authorized to be used for V2X services may perform V2X sidelink communication.

The user plane protocol stack and functions for sidelink communication may be used for V2X sidelink communication. In order to assist the eNB to provide sidelink resources, the UE in RRC_CONNECTED may report geographical location information to the eNB. The eNB may configure the UE to report the complete UE geographical location information based on periodic reporting via the existing measurement report signaling.

In an example, for V2X communication, k SPS (e.g. k=8 or 16, etc.) configurations with different parameters may be configured by eNB and SPS configurations may be active at the same time. The activation/deactivation of an SPS configuration may signaled via a PDCCH DCI and/or an RRC message by eNB. The logical channel prioritization for Uu may be used.

For V2X communication, a UE may provide UE assistance information to an eNB. Reporting of UE assistance information may be configured by eNB transmitting one or more RRC messages. The UE assistance information may include parameters related to the SPS configuration. Triggering of UE assistance information transmission may be left to UE implementation. For instance, the UE may be allowed to report the UE assistance information when change in estimated periodicity and/or timing offset of packet arrival occurs. For V2X communication via Uu, SR mask as per legacy mechanism may be used.

In an example, for unicast transmission of V2X messages, the V2X message may be delivered via Non-GBR bearers as well as GBR bearers. In order to meet the QoS requirement for V2X message delivery for V2X services, a Non-GBR QCI value and a GBR QCI value for V2X messages may be used. For broadcasting V2X messages, SC-PTM or MBSFN transmission may be used. In order to reduce SC-PTM/MBSFN latency, shorter (SC-)MCCH repetition period for SC-PTM/MBSFN, modification period for SC-PTM/MBSFN and MCH scheduling period for MBSFN may be supported. Reception of downlink broadcast of V2X messages in different carriers/PLMNs may be supported by having multiple receiver chains in the UE.

In an example embodiment, various DCI formats may be used for SPS scheduling. For example, the DCI format 0 may be used for uplink SPS. In an example, the fields for DCI format 0 may comprise one or more of the following fields: Carrier indicator e.g. 0 or 3 bits. Flag for format0/format1A differentiation e.g. 1 bit, where value 0 may indicate format 0 and value 1 may indicate format 1A. Frequency hopping flag, e.g. 1 bit. This field may be used as the MSB of the corresponding resource allocation field for resource allocation type 1. Resource block assignment and hopping resource allocation, e.g. $\lfloor \log_2(N_{RB}^{UL}(N_{RB}^{UL}+1)/2) \rfloor$ bits where $N_{RB}^{UL}$ may be the uplink bandwidth configuration in number of resource blocks. Modulation and coding scheme and redundancy version e.g. 5 bits. New data indicator e.g. 1 bit. TPC command for scheduled PUSCH e.g. 2 bits. Cyclic shift for DM RS and OCC index e.g. 3 bits. UL index e.g. 2 bits (this field may be present for TDD operation with uplink-downlink configuration 0). Downlink Assignment Index (DAI) e.g. 2 bits (this field may be present for cases with TDD primary cell and either TDD operation with uplink-downlink configurations 1-6 or FDD operation). CSI request e.g. 1, 2 or 3 bits. The 2-bit field may apply to UEs configured with no more than five DL cells and to UEs that are configured with more than one DL cell and when the corresponding DCI format is mapped onto the UE specific search space given by the C-RNTI, UEs that are configured by higher layers with more than one CSI process and when the corresponding DCI format is mapped onto the UE specific search space given by the C-RNTI, UEs that are configured with two CSI measurement sets by higher layers with the parameter csi-MeasSubframeSet, and when the corresponding DCI format is mapped onto the UE specific search space given by the C-RNTI; the 3-bit field may apply to the UEs that are configured with more than five DL cells and when the corresponding DCI format is mapped onto the UE specific search space given by the C-RNTI; otherwise the 1-bit field may apply. SRS request e.g. 0 or 1 bit. This field may be present in DCI formats scheduling PUSCH which are mapped onto the UE specific search space given by the C-RNTI. Resource allocation type e.g. 1 bit. This field may be present if $N_{RB}^{UL} \leq N_{RB}^{UL}$ where $N_{RB}^{UL}$ may be the uplink bandwidth configuration in number of resource blocks and $N_{RB}^{DL}$ may be the downlink bandwidth configuration in number of resource blocks. In example, one or more fields may be added to a DCI for SPS to enhance SPS scheduling process. In example, one or more of the fields may be replaced with new fields, or new values, or may be interpreted differently for SPS to enhance SPS scheduling process.

A base station may transmit one or more RRC messages to a wireless device to configure SPS. The one or more RRC messages may comprise SPS configuration parameters. Example SPS configuration parameters are presented below. In example, one or more parameters may be added to an RRC message for SPS to enhance SPS scheduling process. In example, one or more some of the parameters for an SPS in an RRC message may be replaced with new parameters, or new values, or may be interpreted differently for SPS to enhance SPS scheduling process. In an example, IE SPS-Config may be used by RRC to specify the semi-persistent scheduling configuration. In an example, the IE SPS-Config may be SEQUENCE {semiPersistSchedC-RNTI: C-RNTI; sps-ConfigDL: SPS-ConfigDL; sps-ConfigUL: SPS-ConfigUL}. SPS-ConfigDL IE may comprise semiPersistSchedIntervalDL, numberOfConfSPS-Processes, n1PUCCH-AN-PersistentList, twoAntennaPortActivated, n1PUCCH-AN-PersistentListP1, and/or other parameters. In an example, SPS-ConfigUL IE may comprise semiPersistSchedIntervalUL, implicitReleaseAfter, p0-NominalPUSCH-Persistent, p0-UE-PUSCH-Persistent, twoIntervalsConfig, p0-PersistentSubframeSet2, p0-NominalPUSCH-PersistentSubframeSet2, p0-UE-PUSCH-and/or PersistentSubframeSet2, and/or other parameters.

In an example, one or more RRC configuration parameters may comprise one or more of the following parameters to configure SPS for a wireless device. In an example, SPS configuration may include MCS employed for packet transmission of an MCS grant. In an example, implicitReleaseAfter IE may be the number of empty transmissions before implicit release, e.g. value e2 may corresponds to 2 transmissions, e3 may correspond to 3 transmissions and so on. In an example, n1PUCCH-AN-PersistentList IE, n1PUCCH-AN-PersistentListP1 IE may be the List of parameter: $n_{PUCCH}^{(1,p)}$ for antenna port P0 and for antenna port P1 respectively. Field n1-PUCCH-AN-PersistentListP1 IE may be applicable if the twoAntennaPortActivated-PUCCH-Format1a1b in PUCCH-ConfigDedicated-v1020 is set to true. Otherwise the field may not be configured.

In an example, numberOfConfSPS-Processes IE may be the number of configured HARQ processes for Semi-Persistent Scheduling. In an example, p0-NominalPUSCH-Persistent IE may be the parameter: $P_{O\_NOMINAL\_PUSCH}(0)$ used in PUSCH power control with unit in dBm and step 1. This field may be applicable for persistent scheduling. If choice setup is used and p0-Persistent is absent, the value of p0-NominalPUSCH for p0-NominalPUSCH-Persistent may be applied. If uplink power control subframe sets are configured by tpc-SubframeSet, this field may apply for uplink power control subframe set 1.

In an example, p0-NominalPUSCH-PersistentSubframeSet2 IE may be the parameter: $P_{O\_NOMINAL\_PUSCH}(0)$ used in PUSCH power control with unit in dBm and step 1. This field may be applicable for persistent scheduling. If p0-PersistentSubframeSet2-r12 is not configured, the value of p0-NominalPUSCH-SubframeSet2-r12 may be applied for p0-NominalPUSCH-PersistentSubframeSet2. E-UTRAN may configure this field if uplink power control subframe sets are configured by tpc-SubframeSet, in which case this field may apply for uplink power control subframe set 2. In an example, p0-UE-PUSCH-Persistent IE may be the parameter: $P_{O\_UE\_PUSCH}(0)$ used in PUSCH power control with unit in dB. This field may be applicable for persistent scheduling. If choice setup is used and p0-Persistent is absent, the value of p0-UE-PUSCH may be applied for p0-UE-PUSCH-Persistent. If uplink power control subframe sets are configured by tpc-SubframeSet, this field may be applied for uplink power control subframe set 1. In an example, p0-UE-PUSCH-PersistentSubframeSet2 IE may be the parameter: $P_{O\_UE\_PUSCH}(0)$ used in PUSCH power control with unit in dB. This field may be applicable for persistent scheduling. If p0-PersistentSubframeSet2-r12 is not configured, the value of p0-UE-PUSCH-SubframeSet2 may be applied for p0-UE-PUSCH-PersistentSubframeSet2. E-UTRAN may configure this field if uplink power control subframe sets are configured by tpc-SubframeSet, in which case this field may apply for uplink power control subframe set 2.

In an example, semiPersistSchedC-RNTI IE may be Semi-Persistent Scheduling C-RNTI. In an example, semiPersistSchedIntervalDL IE may be Semi-persistent scheduling interval in downlink. Its value may be in number of sub-frames. Value sf10 may correspond to 10 sub-frames, sf20 may correspond to 20 sub-frames and so on. For TDD, the UE may round this parameter down to the nearest integer (of 10 sub-frames), e.g. sf10 may correspond to 10 sub-frames, sf32 may correspond to 30 sub-frames, sf128 may correspond to 120 sub-frames. In an example, semiPersistSchedIntervalUL IE may be semi-persistent scheduling interval in uplink. Its value in number of sub-frames. Value sf10 may correspond to 10 sub-frames, sf20 may correspond to 20 sub-frames and so on. For TDD, the UE may round this parameter down to the nearest integer (of 10 sub-frames), e.g. sf10 may correspond to 10 sub-frames, sf32 may correspond to 30 sub-frames, sf128 may correspond to 120 sub-frames. In an example, twoIntervalsConfig IE may be trigger of two-intervals-Semi-Persistent Scheduling in uplink. If this field is present, two-intervals-SPS is enabled for uplink. Otherwise, two-intervals-SPS is disabled.

In an example, multiple downlink or uplink SPS may be configured for a cell. In an example, multiple SPS RNTIs may be configured when a plurality of SPSs is configured. A base station may transmit to a UE at least one RRC message comprising SPS configuration parameters comprising a first SPS RNTI and a second SPS RNTI. For example, a first SPS RNTI may be configured for a first SPS configuration (e.g. for VOIP), and a second SPS RNTI may be configured for a second SPS configuration (e.g. for V2X communications). The UE may monitor PDCCH for at least DCIs corresponding to the first SPS RNTI and the second SPS RNTI.

When Semi-Persistent Scheduling is enabled by RRC, at least one or more of the following information may be provided: Semi-Persistent Scheduling C-RNTI(s); Uplink Semi-Persistent Scheduling interval semiPersistSchedIntervalUL, number of empty transmissions before implicit release implicitReleaseAfter, if Semi-Persistent Scheduling is enabled for the uplink; Whether twoIntervalsConfig is enabled or disabled for uplink, for TDD; Downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink; and/or other parameters.

When Semi-Persistent Scheduling for uplink or downlink is disabled by RRC, the corresponding configured grant or configured assignment may be discarded.

In an example, after a Semi-Persistent downlink assignment is configured, the MAC entity may consider sequentially that the Nth assignment occurs in the subframe for which: (10*SFN+subframe)=[(10*SFNstart time+subframestart time)+N*semiPersistSchedIntervalDL] modulo 10240. Where SFNstart time and subframestart time may be the SFN and subframe, respectively, at the time the configured downlink assignment were (re)initialized.

In an example, after a Semi-Persistent Scheduling uplink grant is configured, the MAC entity may: if twoIntervalsConfig is enabled by upper layer: set the Subframe_Offset according to Table below. else: set Subframe_Offset to 0. consider sequentially that the Nth grant occurs in the subframe for which: (10*SFN+subframe)=[(10*SFNstart time+subframestart time)+N*semiPersistSchedIntervalUL+Subframe_Offset*(N modulo 2)] modulo 10240. Where SFNstart time and subframestart time may be the SFN and subframe, respectively, at the time the configured uplink grant were (re-)initialized. FIG. 11. shows example subframe offset values.

The MAC entity may clear the configured uplink grant immediately after implicitReleaseAfter number of consecutive MAC PDUs containing zero MAC SDUs have been provided by the Multiplexing and Assembly entity, on the Semi-Persistent Scheduling resource. Retransmissions for Semi-Persistent Scheduling may continue after clearing the configured uplink grant.

In an example embodiment, SPS configurations may be enhanced to support transmission of various V2X traffic and/or voice traffic by a UE. There is a need to support multiple SPS configurations for a UE. For example, a UE supporting V2X may need to support multiple uplink SPS configurations for transmitting various periodic (or semi-periodic) traffic and/or voice traffic in the uplink. Other examples may be provided. For example, CAM messages in V2X may be semi-periodic. In some scenarios, CAM message generation may be dynamic in terms of size, periodicity and timing. Such changes may result in misalignment between SPS timing and CAM timing. There may be some regularity in size and periodicity between different triggers. Enhanced SPS mechanisms may be beneficial to transmit V2X traffic, voice traffic, and/or the like. In an example, various SPS periodicity, for example 100 ms and 1 s may be configured.

In an example, multiple SPS configurations may be configured for UU and/or PC5 interface. An eNB may configure multiple SPS configurations for a given UE. In an example, SPS configuration specific MCS (e.g. MCS as a part of the RRC SPS-configuration) and/or SPS-configuration-specific periodicity may be configured. In an example, some of the SPS configuration parameters may be the same across multiple SPS and some other SPS configuration parameters may be different across SPS configurations. The eNB may dynamically trigger/release the different SPS-configurations employing (E)PDCCH DCIs. In an example, the multiple SPS configurations may be indicated by eNB RRC signaling. The dynamical triggering and releasing may be performed by eNB transmitting (E)PDCCH DCI to the UE employing SPS C-RNTI.

In an example embodiment, a UE may transmit UE SPS assistant information to a base station indicating that the UE does not intend and/or intend to transmit data before a transmission associated to an SPS configuration. The eNB may acknowledge the UE indication. For V2X communication, a UE may provide UE assistance information to an eNB. Reporting of UE assistance information may be configured by eNB transmitting one or more RRC messages. The UE assistance information may include parameters related to the SPS configuration. Triggering of UE assistance information transmission may be left to UE implementation. For instance, the UE may be allowed to report the UE assistance information when change in estimated periodicity and/or timing offset of packet arrival occurs. For V2X communication via Uu, SR mask as per legacy mechanism may be used.

Some example V2X messages are CAM, DENM and BSM. For Example, CAM message may have the following characteristics. Content: status (e.g. time, position, motion state, activated system), attribute (data about dimension, vehicle type and role in the road traffic). Periodicity: typical time difference between consecutive packets generation is bounded to the [0.1, 1] sec range. Length: Variable. For Example, DENM message may have the following characteristics. Content: Contain information related to a variety of events. Periodicity: Event triggers the DENM update. In between two consequent DENM updates, it is repeated with a pre-defined transmission interval. Length: Fixed until DENM update. For Example, BSM message may have the following characteristics. Content: Part I contains some of the basic vehicle state information such as the message ID, vehicle ID, vehicle latitude/longitude, speed and acceleration status. Part II contains two option data frames: VehicleSafetyExtension and VehicleStatus. Periodicity: Periodic, the periodicity may be different considering whether BSM part II is included or not and the different application type. Length: Fixed, with different message size considering whether part II exists or not.

In an example, SPS may be employed for the transmission of BSM, DENMs and CAMs. For example, the UE's speed/position/direction changes within a range. BSM may be periodic traffic with a period of 100 ms. The message size of BSM may be in the range of 132~300 Bytes without certificate and 241~409 Bytes with certificate. DENMs, once triggered, may be transmitted periodically with a given message period which may remain unchanged. The message size of the DENM may be 200~1200 Bytes. If the UE's speed/position/direction does not change or changes within a small range, the CAM generation periodicity may be fixed.

The SPS may be supported for the UL and DL VoIP transmission. In the current SPS specification, the base station may configure SPS periodicity via dedicated RRC signaling. The periodicity of VoIP packet is generally fixed.

The UE may transmit traffic associated with multiple V2X services, which may require different periodicity and packet sizes. The SPS TB size and period may be adapted to different V2X services. Multiple parallel SPS processes may be activated at the UE. The SPS processes may differ in the amount of resource blocks (RBs) allocated and/or SPS period and may correspond to different types of V2X packets. Once the AS layer of UE receives the V2X packets from upper layer, the UE may trigger V2X packet transmissions on the corresponding SPS grant. Multiple UL SPS configurations may be configured for the UE.

The eNB may configure different SPS C-RNTIs for different SPS processes of the UE. SPS activation and release mechanism may be implemented. Employing at least one or more SPS RNTIs, the eNB may trigger which SPS process is activated or released. In an example implementation, in order to support multiple SPS configurations different SPS C-RNTIs may be configured for different SPS traffic types. For example, a first SPS C-RNTI may be configured for SPS configuration to transmit voice traffic, a second SPS C-RNTI may be configured for SPS configuration to transmit a V2X traffic. An eNB may transmit one or more RRC messages comprising multiple SPS configuration parameters. The multiple SPS configuration parameters may comprise multiple SPS-RNTI parameters for multiple SPS traffic types (e.g. multiple UL SPS configurations).

The Physical Hybrid-ARQ Indicator Channel (PHICH) may be used to indicate HARQ feedback (e.g., HARQ ACK/NACK) in response to UL-SCH transmissions. In an example, to minimize the overhead and not introduce additional signaling in the uplink grants, the resource for PHICH on which a UE may expect HARQ feedback may be derived from the lowest physical resource block (PRB) index in the first slot of a corresponding PUSCH transmission and/or the demodulation reference-signal (DMRS) cyclic shift indicated in the uplink grant and/or other parameters. In an example, multiple UEs scheduled on the same set of resources (e.g., using multi-user MIMO) may receive their HARQ feedback on different PHICH resources, as the DMRS cyclic shifts indicated in their uplink grants may be different. In an example, for spatial multiplexing, where two PHICH resources may be needed, the resource for a second PHICH may be derived from the PRB index of the second resource block on which the PUSCH is transmitted.

In an example with carrier aggregation, the eNB may transmit the PHICH on the same cell that was used for transmission of the grant scheduling the corresponding PUSCH. This procedure may be beneficial from a UE power consumption perspective as the UE may only need to monitor PHICH on the cell that it monitors for uplink scheduling grants and as the PDCCH may override the PHICH to support adaptive retransmissions. For the case when no cross-carrier scheduling is used, that is, an uplink component carrier is scheduled on its corresponding downlink component carrier, different uplink component carriers may have different PHICH resources. With cross-carrier scheduling, transmissions on multiple uplink component carriers may need to be acknowledged on a single downlink component carrier. In an example, PHICH collision may be avoided by the eNB scheduler by enabling different combinations of DMRS cyclic shift and lowest PRB index in the first slot of the PUSCH transmission for the different uplink component carriers that are cross-carrier scheduled and may need to be acknowledged on a single downlink component carrier.

In an example embodiment, a UE may not be configured with multiple TAGs, or the UE may be configured with multiple TAGs and PUSCH transmissions scheduled from serving cell c in subframe n may not be scheduled by a Random-Access Response Grant corresponding to a random-access preamble transmission for a secondary cell. In an example, for PUSCH transmissions scheduled from serving cell c in subframe n, the UE may determine the corresponding PHICH resource of serving cell c in subframe $n+k_{PHICH}$. In an example, $k_{PHICH}$ may be always 4 for FDD. In an example, $k_{PHICH}$ may be 6 for FDD-TDD and serving cell c frame structure type 2 and the PUSCH transmission may be for another serving cell with frame structure type 1. In an example, $k_{PHICH}$ may be 4 for FDD-TDD and serving cell c frame structure type 1 and the PUSCH transmission may be for a serving cell with frame structure type 1. In an example, $k_{PHICH}$ may be given in FIG. 13 for FDD-TDD and serving cell c frame structure type 1 and the PUSCH transmission may be for another serving cell with frame structure type 2.

In an example, for TDD, the UE may not be configured with EIMTA-MainConfigServCell-r12 for any serving cell. The UE may be configured with one serving cell, or the UE is configured with more than one serving cell and the TDD UL/DL configuration of all the configured serving cells may be the same. In an example, for PUSCH transmissions scheduled from serving cell c in subframe n, the UE may determine the corresponding PHICH resource of serving cell c in subframe $n+k_{PHICH}$, where $k_{PHICH}$ may be given in FIG. 13.

In an example embodiment, for TDD, a UE may not be configured with more than one serving cell. The TDD UL/DL configuration of at least two configured serving cells may not be the same. In an example, the UE may be configured with EIMTA-MainConfigServCell-r12 for at least one serving cell. In an example, for FDD-TDD and serving cell c frame structure type 2, for PUSCH transmissions scheduled from serving cell c in subframe n, the UE may determine the corresponding PHICH resource of serving cell c in subframe $n+k_{PHICH}$, where $k_{PHICH}$ is given in FIG. 13, where the TDD UL/DL Configuration may refer to the UL-reference UL/DL configuration of the serving cell corresponding to the PUSCH transmission.

In an example, a UE may be configured with multiple TAGs. PUSCH transmissions on subframe n for a secondary cell c scheduled by a Random-Access Response grant may be corresponding to a random-access preamble transmission for the secondary cell c.

In an example, for TDD, the UE may not be configured with more than one serving cell and the TDD UL/DL configuration of at least two configured serving cells may not be the same. In an example, the UE may be configured with EIMTA-MainConfigServCell-r12 for at least one serving cell, or for FDD-TDD and serving cell c frame structure type 2, the TDD UL/DL Configuration may refer to the UL-reference UL/DL configuration of secondary cell c.

In an example, the UE may not be configured to monitor PDCCH/EPDCCH with carrier indicator field corresponding to secondary cell c in another serving cell. The UE may determine the corresponding PHICH resource on the secondary cell c in subframe $n+k_{PHICH}$. In an example, $k_{PHICH}$ may be always 4 for FDD. In an example, $k_{PHICH}$ may be given in FIG. 13 for TDD. In an example, $k_{PHICH}$ may be 4 for FDD-TDD and secondary cell c frame structure type 1. In an example, $k_{PHICH}$ may be given in FIG. 13 for FDD-TDD and secondary cell c frame structure type 2.

In an example, a UE may not be configured to monitor PDCCH/EPDCCH with carrier indicator field corresponding to secondary cell c in another serving cell c1. The UE may be configured with multiple TAGs. The UE may determine the corresponding PHICH resource on the serving cell c1 in subframe $n+k_{PHICH}$. In an example, $k_{PHICH}$ may be 4 for FDD. In an example, $k_{PHICH}$ may be given in FIG. 13 for TDD. In an example, $k_{PHICH}$ may be 4 for FDD-TDD and primary cell frame structure type 1 and frame structure type 1 for secondary cell c and serving cell c1. In an example, $k_{PHICH}$ may be given in FIG. 13 for FDD-TDD and serving cell c frame structure type 2. In an example, $k_{PHICH}$ may be 6 for FDD-TDD and serving cell c frame structure type 1 and serving cell c1 frame structure type 2.

In an example, for subframe bundling operation, the corresponding PHICH resource may be associated with the last subframe in the bundle.

In an example, the MAC entity may be configured with one or more SCells. In an example, the network/eNB may activate and/or deactivate the configured SCells. The special cell (SpCell) may always be activated. The network may activate and/or deactivate the SCell(s) by sending an Activation/Deactivation MAC control element (MAC CE). The MAC entity may maintain a sCellDeactivationTimer timer per configured SCell (e.g., except the SCell configured with PUCCH, if any). In an example, upon the expiry of sCellDeactivationTimer timer, the MAC entity may deactivate the associated SCell. The same initial timer value may apply to each instance of the sCellDeactivationTimer and it may be configured by RRC. The configured SCells may initially be deactivated upon addition and after a handover. The configured SCG SCells may initially be deactivated after a SCG change.

In an example, the MAC entity may receive an Activation/Deactivation MAC control element in a TTI activating a SCell. The MAC entity may, in a TTI according to a timing, activate the SCell and apply normal SCell operation including SRS transmissions on the SCell, CQI/PMI/RI/PTI/CRI reporting for the SCell, PDCCH monitoring on the SCell, PDCCH monitoring for the SCell and PUCCH transmissions on the SCell, if configured. The MAC entity may start or restart the sCellDeactivationTimer associated with the SCell and trigger power headroom report (PHR). In an example, if the MAC entity receives an Activation/Deactivation MAC control element in a TTI deactivating a SCell or if the sCellDeactivationTimer associated with an activated SCell expires in the TTI, the MAC entity may, in a TTI according to a timing, deactivate the SCell, stop the sCellDeactivationTimer associated with the SCell and flush all HARQ buffers associated with the SCell.

In an example, when a UE receives an activation command for a secondary cell in subframe n, the corresponding actions may be applied no later than the minimum requirements and no earlier than subframe n+8, except for the actions related to CSI reporting on a serving cell which may be active in subframe n+8 and the actions related to the sCellDeactivationTimer associated with the secondary cell which may be applied in subframe n+8. In an example, the actions related to CSI reporting on a serving cell which is not active in subframe n+8 may be applied in the earliest subframe after n+8 in which the serving cell is active.

In an example, a UE may receive a deactivation command for a secondary cell or the sCellDeactivationTimer associated with the secondary cell may expire in subframe n. In an example, the corresponding actions may apply no later than the minimum requirement except for the actions related to CSI reporting on a serving cell which is active which may be applied in subframe n+8.

In an example, in response to a PDCCH on an activated SCell indicating an uplink grant or downlink assignment, or a PDCCH on a Serving Cell scheduling an activated SCell indicating an uplink grant or a downlink assignment for the activated SCell, the MAC entity may restart the sCellDeactivationTimer associated with the SCell.

In an example, in response to a SCell being deactivated, the UE may not transmit SRS on the SCell and/or may not report CQI/PMI/RI/PTI/CRI for the SCell and/or may not transmit on UL-SCH on the SCell and/or may not transmit on RACH on the SCell and/or may not monitor the PDCCH on the SCell and/or may not monitor the PDCCH for the SCell and/or may not transmit PUCCH on the SCell. In an example, the HARQ feedback for a MAC PDU containing Activation/Deactivation MAC control element may not be impacted by PCell interruption due to SCell activation/deactivation. In an example, when SCell is deactivated, the ongoing Random-Access procedure on the SCell, if any, may be aborted.

In an example, the Activation/Deactivation MAC control element of one octet may be identified by a MAC PDU subheader with LCID 11000. The Activation/Deactivation MAC CE may have a fixed size. In an example, the Activation/Deactivation MAC CE may consist of a single octet containing seven C-fields and one R-field. An example Activation/Deactivation MAC control element with one octet is shown in FIG. 10.

In an example, the Activation/Deactivation MAC control element of four octets may be identified by a MAC PDU subheader with LCID 11000. In an example, the Activation/Deactivation MAC may have a fixed size and may consist of four octets containing 31 C-fields and one R-field. An example Activation/Deactivation MAC CE of four octets may is shown in FIG. 10. In an example, for the case with no serving cell with a serving cell index (ServCellIndex) larger than 7, Activation/Deactivation MAC CE of one octet may be applied, otherwise Activation/Deactivation MAC control element of four octets may be applied. In an example, if there is an SCell configured with SCellIndex i, the Ci field may indicate the activation/deactivation status of the SCell with SCellIndex i. Otherwise, the MAC entity may ignore the Ci field. In an example, the Ci field may be set to 1 to indicate that the SCell with SCellIndex i may be activated. The Ci field may be set to 0 to indicate that the SCell with SCellIndex i may be deactivated. In an example, the R field may be a reserved bit set to 0.

In legacy release 13 LTE, the eNB may only perform periodic resource allocation (e.g., semi-persistent scheduling (SPS)) for a primary cell. In an example, the DMRS cyclic shift indicated in the semi-persistent scheduling (SPS) grant may be set to zero (e.g., '000'). In legacy LTE, SPS may be only supported on the primary cell and there may be no risk of collisions between PHICHs corresponding to PUSCHs on different cells as SPS may be only supported on the primary cell. As the traffic scheduled by SPS increases, the need for supporting SPS on secondary cells increases. With semi-persistent scheduling of multiple serving cells (e.g., primary and/or secondary cells) from a single cell (e.g., primary cell), there is the possibility that PHICH resources calculated for PUSCH transmissions on different cells and transmitted by eNB on the scheduling cell collide if the DMRS cyclic shift is indicated as '000' for the SPS grants as is currently indicated based on release 13 procedures. While the eNB scheduler may avoid concurrent uplink grants on subframes which are concurrent with SPS configured PUSCH transmissions if the corresponding PHICH resources collide, such approach may result is lower scheduling efficiency. There is a need to enhance the current SPS mechanism to support SPS on secondary cells, reduce PHICH collisions and improve radio link efficiency. Example embodiments demonstrate enhancements to semi-persistent scheduling grant and grant procedures to further reduce PHICH collision for multiple SPS PUSCHs in different serving cells.

In legacy release 13 LTE, SPS may be only supported on SpCell. In an example, DMRS cyclic shift transmitted in the uplink grant (and corresponding $n_{DMRS}$) may be set to zero in an SPS grant. PHICH resource may be determined from $n_{DMRS}$ and the lowest PRB index in the first slot of the corresponding PUSCH transmission. In an example, when SPS on SCell is supported, and when cross-carrier scheduling is employed for SPS, the PHICH may be transmitted on the carrier that schedules SPS (e.g., on PCell). In an example, if DMRS cyclic shift of 0 and legacy PHICH mechanisms is used for semi-persistent scheduling of more than one serving cell, the probability of PHICH collision may increase, for example, when the same PRB index is used for PUSCH transmission on more than one serving cells. There is a need for improving PHICH and SPS mechanisms when SPS on SCell is supported.

In an example, an eNB may semi-persistently schedule resources on a secondary cell in uplink and/or downlink. In an example, the eNB may semi-persistently cross-carrier schedule resources on a serving cell. The carrier indicator field in uplink SPS grant may indicate the serving cell that is being semi-persistently scheduled.

In an example, a wireless device may be configured with a plurality of SPS configurations. The SPS configurations may be for different types of SPS and/or different services (e.g., voice, V2X, etc.). The CRC of a first DCI for activation/release of a first SPS with a first service type (e.g., voice) may be scrambled with a first SPS C-RNTI. The CRC of a second DCI for activation/release of a second SPS with a second service type (e.g., V2X) may be scrambled with a second SPS C-RNTI. In an example, a field in the second DCI may provide an index to one of a plurality of SPS configurations, wherein the plurality of SPS configurations may be associated with different parameters (e.g., different periodicities). The fields of the first DCI for activation/release of the first SPS may be used differently from the fields of the second DCI for activation/release of the second SPS. In an example, a field that is used to indicate the cyclic shift DMRS field in the first DCI may be used to indicate the index to the one of the plurality of SPS configurations for second service type (e.g., V2X) in the second DCI.

In legacy SPS procedures, a wireless device may validate a received DCI scrambled with a SPS C-RNTI as a valid SPS activation/release in response to some fields in the DCI having pre-configured values. Validation is an important step in the wireless device to detect whether a DCI is correctly received, and whether the DCI is for an SPS activation or release. Legacy validation processes may be employed when multiple SPSs with different SPS-RNTI are configured. However, the legacy validation procedures may lead to wrongly detecting a DCI intended for dynamic scheduling as a periodic resource allocation (e.g., SPS) activation/release DCI. In addition, the legacy validation procedures may lead to wrongly detecting a DCI intended for periodic resource allocation (e.g., SPS) activation/release as a dynamic (e.g., non-SPS) scheduling DCI. There is a need to enhance the activation/release DCI validation procedure for periodic resource allocation (e.g., SPS) to improve the scheduling performance when a plurality of SPS configurations of the same or different types are configured for a wireless device. Some example embodiments are presented below. Some of features in example embodiments may be combined in an implementation. The embodiments presented below are described for semi-persistent scheduling activation/release DCI. The embodiments may be applied for other periodic resource allocation mechanisms (e.g., grant-free periodic resource allocation).

In an example embodiment, DCI format 0 may be used for uplink semi-persistent scheduling on primary and/or secondary cells. In an example, 'Cyclic shift for DMRS and OCC index' field (e.g., 3-bits) in the (E)PDCCH used for SPS activation/release on a serving cell may be a pre-configured and/or fixed value (e.g., a pre-determined value). In an example, the pre-configured fixed value may be known by both the UE and the eNB. The pre-configured value may depend on the serving cell that is being semi-persistently scheduled. In an example, the pre-configured value may be determined based on the cell index of the serving cell, e.g. according to a formula/mechanism known to both the eNB and the UE. In an example, the 'Cyclic shift for DMRS and OCC index' field may take the value '000' for primary cell, '001' for secondary cell with smallest cell index, '010' for secondary cell with second smallest cell index and so on. Other examples may be provided on how to calculate the pre-determined value by the UE and the eNB. The eNB may choose the same value of 'Cyclic shift for DMRS and OCC index' field in the (E)PDCCH for SPS release on a serving cell that is used in the (E)PDCCH for SPS activation.

In an example enhanced mechanism, the 'Cyclic shift for DMRS and OCC index' field may be used to differentiate PHICH resources for different SPS configurations on the same and/or different serving cells. An eNB may transmit an SPS grant comprising 'Cyclic shift for DMRS and OCC index' field according to an example embodiment. The same field value may be used to determine PHICH resources for different instances of SPS PUSCH transmissions. A UE may determine PHICH resources at least based on pre-defined PHICH timing, RBs, and DMRS value. The 'Cyclic shift for DMRS and OCC index' field may be set to a different value for different SPS grants.

In an example embodiment, the PHICH resource may be identified by an index pair, e.g., $(n_{PHICH}^{group}, n_{PHICH}^{seq})$ where $n_{PHICH}^{group}$ may be the PHICH group number and $n_{PHICH}^{seq}$ may be an orthogonal sequence index within the group and may be defined by:

$$n_{PHICH}^{group} = (I_{PRB\_RA} + n_{DRMS}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS}) \bmod 2N_{SF}^{PHICH}$$

where, in an example, $n_{DMRS}$ may be mapped from the cyclic shift for DMRS field (e.g., according to FIG. 14) in the most recent PDCCH/EPDCCH with uplink DCI format for the transport block(s) associated with the corresponding PUSCH transmission. In an example, $n_{DMRS}$ may be set to zero if the initial PUSCH for the same transport block is scheduled by the random-access response grant. In an example, $N_{SF}^{PHICH}$ may be a spreading factor size used for PHICH modulation. In an example:

$$I_{PRB\_RA} = \begin{cases} I_{PRB\_RA}^{lowest\_index} & \begin{array}{l}\text{for the first } TB \text{ of a } PUSCH \text{ with associated}\\ PDCCH/EPDCCH \text{ or for the case of}\\ \text{no associated } PDCCH/EPDCCH \text{ when the}\\ \text{number of negatively acknowledged}\\ TBs \text{ is not equal to the number of}\\ TBs \text{ indicated in the most recent}\\ PDCCH/EPDCCH \text{ associated with}\\ \text{the corresponding } PUSCH \end{array} \\ I_{PRB\_RA}^{lowest\_index} + 1 & \begin{array}{l}\text{for a second } TB \text{ of a}\\ PUSCH \text{ with associated } PDCCH/EPDCCH\end{array} \end{cases}$$

where $I_{PRB\_RA}^{lowest\_index}$ may be the lowest PRB index in the first slot of the corresponding PUSCH transmission. In an example, $N_{PHICH}^{group}$ may be the number of PHICH groups configured by higher layers. In an example:

$$I_{PHICH} = \begin{cases} 1 & \begin{array}{l}\text{for TDD UL/DL configuration 0 with } PUSCH\\ \text{transmission in subframe } n = 4 \text{ or } 9\end{array} \\ 0 & \text{otherwise} \end{cases}$$

In an example, when the UE receives a NACK in PHICH, the UE may retransmit a HARQ TB after a pre-determined number of subframes, in pre-determined resource blocks, without the need for an additional grant.

In an example embodiment, an enhanced validation mechanism may be implemented for an SPS grant. A UE may examine a received SPS grant and check whether certain conditions are met to verify whether a SPS grant validation is achieved. In an example, validation of (E)PDCCH for SPS activation/release may be achieved if the 'Cyclic shift for DMRS and OCC index' field corresponds to the pre-defined fixed value for a serving cell and other validation conditions are also met.

In an example, a UE may validate a Semi-Persistent Scheduling assignment PDCCH if the CRC parity bits obtained for the PDCCH payload are scrambled with the Semi-Persistent Scheduling C-RNTI; and the new data indicator field is set to '0'. In case of DCI formats 2, 2A, 2B, 2C and 2D, the new data indicator field may refer to the one for the enabled transport block.

In an example, a UE may validate a Semi-Persistent Scheduling assignment EPDCCH if the CRC parity bits obtained for the EPDCCH payload are scrambled with the Semi-Persistent Scheduling C-RNTI; and the new data indicator field is set to '0'. In case of DCI formats 2, 2A, 2B, 2C and 2D, the new data indicator field may refer to the one for the enabled transport block.

In an example embodiment, validation may be achieved if the fields for the respective used DCI format are set according to FIG. 15 (for activation) and FIG. 16 (for release). If validation is achieved, the UE may consider the received DCI information accordingly as a valid semi-persistent activation or release. If validation is not achieved, the received DCI format may be considered by the UE as having been received with a non-matching CRC. The UE may ignore the DCI with the non-matching CRC.

In an example embodiment, the 'Cyclic shift for DMRS and OCC index' field in the (E)PDCCH used for SPS activation/release on a serving cell may have the same value as the 'Carrier indicator' field (CIF). In an example, the CIF value for a cell index may be configured using one or more RRC messages. In an example, the CIF value may be the same as the cell index value. The eNB may choose the same value of 'Cyclic shift for DMRS and OCC index' field for SPS release on a serving cell that is used for SPS activation.

In an example enhanced mechanism, the 'Cyclic shift for DMRS and OCC index' may be used to differentiate PHICH resources for different SPS configurations on the same and/or different serving cells. An eNB may transmit an SPS grant comprising 'Cyclic shift for DMRS and OCC index' field according to an example embodiment. The same field value may be used to determine PHICH resources for different instances of SPS PUSCH transmission. A UE may determine PHICH resources at least based on pre-defined PHICH timing, RBs, and DMRS value. 'Cyclic shift for DMRS and OCC index' may be set to a different value for different SPS grants.

In an example embodiment, the PHICH resource may be identified by the index pair $(n_{PHICH}^{group}, n_{PHICH}^{seq})$ where $n_{PHICH}^{group}$ may be the PHICH group number and $n_{PHICH}^{seq}$ may be the orthogonal sequence index within the group and may be defined by:

$$n_{PHICH}^{group} = (I_{PRB\_RA} + n_{DRMS}) \bmod N_{PHICH}^{group} + I_{PHICH} N_{PHICH}^{group}$$

$$n_{PHICH}^{seq} = (\lfloor I_{PRB\_RA}/N_{PHICH}^{group}\rfloor + n_{DRMS}) \bmod 2N_{SF}^{PHICH}$$

where $n_{DMRS}$ may be mapped from the cyclic shift for DMRS field (see FIG. 14) in the most recent PDCCH/EPDCCH with uplink DCI format for the transport block(s) associated with the corresponding PUSCH transmission. $n_{DMRS}$ may be set to zero if the initial PUSCH for the same transport block is scheduled by the grant in the random-access response. In an example, $N_{SF}^{PHICH}$ may be the spreading factor size used for PHICH modulation. In an example:

$$I_{PRB\_RA} = \begin{cases} I_{PRB\_RA}^{lowest\_index} & \begin{array}{l}\text{for the first } TB \text{ of a } PUSCH \text{ with associated}\\ PDCCH/EPDCCH \text{ or for the case of}\\ \text{no associated } PDCCH/EPDCCH \text{ when the}\\ \text{number of negatively acknowledged}\\ TBs \text{ is not equal to the number of}\\ TBs \text{ indicated in the most recent}\\ PDCCH/EPDCCH \text{ associated with}\\ \text{the corresponding } PUSCH \end{array} \\ I_{PRB\_RA}^{lowest\_index} + 1 & \begin{array}{l}\text{for a second } TB \text{ of a}\\ PUSCH \text{ with associated } PDCCH/EPDCCH\end{array} \end{cases}$$

where $I_{PRB\_RA}^{lowest\_index}$ may be the lowest PRB index in the first slot of the corresponding PUSCH transmission. In an example, $N_{PHICH}^{group}$ may be the number of PHICH groups configured by higher layers. In an example, $$I_{PHICH} = \begin{cases} 1 & \begin{array}{l}\text{for TDD UL/DL configuration 0 with } PUSCH\\ \text{transmission in subframe } n = 4 \text{ or } 9\end{array} \\ 0 & \text{otherwise} \end{cases}$$

In an example embodiment, the UE may validate (E) PDCCH for SPS activation/release if the 'Cyclic shift for DMRS and OCC index' field equals the 'carrier indicator' field and other validation conditions are also met. In an example, a UE may validate a Semi-Persistent Scheduling assignment PDCCH if the CRC parity bits obtained for the PDCCH payload are scrambled with the Semi-Persistent Scheduling C-RNTI; and the new data indicator field is set to '0'. In an example, in case of DCI formats 2, 2A, 2B, 2C and 2D, the new data indicator field may refer to the one for the enabled transport block.

In an example embodiment, a UE may validate a Semi-Persistent Scheduling assignment EPDCCH if the CRC parity bits obtained for the EPDCCH payload are scrambled with the Semi-Persistent Scheduling C-RNTI; and the new data indicator field is set to '0'. In an example, in case of DCI formats 2, 2A, 2B, 2C and 2D, the new data indicator field may refer to the one for the enabled transport block. In an example, validation may be achieved if the fields for the respective used DCI format are set according to FIG. 17 (for activation) and FIG. 18 (for release). If validation is achieved, the UE may consider the received DCI information accordingly as a valid semi-persistent activation or release. If validation is not achieved, the received DCI format may be considered by the UE as having been received with a non-matching CRC. The UE may ignore the DCI with the non-matching CRC.

In an example, RRC configuration may determine the value of 'Cyclic shift for DMRS and OCC index' field in the (E)PDCCH used for SPS activation/release on a serving cell. In an example, an eNB may transmit one or more RRC messages comprising configuration parameters of a plurality of cells. The configuration parameters may comprise configuration parameters for cross carrier scheduling configuration, SPS configuration, and other PHY/MAC parameters. In an example, a serving cell may be assigned a 'Cyclic shift for DMRS and OCC index' parameter for SPS transmissions, and the parameter may be employed for PHICH determination of SPS(s) PUSCH transmission on that serving cell. In an example, an SPS on a cell may be assigned a 'Cyclic shift for DMRS and OCC index' parameter and different SPS configurations may have different parameter values. The eNB may choose the same value of 'Cyclic shift for DMRS and OCC index' field for SPS release on a serving cell that is used for SPS activation.

In an enhanced mechanism, the 'Cyclic shift for DMRS and OCC index' may be used to differentiate PHICH resources for different SPS configurations on the same and/or different serving cells. An eNB may transmit an SPS grant comprising 'Cyclic shift for DMRS and OCC index' field according to an example embodiment. The same field value may be used to determine PHICH resources for different instances of SPS PUSCH transmission. A UE may determine PHICH resources at least based on pre-defined PHICH timing, RBs, and DMRS value. 'Cyclic shift for DMRS and OCC index' may be set to a different value for different SPS grants.

In an example embodiment, the PHICH resource may be identified by the index pair ($n_{PHICH}^{group}$, $n_{PHICH}^{seq}$) where $n_{PHICH}^{group}$ may be the PHICH group number and $n_{PHICH}^{seq}$ may be the orthogonal sequence index within the group and may be defined by:

$$n_{PHICH}^{group} = (I_{PRB\_RA} + n_{DRMS}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DRMS}) \bmod 2N_{SF}^{PHICH}$$

where $n_{DMRS}$ may be mapped from the cyclic shift for DMRS field (according to FIG. 14) in the most recent PDCCH/EPDCCH with uplink DCI format for the transport block(s) associated with the corresponding PUSCH transmission. In an example, $n_{DMRS}$ may be set to zero if the initial PUSCH for the same transport block is scheduled by the random-access response grant. In an example, $N_{SF}^{PHICH}$ may be the spreading factor size used for PHICH modulation. In an example:

$$I_{PRB\_RA} = \begin{cases} I_{PRB\_RA}^{lowest\_index} & \begin{array}{l}\text{for the first } TB \text{ of a } PUSCH \text{ with associated}\\ PDCCH/EPDCCH \text{ or for the case of}\\ \text{no associated } PDCCH/EPDCCH \text{ when the}\\ \text{number of negatively acknowledged}\\ TBs \text{ is not equal to the number of}\\ TBs \text{ indicated in the most recent}\\ PDCCH/EPDCCH \text{ associated with}\\ \text{the corresponding } PUSCH\end{array}\\ I_{PRB\_RA}^{lowest\_index} + 1 & \begin{array}{l}\text{for a second } TB \text{ of a}\\ PUSCH \text{ with associated } PDCCH/EPDCCH\end{array} \end{cases}$$

where $I_{PRB\_RA}^{lowest\_index}$ may be the lowest PRB index in the first slot of the corresponding PUSCH transmission. In an example, $N_{PHICH}^{group}$ may be the number of PHICH groups configured by higher layers. In an example:

$$I_{PHICH} = \begin{cases} 1 & \begin{array}{l}\text{for } TDD \text{ } UL/DL \text{ configuration 0 with } PUSCH\\ \text{transmission in subframe } n = 4 \text{ or } 9\end{array}\\ 0 & \text{otherwise} \end{cases}$$

The UE may validate E(PDCCH) for SPS activation/release on a serving cell if the 'Cyclic shift for DMRS and OCC index' field corresponds to the RRC configured value for the serving cell and other validation conditions are also met. In an example, a UE may validate a Semi-Persistent Scheduling assignment PDCCH if the CRC parity bits obtained for the PDCCH payload are scrambled with the Semi-Persistent Scheduling C-RNTI; and the new data indicator field is set to '0'. In case of DCI formats 2, 2A, 2B, 2C and 2D, the new data indicator field may refer to the one for the enabled transport block.

In an example, a UE may validate a Semi-Persistent Scheduling assignment EPDCCH if the CRC parity bits obtained for the EPDCCH payload are scrambled with the Semi-Persistent Scheduling C-RNTI; and the new data indicator field is set to '0'. In case of DCI formats 2, 2A, 2B, 2C and 2D, the new data indicator field may refer to the one for the enabled transport block. In an example, validation may be achieved if all the fields for the respective used DCI format are set according to FIG. 19 and FIG. 20. If validation is achieved, the UE may consider the received DCI information accordingly as a valid semi-persistent activation or release. If validation is not achieved, the received DCI format may be considered by the UE as having been received with a non-matching CRC.

In an example embodiment, the value of 'Cyclic shift for DMRS and OCC index' field in the E(PDCCH) used for SPS activation/release on a serving cell may be selected (e.g. randomly, arbitrarily, and/or according to an eNB mechanism) by the eNB scheduler discretion (in the range '000'-'111') for a serving cell that is being semi-persistently scheduled. The eNB may select the field value to reduce the probability of PHICH collision.

In an example, the eNB scheduler may choose the combination of the 'Cyclic shift for DMRS and OCC index' field in a semi-persistent scheduling grant and the lowest PRB index of the corresponding PUSCH transmission to be different for different serving cells when they are scheduled from the same cell. The eNB may choose the same value of 'Cyclic shift for DMRS and OCC index' field for SPS release on a serving cell that is used for SPS activation.

In an example enhanced mechanism, the 'Cyclic shift for DMRS and OCC index' may be used to differentiate PHICH resources for different SPS configurations on the same and/or different serving cells. In an example, an eNB may transmit an SPS grant comprising 'Cyclic shift for DMRS and OCC index' field according to an example embodiment. The same field value may be used to determine PHICH resources for different instances of SPS PUSCH transmission. A UE may determine PHICH resources at least based on pre-defined PHICH timing, RBs, and DMRS value. 'Cyclic shift for DMRS and OCC index' may be set to a different value for different SPS grants.

In an example embodiment, the PHICH resource may be identified by an index pair $(n_{PHICH}^{group}, n_{PHICH}^{seq})$ where $n_{PHICH}^{group}$ may be the PHICH group number and $n_{PHICH}^{seq}$ may be the orthogonal sequence index within the group and may be defined by:

$$n_{PHICH}^{group} = (I_{PRB\_RA} + n_{DRMS}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DRMS}) \bmod 2N_{SF}^{PHICH}$$

where $n_{DMRS}$ may be mapped from the cyclic shift for DMRS field (according to FIG. 14) in the most recent PDCCH/EPDCCH with uplink DCI format for the transport block(s) associated with the corresponding PUSCH transmission. In an example, $n_{DMRS}$ may be set to zero if the initial PUSCH for the same transport block is scheduled by the random-access response grant. In an example, $N_{SF}^{PHICH}$ may be the spreading factor size used for PHICH modulation. In an example, $$I_{PRB\_RA} = \begin{cases} I_{PRB\_RA}^{lowest\_index} & \begin{array}{l}\text{for the first } TB \text{ of a } PUSCH \text{ with associated}\\ PDCCH/EPDCCH \text{ or for the case of}\\ \text{no associated } PDCCH/EPDCCH \text{ when the}\\ \text{number of negatively acknowledged}\\ TBs \text{ is not equal to the number of}\\ TBs \text{ indicated in the most recent}\\ PDCCH/EPDCCH \text{ associated with}\\ \text{the corresponding } PUSCH\end{array}\\ I_{PRB\_RA}^{lowest\_index} + 1 & \begin{array}{l}\text{for a second } TB \text{ of a}\\ PUSCH \text{ with associated } PDCCH/EPDCCH\end{array}\end{cases}$$

where $I_{PRB\_RA}^{lowest\_index}$ may be the lowest PRB index in the first slot of the corresponding PUSCH transmission. In an example, $N_{PHICH}^{group}$ may be the number of PHICH groups configured by higher layers. In an example, $$I_{PHICH} = \begin{cases} 1 & \begin{array}{l}\text{for } TDD \text{ UL/DL configuration 0 with } PUSCH\\ \text{transmission in subframe } n = 4 \text{ or } 9\end{array}\\ 0 & \text{otherwise}\end{cases}$$

In an example embodiment, SPS configurations may be enhanced to support transmission of various V2X traffic and/or voice traffic by a UE. There is a need to support multiple SPS configurations for a UE. For example, a UE supporting V2X may need to support multiple uplink SPS configurations for transmitting various periodic (or semi-periodic) traffic and/or voice traffic in the uplink. In legacy SPS procedures, a wireless device may validate a received DCI scrambled with a SPS C-RNTI as a valid SPS activation/release in response to some fields in the DCI having pre-configured values. Validation is an important step in the wireless device to detect whether a DCI is correctly received, and whether the DCI is for an SPS activation or release. Legacy validation processes may be employed when multiple SPSs with different SPS-RNTIs are configured. However, when multiple SPSs are configured, the legacy validation procedures may lead to wrongly detecting a DCI intended for dynamic scheduling as a periodic resource allocation (e.g., SPS) activation/release DCI. In addition, when multiple SPSs are configured, the legacy validation procedures may lead to wrongly detecting a DCI intended for periodic resource allocation (e.g., SPS) activation/release as a dynamic (e.g., non-SPS) scheduling DCI. There is a need to enhance the activation/release DCI validation procedure for periodic resource allocation (e.g., SPS) to improve the scheduling performance when a plurality of SPS configurations of the same or different types are configured for a wireless device. In an example enhanced embodiment, validation employing the cyclic shift DMRS field value in DCI is improved when a first SPS RNTI (e.g. legacy SPS RNTI) and at least one second SPS RNTIs are configured to support multiple SPS configurations. This also enables additional flexibility in using DCI fields.

Figure 21:
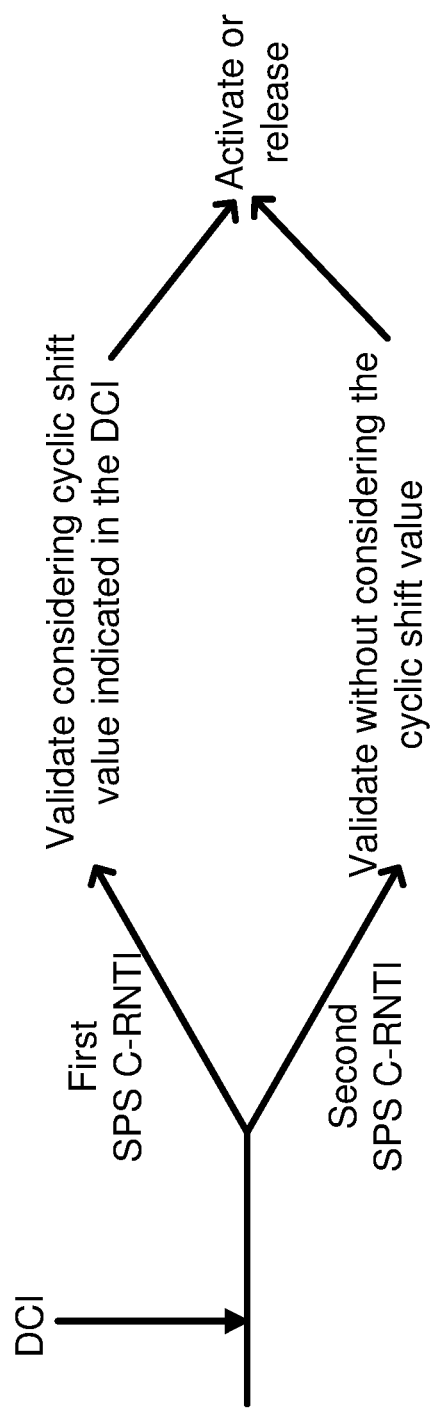
FIG. 21 is an example procedure for validation of a grant as per an aspect of an embodiment of the present disclosure.

In an example embodiment, a wireless device may be configured with a first SPS C-RNTI for a first service type (e.g., voice) and at least a second SPS C-RNTI for a second service type (e.g., V2X). The wireless device may be configured with other SPS C-RNTIs and/or other RNTIs associated with periodic resource allocation as well. The wireless device may receive a DCI in an (E)PDCCH, the DCI being associated with one of the first SPS C-RNTI or the second SPS C-RNTI. An example process is shown in FIG. 21. In an example, the CRC bits of the payload of the (E)PDCCH may be scrambled with one of the first SPS C-RNTI or the second SPS C-RNTI. In an example, in response to the DCI being associated with the first SPS C-RNTI, the wireless device may consider a value of a Cyclic shift, indicated in the DCI, to validate (E)PDCCH for SPS activation/release. The first SPS RNTI may be a legacy SPS RNTI used for example for voice traffic. In an example embodiment, in response to the DCI being associated with at least a second SPS C-RNTI, the UE may not consider the value of the Cyclic shift to validate (E)PDCCH for SPS activation/release. In an example, the UE may not take into consideration the value of Cyclic shift to validate an uplink grant with DCI format 0 for activation/release of semi-persistent scheduling in response to the DCI being associated with at least the second SPS C-RNTI (e.g., at least one SPS C-RNTI associated with the V2X service type).

In an example embodiment, in response to the (E)PDCCH being associated an SPS RNTI, validation may be achieved if the fields for the respective used DCI format are set according to FIG. 22 (for activation) and FIG. 23 (for release). SPS RNTI may be one of a first SPS C-RNTI associated with a first service type (e.g., legacy SPS RNTI associated with e.g. VOIP) or at least one second SPS C-RNTI associated with a second service type (e.g. V2X). For example, in FIG. 22 and FIG. 23, Cyclic Shift DM RS value may be employed for DCI validation for legacy SPS C-RNTI (e.g. first SPS RNTI for VOIP traffic), otherwise the UE may not employ the value of Cyclic Shift DM RS for DCI validation.

In an example, if validation is achieved, the UE may consider the received DCI information accordingly as a valid semi-persistent activation or release. In an example, if validation is not achieved, the received DCI format may be considered by the UE as having been received with a non-matching CRC.

In an example, a UE may receive a PDCCH associated with a SPS C-RNTI associated with a service type (e.g., V2X, VOIP, etc). The UE may validate a Semi-Persistent Scheduling assignment PDCCH if the CRC parity bits obtained for the PDCCH payload are scrambled with the SPS C-RNTI; and the new data indicator field is set to '0'. In an example, in case of one or more DCI formats (e.g., 2, 2A, 2B, 2C and 2D), the new data indicator field may refer to the one for the enabled transport block. In an example, a UE may validate a Semi-Persistent Scheduling assignment EPDCCH if the CRC parity bits obtained for the EPDCCH payload are scrambled with the SPS C-RNTI; and the new data indicator field is set to '0'. In case of one or more DCI formats (e.g., 2, 2A, 2B, 2C and 2D), the new data indicator field may refer to the one for the enabled transport block.

In an example enhanced mechanism, the CIF field of a serving cell may be used to differentiate PHICH resources for different SPS configurations on the same and/or different serving cells. The same CIF field value may be used to determine PHICH resources for different instances of SPS PUSCH transmission. A UE may determine PHICH resources at least based on pre-defined PHICH timing, RBs, and CIF.

In an example, one of the parameters for the PHICH resource calculation may be the value of 'carrier indicator' field in the (E)PDCCH used for SPS activation/release on a serving cell. In an example, the PHICH resource used for transmission of HARQ acknowledgement corresponding to SPS PUSCH may depend on the value of 'carrier indicator' field in the (E)PDCCH and/or the DMRS cyclic shift (mapped to $n_{DMRS}$) and/or the lowest PRB index in the first slot of the corresponding PUSCH transmission.

In an example, the PHICH resource calculation may use the value of 'carrier indicator' field. In an example, the PHICH resource may be identified by the index pair $(n_{PHICH}^{group}, n_{PHICH}^{seq})$ where $n_{PHICH}^{group}$ may be the PHICH group number and $n_{PHICH}^{seq}$ may be the orthogonal sequence index within the group and may be defined by:

$$n_{PHICH}^{group} = (I_{PRB_{RA}} + n_{CIF}) \bmod N_{PHICH}^{group} + I_{PHICH} N_{PHICH}^{group}$$

$$n_{PHICH}^{group} = (\lfloor I_{PRB\_RA}/N_{PHICH}^{group} \rfloor + n_{CIF}) \bmod 2N_{SF}^{PHICH}$$

where $n_{CIF}$ may be mapped from the Carrier Indicator field (according to FIG. 24) in the most recent PDCCH/EPDCCH with uplink DCI format for the transport block(s) associated with the corresponding PUSCH transmission. In an example, $n_{CIF}$ may be set to zero if the initial PUSCH for the same transport block is scheduled by the random-access response grant. In an example, $N_{SF}^{PHICH}$ may be the spreading factor size used for PHICH modulation. In an example, $$I_{PRB\_RA} = \begin{cases} I_{PRB\_RA}^{lowest\_index} & \text{for the first } TB \text{ of a } PUSCH \text{ with associated} \\ & PDCCH/EPDCCH \text{ or for the case of} \\ & \text{no associated } PDCCH/EPDCCH \text{ when the} \\ & \text{number of negatively acknowledged} \\ & TBs \text{ is not equal to the number of} \\ & TBs \text{ indicated in the most recent} \\ & PDCCH/EPDCCH \text{ associated with} \\ & \text{the corresponding } PUSCH \\ I_{PRB\_RA}^{lowest\_index} + 1 & \text{for a second } TB \text{ of a} \\ & PUSCH \text{ with associated } PDCCH/EPDCCH \end{cases}$$

where $I_{PRB\_RA}^{lowest\_index}$ may be the lowest PRB index in the first slot of the corresponding PUSCH transmission. In an example, $N_{PHICH}^{group}$ may be the number of PHICH groups configured by higher layers. In an example, $$I_{PHICH} = \begin{cases} 1 & \text{for TDD UL/DL configuration 0 with PUSCH} \\ & \text{transmission in subframe } n = 4 \text{ or } 9 \\ 0 & \text{otherwise} \end{cases}$$

In an example, the PHICH determination mechanism may employ a different equation and may depend at least on the value of 'carrier indicator' field in the E(PDCCH) and/or the DMRS cyclic shift (mapped to $n_{DMRS}$) and/or the lowest PRB index in the first slot of the corresponding PUSCH transmission.

In legacy release 13 LTE, the eNB transmits the PHICH on the same cell that schedules (e.g., semi-persistently or dynamically) the uplink transmission. This procedure may be beneficial from a UE power consumption perspective as the UE may only need to monitor the cell that it monitors for uplink scheduling grants and as the PDCCH may override the PHICH to support adaptive retransmissions. In an example, with cross-carrier scheduling, transmissions on multiple uplink component carriers may need to be acknowledged on a single downlink component carrier.

In an example embodiment, the PHICH may be transmitted in the first OFDM symbol of the PHICH subframe corresponding to a PUSCH transmission. This may allow the UE to attempt to decode the PHICH even if it failed decoding of the physical control format indicator channel (PCFICH). This may be advantageous as the error requirements on the PHICH may be stricter than for PCFICH. To improve the coverage, it may be possible to semi-statically configure a PHICH duration of up to three OFDM symbols.

In an example, the PHICH for a semi-persistently scheduled serving cell may be transmitted on the carrier that PUSCH transmission takes place and not on the scheduling carrier (e.g., the carrier on which grant is transmitted). In an example, the PHICH for transmission of hybrid ARQ ACK/NACK corresponding to uplink transmissions that are dynamically scheduled may be transmitted on the scheduling carrier and the PHICH for a semi-persistently scheduled serving cell may be transmitted on the carrier that PUSCH transmission takes place and not on the scheduling carrier. In an example, PHICH corresponding to semi-persistently scheduled PUSCHs on an SCell may use the PHICH resources available for other UEs for which the SCell may be a PCell. In an example, the UE may consider the PHICH configuration information transmitted as part of the system information (e.g., number of OFDM symbols and/or the amount of resources in the control region reserved for PHICH) to decode the PHICH on a serving cell.

In an example embodiment, several PHICHs may be code multiplexed on to a set of resource elements. The HARQ acknowledgement (one bit per TB) may be repeated three times, followed by BPSK modulation and may be spread with a length-four orthogonal sequence. A PHICH group may comprise a set of PHICHs transmitted on the same set of resource elements. A PHICH group may consist of eight PHICHs in the case of normal cyclic prefix. In an example, a PHICH group may not comprise of PHICHs corresponding to both dynamically scheduled PUSCHs and semi-persistently scheduled PUSCHs. In an example, a PHICH group may comprise of PHICHs corresponding to dynamically scheduled PUSCHs or a PHICH group may comprise of PHICHs corresponding to semi-persistently scheduled PUSCHs.

The PHICH resources, e.g., the index pair ($n_{PHICH}^{group}$, $n_{PHICH}^{seq}$), corresponding to two or more scheduled PUSCHs (e.g., dynamically and/or semi-persistently scheduled) may coincide if, for example, the parameters used for PHICH resource calculation (e.g., the value of 'Cyclic shift for DMRS and OCC index' field in the SPS grant and/or the lowest PRB index in the first slot of the corresponding PUSCH transmission) are the same. In an example, the eNB may bundle the HARQ ACKs/NACKs corresponding to PHICHs with the same calculated resource and consider a NACK for the PHICH resource if at least one of HARQ feedback values is a NACK and consider an ACK for the PHICH resource if the HARQ ACK feedback values are ACK. In an example, an AND operation across all of ACK/NACK messages corresponding to the PHICHs with the same resource is used. In an example, eNB may indicate to the UE (e.g., through RRC configuration and/or dynamic signaling) whether ACK/NACK bundling for PHICH is enabled and/or used or not. In an example, the eNB may indicate to the UE as part of the PHICH configuration system information if ACK/NACK bundling for PHICH is enabled and/or used or not. In an example, eNB may indicate to the UE (e.g., as part of PHICH configuration system information, RRC configuration or dynamic signaling) whether ACK/NACK bundling for PHICH is enabled and/or used for PHICHs corresponding to SPS PUSCHs, dynamically scheduled PUSCHs or both of SPS and dynamically scheduled PUSCHs.

In an example, the eNB scheduler may avoid concurrent uplink grants on subframes which are concurrent with SPS configured PUSCH transmissions if the corresponding PHICH resources collide. Cross-carrier scheduling with the Carrier Indicator Field (CIF) may allow the PDCCH of a serving cell to schedule resources on another serving cell. Cross-carrier scheduling may not apply to PCell, e.g., PCell may always be scheduled via its PDCCH. In an example, when the PDCCH of an SCell is configured, cross-carrier scheduling may not apply to this SCell e.g., it may always be scheduled via its PDCCH. In an example, when the PDCCH of an SCell is not configured, cross-carrier scheduling may apply and the SCell may always be scheduled via the PDCCH of one other serving cell.

In an example, the IE CrossCarrierSchedulingConfig may be used to specify the configuration when the cross carrier scheduling is used in a cell. An example CrossCarrierSchedulingConfig IE may be as follows:

```
CrossCarrierSchedulingConfig-r10 ::=    SEQUENCE {
    schedulingCellInfo-r10 CHOICE {
        own-r10    SEQUENCE { -- No cross carrier scheduling
            cif-Presence-r10   BOOLEAN
        },
        other-r10      SEQUENCE {      -- Cross carrier scheduling
            schedulingCellId-r10   ServCellIndex-r10,
            pdsch-Start-r10    INTEGER (1..4)
        }
    }
}
CrossCarrierSchedulingConfig-r13 ::=      SEQUENCE {
    schedulingCellInfo-r13           CHOICE {
        own-r13   SEQUENCE {       -- No cross carrier scheduling
            cif-Presence-r13             BOOLEAN
        },
        other-r13   SEQUENCE {    -- Cross carrier scheduling
            schedulingCellId-r13           ServCellIndex-r13,
            pdsch-Start-r13                INTEGER (1..4),
            cif-InSchedulingCell-r13        INTEGER (1..7)
        }
    }
}
```

In an example, cif-Presence may be used to indicate whether carrier indicator field is present (value TRUE) or not (value FALSE) in PDCCH/EPDCCH DCI formats. In an example, cif-InSchedulingCell field may indicate the CIF value used in the scheduling cell to indicate this cell. In case of carrier indicator field is present, the CIF value is 0. In an example, pdsch-Start field may indicate the starting OFDM symbol of PDSCH for the concerned SCell. Values 1, 2, 3 are applicable when dl-Bandwidth for the concerned SCell is greater than 10 resource blocks, values 2, 3, 4 are applicable when dl-Bandwidth for the concerned SCell is less than or equal to 10 resource blocks. In an example, schedulingCellId field may indicate which cell signals the downlink allocations and uplink grants, if applicable, for the concerned SCell. In case the UE is configured with DC, the scheduling cell is part of the same cell group (i.e. MCG or SCG) as the scheduled cell.

In legacy SCell activation/deactivation procedures, the wireless device (re)starts an SCell deactivation timer in response to receiving a DCI indicating an uplink grant or downlink assignment. The reception of the DCI indicates that the SCell needs to remain active and hence the wireless device re(starts) the SCell deactivation timer. With semi-persistent scheduling and/or other periodic resource allocation mechanisms (e.g., grant-free resource allocation), the wireless device may receive a single DCI indicating/activating a plurality of periodic resources. In legacy 3GPP release 14, the periodic resource allocation (e.g., SPS) is configured for a SPCell (e.g., primary cell or primary secondary cell) only and the SPCell always remains activated. With introduction of SPS and/or other periodic resource allocation mechanisms (e.g., grant-free periodic resource allocation), the SCell deactivation timer may expire while the periodic resource allocation grants are still activated/allocated. The legacy procedures hence leads to deactivation of the SCell and the wireless device may not utilize the periodic resources allocated by the base station. The base station may need to periodically transmit dynamic grants to the wireless device so that the wireless device remains active while the periodic resource allocation are activated and not released. This reduces the efficiency of resource allocation and degrades the performance of the wireless device. With introduction of SPS and/or other periodic resource allocation mechanisms on SCell, there is a need to enhance the SCell activation/deactivation procedure.

In an example embodiment, a UE may be configured with semi-persistent scheduling and/or other periodic resource allocation (e.g., grant-free) on a secondary cell. In an example embodiment, a UE may be configured with multiple SPS configurations and/or periodic resource allocation configurations. One or more SPS grants and/or periodic resource allocations may be initialized. The UE may receive dynamic grants and/or SPS grants and/or periodic resource allocations from the eNB. The eNB may activate semi-persistent scheduling and/or periodic resource allocation on a secondary cell by sending a PDCCH activating SPS downlink assignment or SPS uplink grant or periodic resource allocation on the secondary cell or on a serving cell scheduling the secondary cell. In an example embodiment, in response to SPS and/or periodic resource allocation being configured for a UE on a SCell (e.g., with RRC configuration), the wireless device/MAC entity may disable the sCellDeactivationTimer timer associated with the SCell. In an example, wireless device/MAC entity may stop/pause the sCellDeactivationTimer timer and/or ignore the value of sCellDeactivationTimer timer for activation/deactivation of SCell in response to disabling the sCellDeactivationTimer timer. In an example, the eNB may release the SPS configuration or periodic resource allocation configuration by transmitting an RRC reconfiguration message to the UE and release the SPS and/or periodic resource allocation configuration. In an example embodiment, in response to releasing the SPS/periodic resource allocation configuration for an SCell, the UE may enable SCell deactivation timer. In an example, RRC may release SPS/periodic resource allocation configuration for a deactivated SCell. In an example, RRC may release an SCell with SPS/periodic resource allocation configuration and reconfigure the SCell without SPS/periodic resource allocation configuration. In an example, Scell deactivation timer for an SCell without SPS/periodic resource allocation configuration may be enabled.

In an example, the SCell may be in a deactivated state when it is initially configured (e.g., RRC configured) for a UE. The eNB may activate or deactivate the SCell by transmitting a MAC activation/deactivation command to the UE. The eNB may transmit a MAC activation command to the UE and activate an SCell with SPS configuration and/or periodic resource allocation configuration. In the example embodiment, the SCell may remain activated until it is deactivated by eNB, e.g., by transmitting a MAC SCell deactivation command for the SCell.

In the above example, the timer may be enabled or disabled based on RRC configuration of the SCell. In an example, the timer may be enabled for the SCell, and the timer may be managed (e.g. stopped/disabled/started) by the MAC layer based on periodic resource allocations (e.g., SPS grants).

Figure 25:
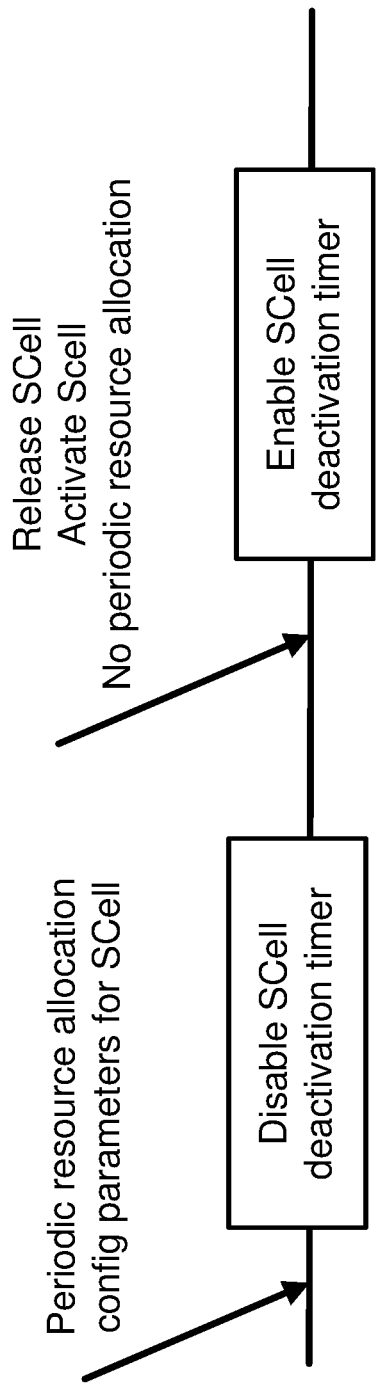
FIG. 25 is an example procedure for managing an SCell deactivation timer as per an aspect of an embodiment of the present disclosure.

In an example, a UE may be configured with periodic resource allocation (e.g., semi-persistent scheduling) on a secondary cell. An example process is shown in FIG. 25. The eNB may activate semi-persistent scheduling and/or periodic resource allocation on a secondary cell by sending a PDCCH activating SPS downlink assignment or SPS uplink grant or periodic resource allocation on the secondary cell or on a serving cell scheduling the secondary cell. In an example, a periodic resource allocation (e.g., grant-free resource allocation) may be activated with RRC configuration.

In an example embodiment, in response to SPS and/or periodic resource allocation being activated on an SCell (e.g., in response to receiving a PDCCH activating SPS downlink assignment or SPS uplink grant or periodic resource allocation), the MAC entity may stop/disable the sCellDeactivationTimer timer associated with the SCell.

Figure 26:
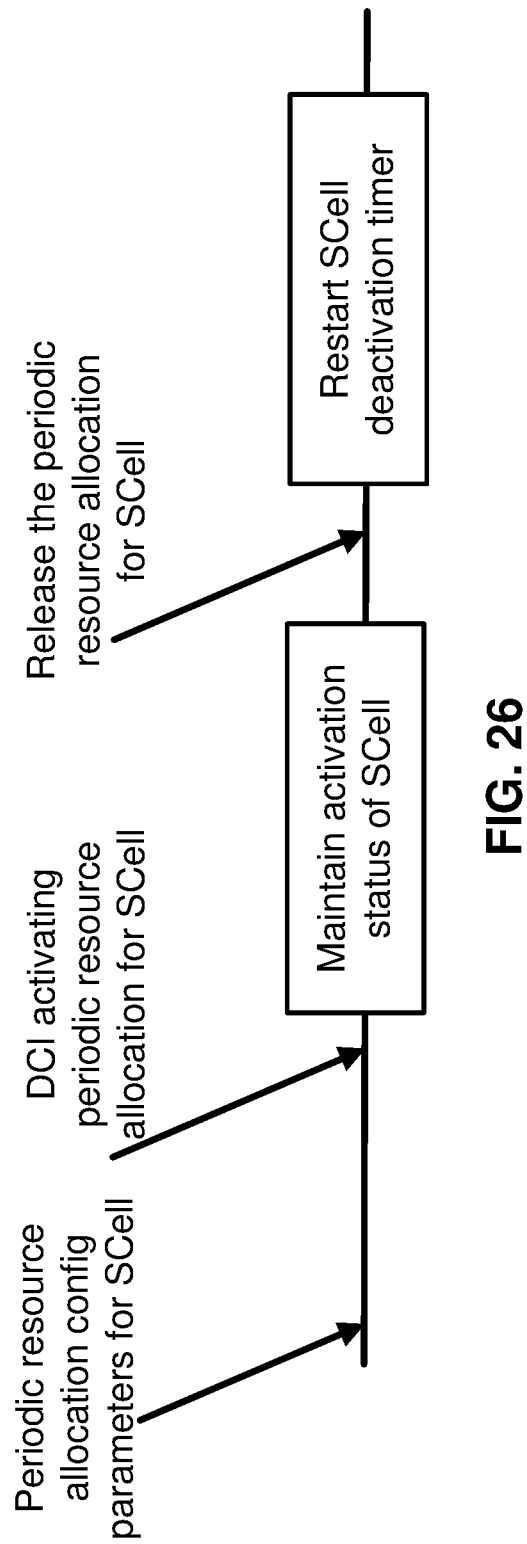
FIG. 26 is an example procedure for managing an SCell deactivation timer as per an aspect of an embodiment of the present disclosure.

An example process is shown in FIG. 26. In an example, the MAC entity may maintain the activation status of the SCell. In an example, in response to receiving an (E)PDCCH activating a semi-persistent scheduling and/or periodic resource allocation, the wireless device may maintain the status of secondary cell as active regardless of the value of the SCellDeactivationTimer as long as the SPS and/or the periodic resource allocation is activated. In an example, the MAC entity may start/restart the sCellDeactivationTimer when the SPS or the periodic resource allocation is implicitly or explicitly released on the SCell. In an example, in response to the UE validating a semi-persistent scheduling and/or periodic resource allocation activation PDCCH/EPDCCH on a secondary cell or on a serving cell scheduling SPS/periodic resource allocation on the secondary cell, the MAC entity may stop/disable the sCellDeactivationTimer timer associated with the SCell. In an example, in response to the UE validating a SPS and/or periodic resource allocation release PDCCH/EPDCCH on a secondary cell or on a serving cell on behalf of the secondary cell, the MAC entity may start the sCellDeactivationTimer timer associated with the SCell. In an example, in response to SPS being released on a SCell (e.g. by the MAC layer/PDCCH), the UE may start the sCellDeactivationTimer and use the RRC configuration parameters (e.g., the initial value of sCellDeactivationTimer) that are used before disabling the sCellDeactivationTimer in response to SPS and/or periodic resource allocation being activated.

In an example embodiment, in response to SPS and/or periodic resource allocation being activated on a SCell (e.g., when a PDCCH with SPS downlink assignment or SPS uplink grant or periodic resource allocation being transmitted by the eNB to the UE), the MAC entity may pause the sCellDeactivationTimer timer associated with the SCell. In an example, the MAC entity may resume the sCellDeactivationTimer in response to the SPS or periodic resource allocation being implicitly or explicitly released for the SCell. In an example, in response to a UE validating a SPS or periodic resource allocation activation PDCCH/EPDCCH on a secondary cell or on a serving cell scheduling SPS/periodic resource allocation on the secondary cell, the MAC entity may pause the sCellDeactivationTimer timer associated with the SCell. In an example, in response to the UE validating a SPS/periodic resource allocation release PDCCH/EPDCCH on a secondary cell or on a serving cell on behalf of the secondary cell, the MAC entity may resume the sCellDeactivationTimer timer associated with the SCell. In an example, in response to semi-persistent scheduling or periodic resource allocation being released for a SCell, the UE may start the sCellDeactivationTimer and use the RRC configuration parameters (e.g., the initial value of sCellDeactivationTimer) that were used before disabling the sCellDeactivationTimer when semi-persistent scheduling and/or periodic resource allocation was activated.

In an example embodiment, the timer may be managed based on the SPS grant and or periodic resource allocation periodicity. In an example, a UE may be configured with semi-persistent scheduling and/or periodic resource allocation on a secondary cell. The eNB may activate SPS and/or periodic resource allocation on a secondary cell by sending a PDCCH with SPS downlink assignment or SPS uplink grant or periodic resource allocation on the secondary cell or on a serving cell scheduling the secondary cell.

In an example, in response to a Semi-Persistent downlink assignment is configured and/or activated, the MAC entity may consider sequentially that the Nth assignment occurs in the subframe for which: (10*SFN+subframe)=[(10*SFNstart time+subframestart time)+N*semiPersist- SchedIntervalDL] modulo 10240, where SFNstart time and subframestart time may be the SFN and subframe, respectively, at the time the configured downlink assignment are (re-)initialized. In an example embodiment, in response to semi-persistent scheduling downlink assignment being (re-)initialized at subframestart time for a SCell (e.g., if a PDCCH at subframe n on the SCell or a scheduling serving cell indicates semi-persistent scheduling downlink assignment for the SCell), the UE MAC entity may restart the sCellDeactivationTimer sequentially for the SCell at the subframes with SPS grant. In an example, the UE MAC entity may stop the sequentially restarting the sCellDeactivationTimer after the semi-persistent scheduling is implicitly or explicitly released on the SCell. In an example, before, during and after SPS is initialized/activated, the MAC entity may restart the timer according to dynamic grants, e.g., restart the timer in response to receiving dynamic grants. In response to receiving a dynamic PDCCH grant in a TTI, the MAC entity may start/restart the sCellDeactivationTimer.

In an example, in response to a Semi-Persistent Scheduling uplink grant or periodic resource allocation being configured and/or activated on a TDD cell (e.g., cell with frame structure type 2), the MAC entity may consider sequentially that the Nth grant occurs in the subframe for which: (10*SFN+subframe)=[(10*SFNstart time+subframestart time)+N*semiPersistSchedIntervalUL+Subframe_Offset*(N modulo 2)] modulo 10240, where SFNstart time and subframestart time may be the SFN and subframe, respectively, at the time the configured uplink grant are (re-)initialized. In an example, in response to a Semi-Persistent Scheduling uplink grant and/or periodic resource allocation being configured, the MAC entity may set the Subframe_Offset according to FIG. 11 if twoIntervalsConfig is enabled by upper layer. In an example, if twoIntervalsConfig is not enabled by upper layer, the MAC entity may set Subframe_Offset to 0.

In an example, the MAC entity may clear the configured uplink grant immediately after implicitReleaseAfter number of consecutive new MAC PDUs each containing zero MAC SDUs have been provided by the Multiplexing and Assembly entity, on the Semi-Persistent Scheduling resource.

In an example embodiment, in response to the semi-persistent uplink scheduling grant and/or periodic resource allocation being (re-)initialized at subframe subframestart time for a SCell (e.g., if a PDCCH on the SCell or a scheduling serving cell indicates semi-persistent scheduling uplink grant for the SCell), the UE MAC entity may restart the sCellDeactivationTimer sequentially for the SCell at the subframes with SPS grant and/or periodic resource allocation. In an example, the UE MAC entity may restart the sCellDeactivationTimer sequentially for the SCell, k subframes before the subframes with SPS grant and/or periodic resource allocation, wherein k, may be, for example, a fixed number (e.g. 4 for FDD and 4, 5, or 6 or some other number in TDD depending on TDD configuration). Other example values for k may be supported. In an example, the UE MAC entity may stop sequentially restarting the sCellDeactivationTimer after the semi-persistent scheduling and/or periodic resource allocation being implicitly or explicitly released on the SCell. In an example, before, during and after SPS and/or periodic resource allocation is initialized/activated, the MAC entity may restart the timer according to dynamic grants. In response to receiving a dynamic PDCCH grant in a TTI, the MAC entity may start/restart the sCellDeactivationTimer.

According to various embodiments, a device (such as, for example, a wireless device, off-network wireless device, a base station, and/or the like), may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 27:
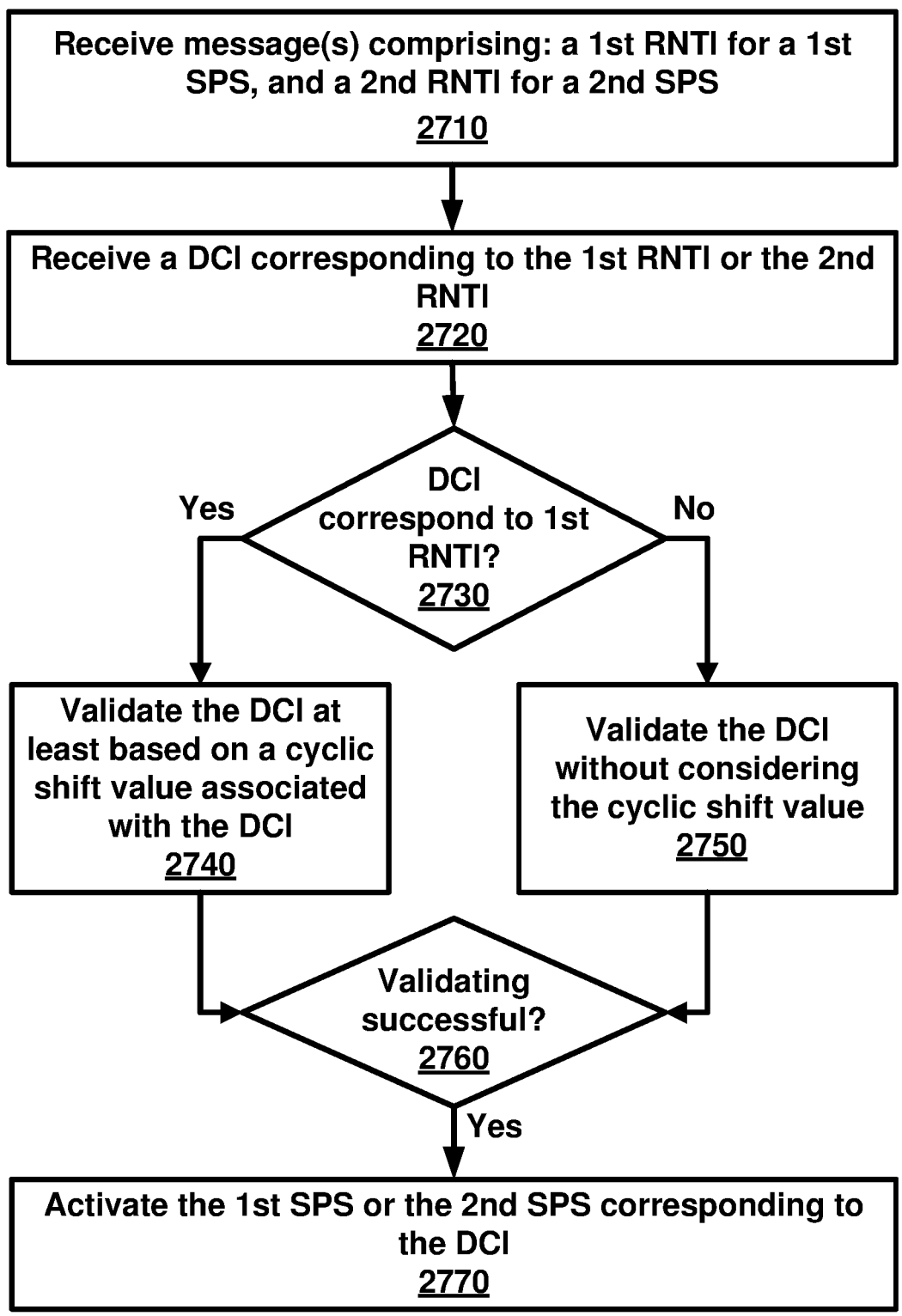
FIG. 27 is an example flow diagram as per an aspect of an embodiment of the present disclosure.
Figure 28:
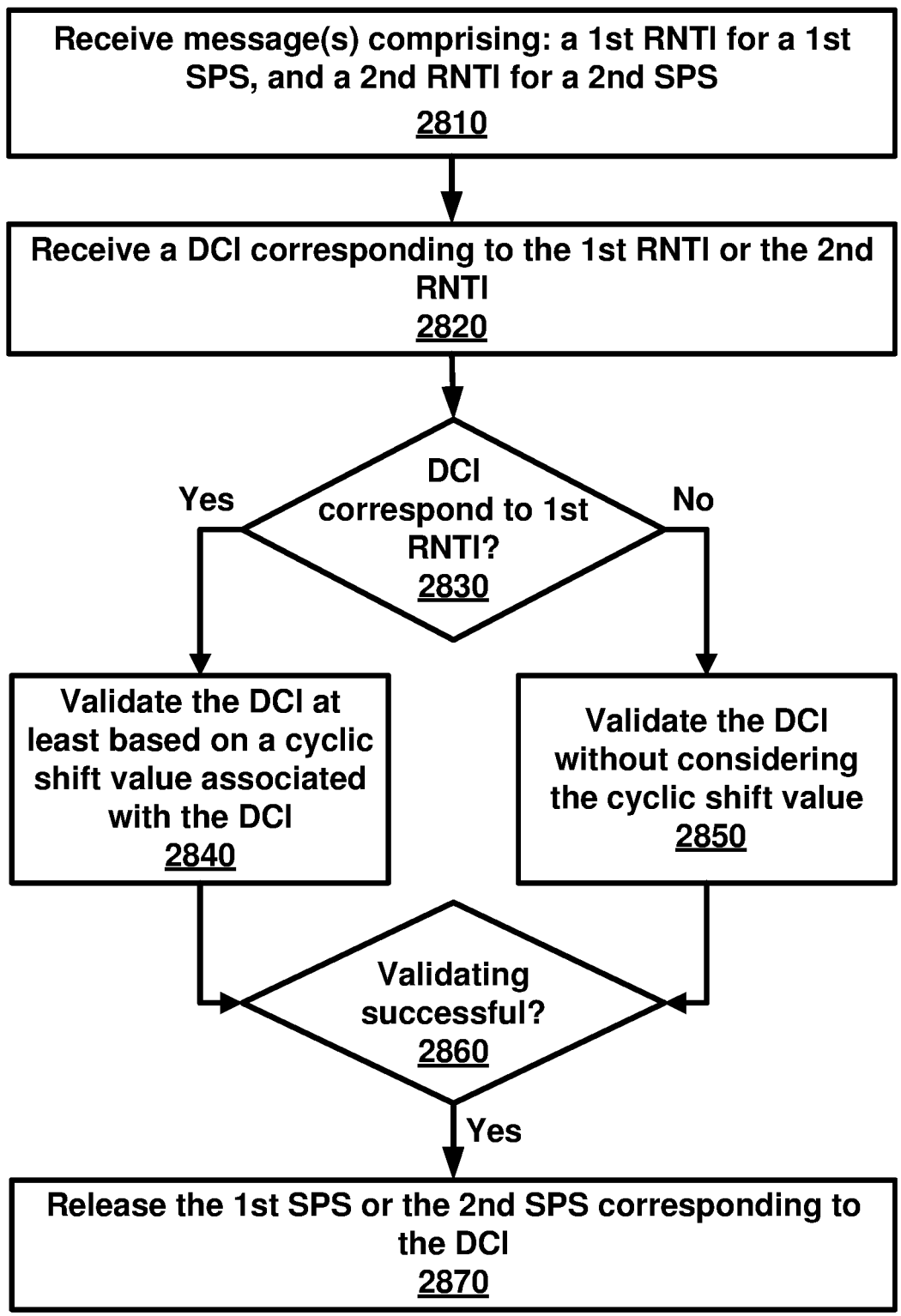
FIG. 28 is an example flow diagram as per an aspect of an embodiment of the present disclosure.

FIG. 27 is an example flow diagram as per an aspect of an embodiment of the present disclosure. At 2710, a first wireless device may one or more messages. The one or more messages may comprise: a first radio network temporary identifier (RNTI) for a first semi-persistent scheduling (SPS), and a second RNTI for a second SPS.

At 2720, the wireless device may receive a downlink control information (DCI) corresponding to one of the first RNTI or the second RNTI. According to an embodiment, the DCI format may be zero. According to an embodiment, the DCI may correspond to the first RNTI in response to a cyclic redundancy check of the DCI being scrambled with the first RNTI. According to an embodiment, the DCI may comprise a field indicating the cyclic shift value if the DCI corresponds to the first RNTI. According to an embodiment, an uplink transmission corresponding to the DCI may employ the cyclic shift value.

At 2730, a determination may be made as to whether the DCI corresponds to the first RNTI. If the DCI corresponds to the first RNTI, the DCI may be validated at 2740 at least based on a cyclic shift value associated with the DCI. Otherwise, the DCI may be validated at 150 without considering the cyclic shift value.

At 2760, a determination may be made as to whether the validation was successful. If the validation was successful, one of the first SPS or the second SPS, corresponding to the DCI, may be activated at 2770. According to an embodiment, the DCI may be ignored in response to the validation not being successful. According to an embodiment, if the DCI corresponds to the first RNTI, the validating may comprise checking whether the cyclic shift value associated with the DCI is zero. According to an embodiment, the validating may further comprise checking whether a transmit power control (TPC) command for scheduled physical uplink shared channel (PUSCH) field value associated with the DCI is zero. According to an embodiment, the validating may further comprise checking whether a most significant bit (MSB) of a modulation and coding scheme and redundancy version field value associated with the DCI is zero. According to an embodiment, the validating may further comprise checking whether a new data indicator field value associated with the DCI is zero.

FIG. 8 is an example flow diagram as per an aspect of an embodiment of the present disclosure. At 2810, a first wireless device may one or more messages. The one or more messages may comprise: a first radio network temporary identifier (RNTI) for a first semi-persistent scheduling (SPS), and a second RNTI for a second SPS.

At 2820, the wireless device may receive a downlink control information (DCI) corresponding to one of the first RNTI or the second RNTI. According to an embodiment, the DCI format may be zero. According to an embodiment, the DCI may correspond to the first RNTI in response to a cyclic redundancy check of the DCI being scrambled with the first RNTI. According to an embodiment, the DCI may comprise a field indicating the cyclic shift value if the DCI corresponds to the first RNTI.

At 2830, a determination may be made as to whether the DCI corresponds to the first RNTI. If the DCI corresponds to the first RNTI, the DCI may be validated at 2840 at least based on a cyclic shift value associated with the DCI. Otherwise, the DCI may be validated at 2850 without considering the cyclic shift value. At 2860, a determination may be made as to whether the validation was successful. If the validation was successful, one of the first SPS or the second SPS, corresponding to the DCI, may be released at 2870.

According to an embodiment, the DCI may be ignored in response to the validation not being successful. According to an embodiment, if the DCI corresponds to the first RNTI, the validating, may comprise checking whether the cyclic shift value associated with the DCI is zero. According to an embodiment, the validating may further comprise checking whether a transmit power control (TPC) command for scheduled physical uplink shared channel (PUSCH) field value associated with the DCI is zero. According to an embodiment, the validating may further comprise checking whether a modulation and coding scheme and redundancy version field value associated with the DCI is thirty-one. According to an embodiment, the validating may further comprise checking whether a new data indicator field value associated with the DCI is zero. According to an embodiment, the validating may further comprise checking whether a resource block assignment and hopping resource allocation field value associated with the DCI is all ones.

Figure 29:
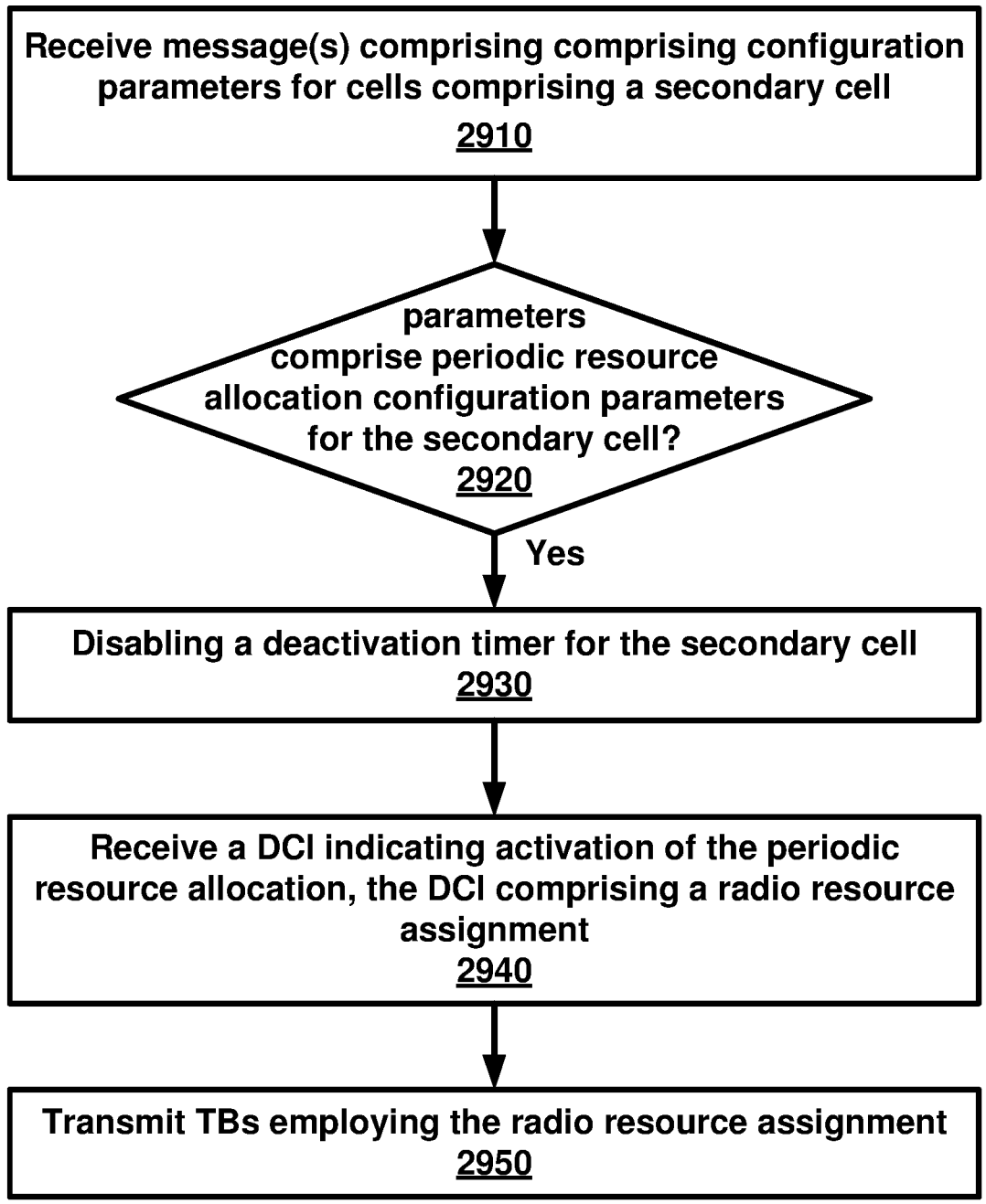
FIG. 29 is an example flow diagram as per an aspect of an embodiment of the present disclosure.

FIG. 29 is an example flow diagram as per an aspect of an embodiment of the present disclosure. At 2910, a first wireless device may receive one or more messages. The one or more messages may comprise configuration parameters for a plurality of cells comprising a secondary cell. At 2930, a deactivation timer for the secondary cell may be disabled in response to the configuration parameters comprising periodic resource allocation configuration parameters for configuring a periodic resource allocation of the secondary cell (determined at 2920). At 2940, a downlink control information (DCI) indicating activation of the periodic resource allocation may be received. The DCI may comprise a radio resource assignment. At 2950, one or more transport blocks (TBs) may be transmitted employing the radio resource assignment.

According to an embodiment, the periodic resource allocation may comprise semi-persistent scheduling. According to an embodiment, the deactivation timer may be enabled for the secondary cell in response to the periodic resource allocation being released. According to an embodiment, the periodic resource allocation may be explicitly released. According to an embodiment, the periodic resource allocation may be implicitly released. According to an embodiment, the periodic resource allocation may be released in response to the secondary cell being released and reconfigured without periodic resource allocation.

Figure 30:
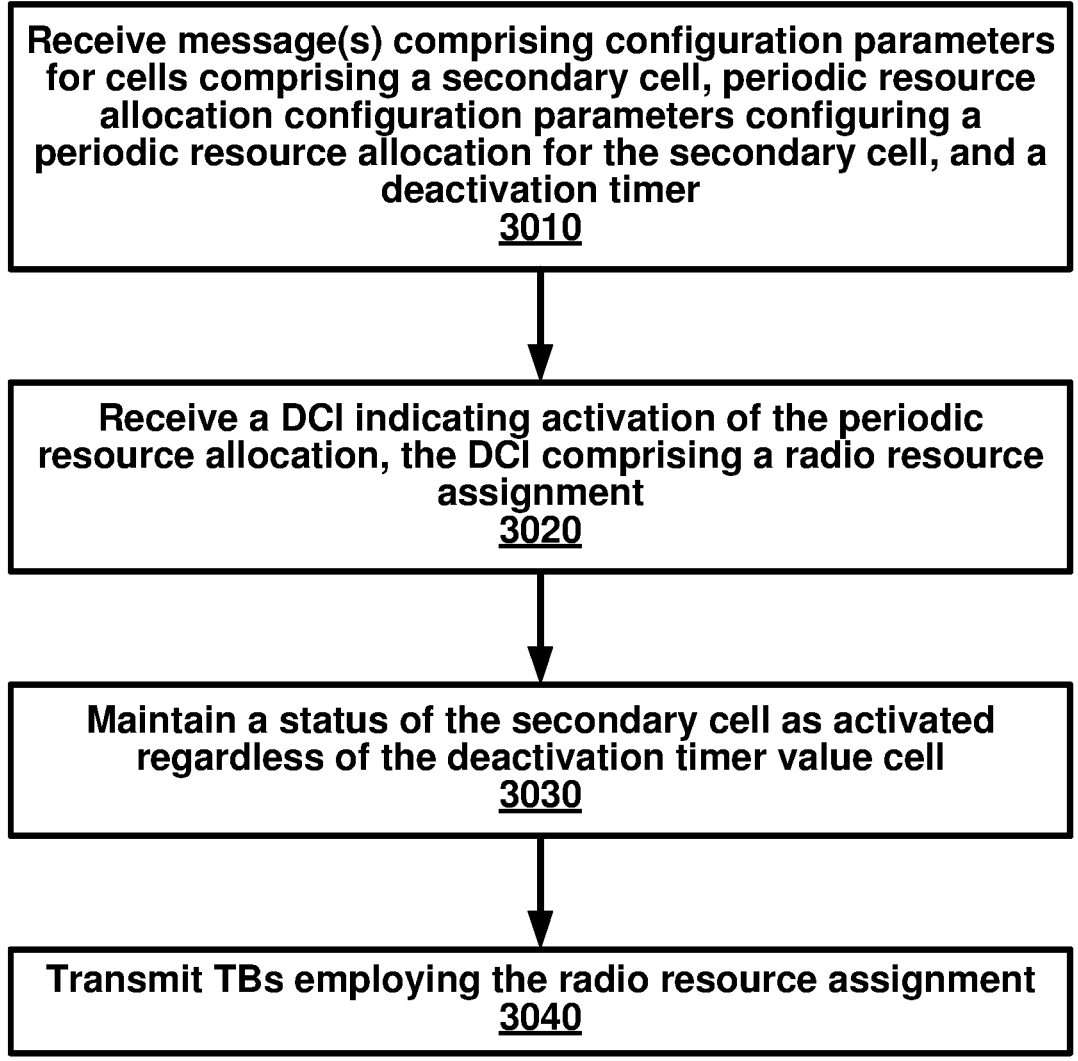
FIG. 30 is an example flow diagram as per an aspect of an embodiment of the present disclosure.

FIG. 30 is an example flow diagram as per an aspect of an embodiment of the present disclosure. At 3010, a wireless device may receive one or more messages. The one or more messages may comprise configuration parameters for a plurality of cells comprising a secondary cell, periodic resource allocation configuration parameters configuring a periodic resource allocation for the secondary cell, and a deactivation timer. At 3020, a downlink control information (DCI) indicating activation of the periodic resource allocation may be received. The DCI may comprise a radio resource assignment. At 3030, a status of the secondary cell may be maintained as activated regardless of the deactivation timer value. At 3040, one or more transport blocks (TBs) may be transmitted employing the radio resource assignment.

According to an embodiment, the periodic resource allocation may comprise semi-persistent scheduling. According to an embodiment, the maintaining the status of the secondary cell may comprise pausing the deactivation timer. The maintaining may last as long as the periodic resource allocation is activated. According to an embodiment, the deactivation timer may resume in response to the periodic resource allocation being released. According to an embodiment, the deactivation timer may be started at a configured value in response to the periodic resource allocation being released. According to an embodiment, the configuration parameters may indicate the configured value.

Figure 31:
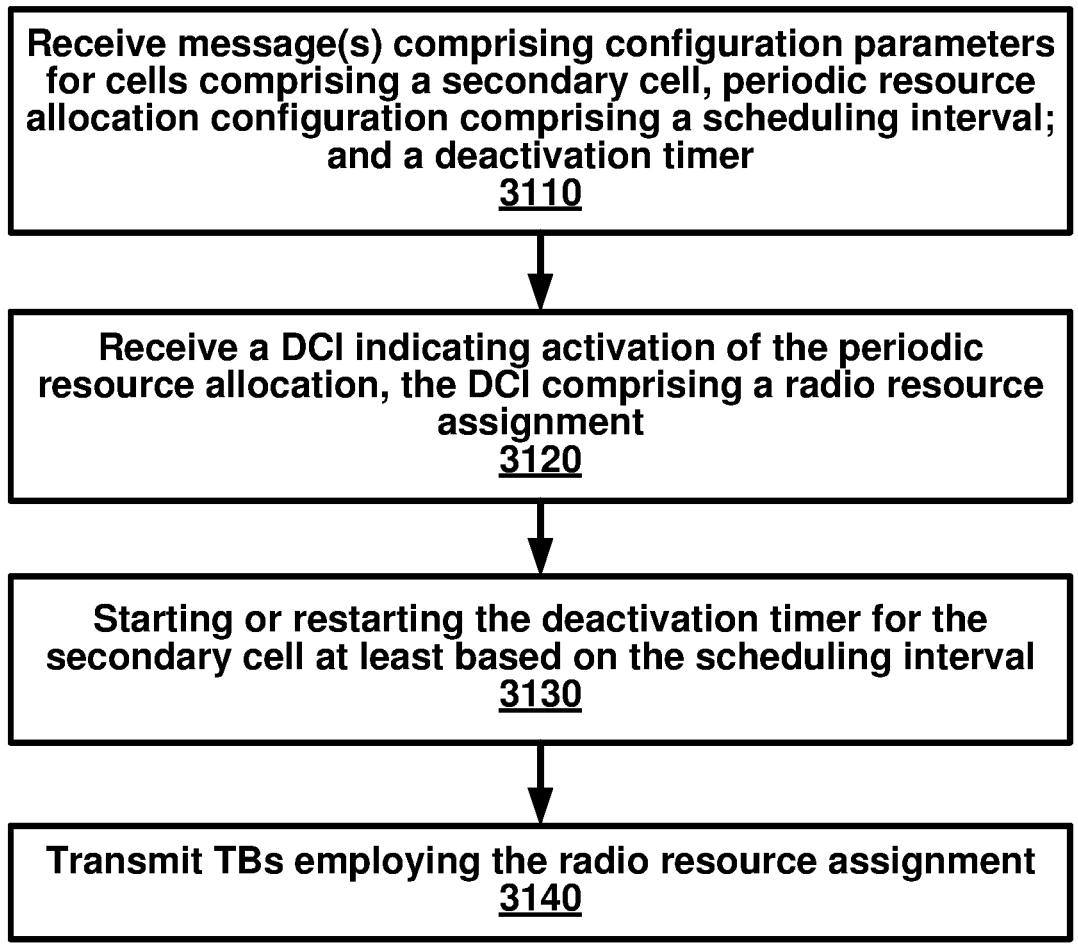
FIG. 31 is an example flow diagram as per an aspect of an embodiment of the present disclosure.

FIG. 31 is an example flow diagram as per an aspect of an embodiment of the present disclosure. At 3110, a wireless device may receive one or more messages. The one or more messages may comprise: configuration parameters for a plurality of cells comprising a secondary cell, periodic resource allocation configuration parameters comprising a scheduling interval, and a deactivation timer. At 3120, a downlink control information (DCI) indicating activation of the periodic resource allocation may be received. The DCI may comprise a radio resource assignment. At 3130, the deactivation timer for the secondary cell may be started or restarted at least based on the scheduling interval. At 3140, one or more transport blocks (TBs) may be transmitted employing the radio resource assignment.

According to an embodiment, the periodic resource allocation may comprise semi-persistent scheduling. According to an embodiment, a plurality of resources may be determined. A resource in the plurality of periodic resources may be determined at least based on the scheduling interval. According to an embodiment, a resource in the plurality of periodic resources may be determined at least based on a time of an initial resource. According to an embodiment, the starting or restarting may be stopped in response to the periodic resource allocation being released. According to an embodiment, the periodic resource allocation may be explicitly released. According to an embodiment, the periodic resource allocation may be implicitly released. According to an embodiment, the deactivation timer may be started or restarted in response to receiving a DCI indicating a grant.

Figure 32:
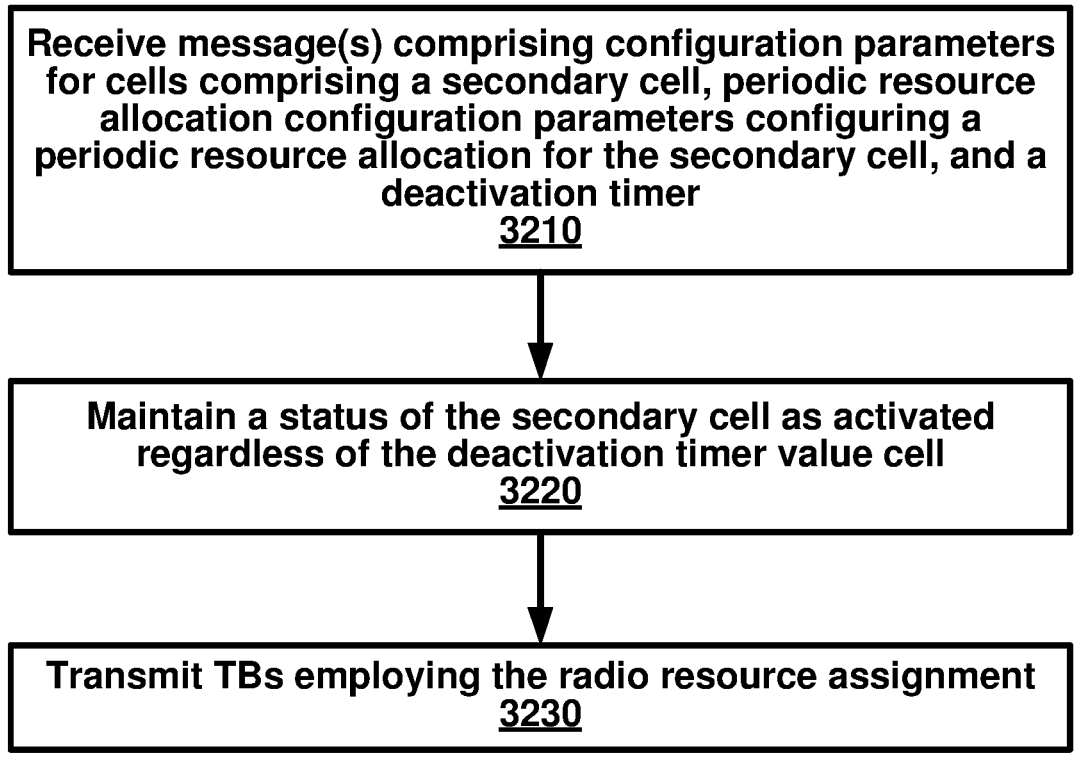
FIG. 32 is an example flow diagram as per an aspect of an embodiment of the present disclosure.

FIG. 32 is an example flow diagram as per an aspect of an embodiment of the present disclosure. At 3210, a wireless device may receive one or more messages. The one or more messages may comprise configuration parameters for a plurality of cells comprising a secondary cell, periodic resource allocation configuration parameters configuring a periodic resource allocation for the secondary cell, and a deactivation timer. At 3220, a status of the secondary cell as activated may be maintained regardless of the deactivation timer value. According to an embodiment, the maintenance of the status may persist as long as the periodic resource allocation is activated. At 3230, one or more transport blocks (TBs) may be transmitted employing radio resources. According to an embodiment, the radio resources may be indicated in a DCI.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages. In an example, an IE may be a sequence of first parameters (first IEs). The sequence may comprise one or more first parameters. For example, a sequence may have a length_max length (e.g. 1, 2, 3, etc.). A first parameter in the sequence may be identified by the parameter index in the sequence. The sequence may be ordered.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above-mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using LAA communication systems. However, one skilled in the art will recognize that embodiments of the disclosure may also be implemented in a system comprising one or more TDD cells (e.g. frame structure 2 and/or frame structure 1). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
receiving one or more messages comprising configuration parameters for:
a plurality of cells comprising a secondary cell;
a scheduling interval for periodic resource allocation; and
a deactivation timer;
receiving downlink control information (DCI) indicating activation of the periodic resource allocation, wherein the DCI comprises a radio resource assignment for the periodic resource allocation;
transmitting, using the radio resource assignment and at a first time determined based on the scheduling interval, one or more packets; and
starting or restarting, based on the secondary cell being active and based on the first time, the deactivation timer for the secondary cell.

2. The method of claim 1, wherein the periodic resource allocation is semi-persistent scheduling.

3. The method of claim 1, further comprising determining a plurality of periodic resources, wherein a resource of the plurality of periodic resources is determined at least based on the scheduling interval.

4. The method of claim 3, wherein a resource of the plurality of periodic resources is determined at least based on a time of an initial resource.

5. The method of claim 1, further comprising stopping, based on the periodic resource allocation being released, the starting or restarting.

6. The method of claim 5, wherein the stopping the starting or restarting is based on the periodic resource allocation being released explicitly.

7. The method of claim 5, wherein the stopping the starting or restarting is based on the periodic resource allocation being released implicitly.

8. The method of claim 1, wherein the starting or restarting of the deactivation timer is further based on receiving DCI indicating a grant.

9. A wireless device comprising:
one or more processors;
memory storing instructions that, when executed by the one or more processors, cause the wireless device to:
receive one or more messages comprising configuration parameters for:
a plurality of cells comprising a secondary cell;
a scheduling interval for periodic resource allocation; and
a deactivation timer;
receive downlink control information (DCI) indicating activation of the periodic resource allocation, wherein the DCI comprises a radio resource assignment for the periodic resource allocation;
transmit, using the radio resource assignment and at a first time determined based on the scheduling interval, one or more packets; and
start or restart, based on the secondary cell being active and based on the first time, the deactivation timer for the secondary cell.

10. The wireless device of claim 9, wherein the periodic resource allocation is semi-persistent scheduling.

11. The wireless device of claim 9, wherein the instructions, when executed by the one or more processors, cause the wireless device to:
determine a plurality of periodic resources, wherein a resource of the plurality of periodic resources is determined at least based on the scheduling interval.

12. The wireless device of claim 11, wherein a resource of the plurality of periodic resources is determined at least based on a time of an initial resource.

13. The wireless device of claim 9, wherein the instructions, when executed by the one or more processors, cause the wireless device to:
stop, based on the periodic resource allocation being released, starting or restarting the deactivation timer for the secondary cell.

14. The wireless device of claim 13, wherein the instructions, when executed by the one or more processors, cause the wireless device to stop starting or restarting based on the periodic resource allocation being released explicitly.

15. The wireless device of claim 13, wherein the instructions, when executed by the one or more processors, cause the wireless device to stop starting or restarting based on the periodic resource allocation being released implicitly.

16. The wireless device of claim 9, wherein the instructions, when executed by the one or more processors, cause the wireless device to:
start or restart the deactivation timer further based on receiving DCI indicating a grant.

17. A non-transitory computer readable medium comprising instructions that, when executed, configure a wireless device to:
receive one or more messages comprising configuration parameters for:
a plurality of cells comprising a secondary cell;
a scheduling interval for periodic resource allocation; and
a deactivation timer;
receive downlink control information (DCI) indicating activation of the periodic resource allocation, wherein the DCI comprises a radio resource assignment for the periodic resource allocation;
transmit, using the radio resource assignment and at a first time determined based on the scheduling interval, one or more packets; and
start or restart, based on the secondary cell being active and based on the first time, the deactivation timer for the secondary cell.

18. The non-transitory computer readable medium of claim 17, wherein the periodic resource allocation is semi-persistent scheduling.

19. The non-transitory computer readable medium of claim 17, wherein the instructions, when executed, configure the wireless device to:
determine a plurality of periodic resources, wherein a resource of the plurality of periodic resources is determined at least based on the scheduling interval.

20. The non-transitory computer readable medium of claim 19, wherein a resource of the plurality of periodic resources is determined at least based on a time of an initial resource.

21. The non-transitory computer readable medium of claim 17, wherein the instructions, when executed, configure the wireless device to:
stop, based on the periodic resource allocation being released, starting or restarting the deactivation timer for the secondary cell.

22. The non-transitory computer readable medium of claim 21, wherein the instructions, when executed, configure the wireless device to stop starting or restarting based on the periodic resource allocation being released explicitly.

23. The non-transitory computer readable medium of claim 21, wherein the instructions, when executed, configure the wireless device to stop starting or restarting based on the periodic resource allocation being released implicitly.

24. The non-transitory computer readable medium of claim 17, wherein the instructions, when executed, configure the wireless device to:
start or restart the deactivation timer further based on receiving DCI indicating a grant.

25. A system comprising:
a wireless device; and
a base station,
wherein the base station is configured to:
transmit one or more messages comprising configuration parameters for:
a plurality of cells comprising a secondary cell;
a scheduling interval for periodic resource allocation; and
a deactivation timer;
transmit downlink control information (DCI) indicating activation of the periodic resource allocation, wherein the DCI comprises a radio resource assignment for the periodic resource allocation, and
wherein the wireless device is configured to:
transmit, using the radio resource assignment and at a first time determined based on the scheduling interval, one or more packets; and
start or restart, based on the secondary cell being active and based on the first time, the deactivation timer for the secondary cell.

26. The system of claim 25, wherein the periodic resource allocation is semi-persistent scheduling.

27. The system of claim 25, wherein the wireless device is configured to determine a plurality of periodic resources, wherein a resource of the plurality of periodic resources is determined at least based on the scheduling interval.

28. The system of claim 27, wherein a resource of the plurality of periodic resources is determined at least based on a time of an initial resource.

29. The system of claim 25, wherein the wireless device is configured to stop, based on the periodic resource allocation being released, starting or restarting the deactivation timer for the secondary cell.

30. The system of claim 29, wherein the wireless device is configured to stop starting or restarting based on the periodic resource allocation being released explicitly.

31. The system of claim 29, wherein the wireless device is configured to stop starting or restarting based on the periodic resource allocation being released implicitly.

32. The system of claim 25, wherein the wireless device is configured to start or restart the deactivation timer further based on receiving DCI indicating a grant.

\* \* \* \* \*

UNITED STATES PATENT AND TRADEMARK OFFICE
CERTIFICATE OF CORRECTION

PATENT NO. : 11,057,925 B2
APPLICATION NO. : 15/670857
DATED : July 6, 2021
INVENTOR(S) : Alireza Babaei and Esmael Hejazi Dinan It is certified that error appears in the above-identified patent and that said Letters Patent is hereby corrected as shown below:

On the Title Page

Item (56) Other Publications, Page 2, Column 2, Line 8:
Please delete "8.133;" and insert --8.13.3;--

Item (56) Other Publications, Page 2, Column 2, Line 11:
Delete "Souce:" and insert --Source:--

Item (56) Other Publications, Page 2, Column 2, Line 44:
Delete "Vokia," and insert --Nokia--

Item (56) Other Publications, Page 2, Column 2, Line 47:
Delete "Vokia," and insert --Nokia--

Item (56) Other Publications, Page 2, Column 2, Line 53:
Delete "8.133;" and insert --8.13.3;--

Item (56) Other Publications, Page 3, Column 1, Line 11:
Delete "23103 V131.0" and insert --23.203 V13.7.0--

Item (56) Other Publications, Page 3, Column 1, Line 19:
Delete "24334 V133.1" and insert --24.334 V13.3.1--

Item (56) Other Publications, Page 3, Column 1, Line 55:
Delete "Souce:" and insert --Source:--

Item (56) Page 3, Column 2, Other Publications, Line 8:
Delete "8.83;" and insert --8.8.3;--

Signed and Sealed this
Twenty-third Day of May, 2023

Katherine Kelly Vidal
*Director of the United States Patent and Trademark Office*

Item (56) Other Publications, Page 3, Column 2, Line 38:
Delete "Souce:" and insert --Source:--

Item (56) Other Publications, Page 4, Column 1, Line 14:
Delete "36A23" and insert --36.423--

Item (56) Other Publications, Page 4, Column 1, Line 38:
Delete "Souce:" and insert --Source:--

Item (56) Other Publications, Page 4, Column 2, Line 22:
Delete "R1-164538'" and insert --R1-164538,--

In the Drawings

Fig. 7, Sheet 7 of 32:
Delete "PUCHH" and insert --PUCCH--

Fig. 7, Sheet 7 of 32:
Delete "DL-SCH of SCH" and insert --DL-SCH of SCG--

Fig. 7, Sheet 7 of 32:
Delete "UL-SCH of SCH" and insert --UL-SCH of SCG--

In the Specification

Detailed Description of Embodiments, Column 9, Line 42:
Delete "NTA" and insert --$N_{TA}$--

Detailed Description of Embodiments, Column 9, Line 46:
Delete "NTA=0." and insert --$N_{TA}=0$.--

Detailed Description of Embodiments, Column 24, Lines 52-54:
Delete "$n_{PHICH}^{group}=(I_{PRB\_RA}+n_{DMRS}) \bmod N_{PHICH}^{group}+I_{PHICH}N_{PHICH}^{group}$" and insert --$n_{PHICH}^{group} = (I_{PRB\_RA} + n_{DMRS}) \bmod N_{PHICH}^{group} + I_{PHICH} N_{PHICH}^{group}$--

Detailed Description of Embodiments, Column 26, Line 18:
Delete "($n^{group}$, $n_{PHICH}^{seq}$)" and insert --($n_{PHICH}^{group}$, $n_{PHICH}^{seq}$)--

Detailed Description of Embodiments, Column 26, Lines 22-24:
Delete "$n_{PHICH}^{group}=(I_{PRB\_RA}+n_{DRMS}) \bmod N_{PHICH}^{group}+I_{PHICH}N_{PHICH}^{group}$" and insert --$n_{PHICH}^{group} = (I_{PRB\_RA} + n_{DMRS}) \bmod N_{PHICH}^{group} + I_{PHICH} N_{PHICH}^{group}$--

Detailed Description of Embodiments, Column 26, Lines 22-24:
Delete "$n_{PHICH}^{seq}=(\lfloor I_{PRB\_RA}/N_{PHICH}^{group}\rfloor+n_{DRMS}) \bmod 2N_{SF}^{PHICH}$" and insert --$n_{PHICH}^{seq} = (\lfloor I_{PRB\_RA}/N_{PHICH}^{group}\rfloor + n_{DMRS}) \bmod 2N_{SF}^{PHICH}$--

Detailed Description of Embodiments, Column 27, Lines 58-60:

Delete "$n_{PHICH}^{group} = (I_{PRB\_RA} + n_{DMRS}) \bmod N_{PHICH}^{group} + I_{PHICH} N_{PHICH}^{group}$" and insert --$n_{PHICH}^{group} = (I_{PRB\_RA} + n_{DMRS}) \bmod N_{PHICH}^{group} + I_{PHICH} N_{PHICH}^{group}$--

Detailed Description of Embodiments, Column 27, Lines 61-63:

Delete "$n_{PHICH}^{seq} = (\lfloor I_{PRB\_RA}/N_{PHICH}^{group} \rfloor + n_{DMRS}) \bmod 2N_{SF}^{PHICH}$" and insert --$n_{PHICH}^{seq} = (\lfloor I_{PRB\_RA}/N_{PHICH}^{group} \rfloor + n_{DMRS}) \bmod 2N_{SF}^{PHICH}$--

Detailed Description of Embodiments', Column 29, Lines 24-26:

Delete "$n_{PHICH}^{group} = (I_{PRB\_RA} + n_{DMRS}) \bmod N_{PHICH}^{group} + I_{PHICH} N_{PHICH}^{group}$" and insert --$n_{PHICH}^{seq} = (\lfloor I_{PRB\_RA}/N_{PHICH}^{group} \rfloor + n_{DMRS}) \bmod 2N_{SF}^{PHICH}$--

Detailed Description of Embodiments, Column 29, Lines 27-29:

Delete "$n_{PHICH}^{seq} = (\lfloor I_{PRB\_RA}/N_{PHICH}^{group} \rfloor + n_{DMRS}) \bmod 2N_{SF}^{PHICH}$" and insert --$n_{PHICH}^{seq} = (\lfloor I_{PRB\_RA}/N_{PHICH}^{group} \rfloor + n_{DMRS}) \bmod 2N_{SF}^{PHICH}$--

Detailed Description of Embodiments, Column 38, Line 35:
Delete "150" and insert --2750--